United States Patent [19]
Gagne et al.

[11] Patent Number: 5,363,453
[45] Date of Patent: Nov. 8, 1994

[54] NON-MINUTIAE AUTOMATIC FINGERPRINT IDENTIFICATION SYSTEM AND METHODS

[75] Inventors: Patricia C. Gagne; Carol M. Puterko, both of Coventry, R.I.

[73] Assignee: TMS Inc., Coventry, R.I.

[21] Appl. No.: 35,483

[22] Filed: Mar. 22, 1993

Related U.S. Application Data

[63] Continuation of Ser. No. 430,421, Nov. 2, 1989, abandoned.

[51] Int. Cl.⁵ .................................. G06K 9/00
[52] U.S. Cl. .................................. 382/5; 382/2; 382/4
[58] Field of Search ........... 382/1, 2, 4, 5, 48; 235/379; 902/4, 5, 6, 21, 25, 26, 28; 340/825.31, 825.33, 825.34; G06K 9/00, 9/20, 19/00, 19/02, 7/00, 7/04; H04N 7/18; G06F 3/00

[56] References Cited

U.S. PATENT DOCUMENTS

| | | | |
|---|---|---|---|
| 2,952,181 | 9/1960 | Maurer, Jr. | 88/14 |
| 3,231,861 | 1/1966 | French | 340/149 |
| 3,245,697 | 4/1966 | Nugent | 283/7 |
| 3,292,149 | 12/1966 | Bourne | 340/146.3 |
| 3,383,657 | 5/1968 | Claassen et al. | 340/149 |
| 3,566,354 | 2/1971 | French | 340/146.3 |
| 3,584,958 | 6/1971 | Miller et al. | 356/71 |
| 3,771,129 | 11/1973 | McMahon | 340/146.3 E |
| 3,801,823 | 4/1974 | Korn | 250/221 |
| 3,944,978 | 3/1976 | Jensen | 340/146.3 E |
| 3,959,884 | 6/1976 | Jordan et al. | 33/1 BB |
| 3,968,475 | 7/1976 | McMahon | 340/146.3 E |
| 4,109,237 | 8/1978 | Hill | 340/146.3 E |
| 4,152,056 | 5/1979 | Fowler | 354/62 |
| 4,210,899 | 7/1980 | Swonger et al. | 382/4 |
| 4,325,570 | 4/1982 | Estrada | 283/7 |
| 4,414,684 | 11/1983 | Blonder | 382/4 |
| 4,537,484 | 8/1985 | Fowler et al. | 354/62 |
| 4,618,988 | 10/1986 | Schiller | 382/5 |
| 4,696,046 | 9/1987 | Schiller | 382/5 |
| 4,747,147 | 5/1988 | Sparrow | 382/5 |
| 4,790,564 | 12/1988 | Larcher et al. | 283/69 |
| 4,811,414 | 3/1989 | Fishbine et al. | 382/5 |
| 4,817,183 | 3/1989 | Sparrow | 382/4 |
| 4,874,932 | 10/1989 | Kimizu | 902/5 |
| 4,882,474 | 11/1989 | Anderl et al. | 902/26 |
| 4,896,363 | 1/1990 | Taylor et al. | 382/5 |
| 4,933,976 | 6/1990 | Fishbine et al. | 382/5 |
| 4,944,021 | 7/1990 | Hoshino et al. | 382/5 |
| 4,947,027 | 8/1990 | Golightly | 902/5 |
| 4,947,442 | 8/1990 | Tanaka et al. | 382/5 |
| 5,067,162 | 11/1991 | Driscoll, Jr. et al. | 382/5 |

OTHER PUBLICATIONS

Personal Identification News, Jan. 1989, "Fingermatrix", p. 27.
Personal Identification News, Jan. 1989, "Identix", p. 28.
Personal Identification News, Jan. 1989, "Morpho", p. 30.
Personal Identification News, Jan. 1989, "Thumbscan", p. 34.

*Primary Examiner*—Jose L. Couso
*Attorney, Agent, or Firm*—Shoemaker and Mattare, Ltd.

[57] ABSTRACT

The invention relates to a system and methods for verifying a person's identity, and pertains in particular to such a system and methods which utilize comparison of a fingerprint pattern for identification verification. The image of a fingerprint of a person to be identified is provided on an inkless means which when touched by a finger of the person causes immediate development of an image of the fingerprint of the finger in a black and white appearance. This image of a fingerprint is video scanned (60) to produce image data which is digitized (10) to produce a non-minutiae digitized numerical identifier indicative of the fingerprint. A preferred method and system provides a non-minutiae digitized numerical identifier having 24 bytes of fingerprint identification data which is recordable within the magnetic stripe of a credit card personal to a person, or may be recorded within the confines of a portable personnel identification means, or within a smart card, personal to a person. The non-minutiae digitized numerical identifier is provided by selectively analyzing different parts of a fingerprint and deriving from each part a byte numeric which is directly related to the ridge count computed for that part.

3 Claims, 28 Drawing Sheets

DETERMINATION OF Y-TOP AND Y-BOTTOM VALUES

↓ = DOWNWARD SCANNING   ↑ = UPWARD SCANNING

DETERMINATION OF X-START AND X-END VALUES

→ AND ← INDICATE LEFT-TO-RIGHT AND RIGHT-TO-LEFT SCANNING DIRECTION

FINAL INDICATION OF FINGERPRINT IMAGE "AREA"

MEMORY IMAGE FRAME VS. WINDOW RELATIONSHIP DIAGRAM

S1 — DIAGONAL \ COUNT GENERATION DIAGRAM

→ INDICATES SCANNED LINE

S2 — DIAGONAL / COUNT GENERATION DIAGRAM

→ INDICATES SCANNED LINE

Yа - Y-AXIS A-RANGE AVERAGE COUNT DIAGRAM

Yb - Y-AXIS B-RANGE AVERAGE COUNT DIAGRAM

Yc – Y-AXIS CENTER LINE ABSOLUTE COUNT DIAGRAM

→ INDICATE SCANNED LINES

Xam – X-AXIS A-RANGE MAXIMUM ABSOLUTE COUNT DIAGRAM

→ INDICATE SCANNED LINES

Xb-X-AXIS B-RANGE AVERAGE COUNT DIAGRAM

Xc-X-AXIS CENTER LINE ABSOLUTE COUNT DIAGRAM

SYSTEM BUS PINOUT

| PIN | SIGNAL<br>MMZ8 | DESCRIPTION | DIGITIZER |
|---|---|---|---|
| 1 | +5 | +5 Volt Power Input | +5 |
| 2 | GND | Signal Ground | GND |
| 3 | N/C | No Connection | N/C |
| 4 | AD3 | Multiplexed Address/Data | AD3 |
| 5 | AD4 | Multiplexed Address/Data | AD4 |
| 6 | AD5 | Multiplexed Address/Data | AD5 |
| 7 | AD6 | Multiplexed Address/Data | AD6 |
| 8 | AD7 | Multiplexed Address/Data | AD7 |
| 9 | AD0 | Multiplexed Address/Data | AD0 |
| 10 | AD1 | Multiplexed Address/Data | AD1 |
| 11 | AD2 | Multiplexed Address/Data | AD2 |
| 12 | P2/0 | Port 2 Bit 0 | P2/0 |
| 13 | P2/1 | Port 2 Bit 1 | P2/1 |
| 14 | P2/2 | Port 2 Bit 2 | P2/2 |
| 15 | P2/3 | Port 2 Bit 3 | P2/3 |
| 16 | P2/4 | Port 2 Bit 4 | P2/4 |
| 17 | P2/5 | Port 2 Bit 5 | P2/5 |
| 18 | P2/6 | Port 2 Bit 6 | P2/6 |
| 19 | P2/7 | Port 2 Bit 7 | P2/7 |
| 20 | R/W | Read/Write | R/W |
| 21 | DS | Data Strobe | DS |
| 22 | AS | Address Strobe | AS |
| A | -12 | -12 Volt Power Input | -12 |
| B | +12 | +12 Volt Power Input | +12 |
| C | N/C | No Connection | N/C |
| D | N/C | No Connection | N/C |
| E | P3/1 | Port 3 Bit 1 | P3/1 |
| F | N/C | No Connection | N/C |
| H | P3/2 | Port 3 Bit 2 | P3/2 |
| J | N/C | No Connection | N/C |
| K | P3/5 | Port 3 Bit 5 | P3/5 |
| L | P3/6 | Port 3 Bit 6 | P3/6 |
| M | P3/7 | Port 3 Bit 7 | P3/7 |
| N | P3/0 | Port 3 Bit 0 | P3/0 |
| P | P3/4 | Port 3 Bit 4 | P3/4 |
| R | P3/3 | Port 3 Bit 3 | P3/3 |
| S | A15 | Address Bus | A15 |
| T | A14 | Address Bus | A14 |
| U | A13 | Address Bus | A13 |
| V | A12 | Address Bus | A12 |
| W | A11 | Address Bus | A11 |
| X | A10 | Address Bus | A10 |
| Y | A9 | Address Bus | A9 |
| Z | A8 | Address Bus | A8 |

FIG. 25

MMZ8 Bus Pin Configuration
(End View - Edge Card Connector)

```
Component Side                              Solder Side

- 12 Volts   - - - - - ->  A    1  <- - - - - +5 Volts
+ 12 Volts   - - - - - ->  B    2  <- - - - - Ground
Reset        - - - - - ->  C    3  <- - - - - No Connection
No Connection  - - - - ->  D    4  <- - - - - Address/Data 3
Timer Zero Input - - - ->  E    5  <- - - - - Address/Data 4
$\overline{RD}$ - - - - - - - ->  F    6  <- - - - - Address/Data 5
Timer One Input- - - - ->  H    7  <- - - - - Address/Data 6
$\overline{PSEN}$ - - - - - - - ->  J    8  <- - - - - Address/Data 7
Timer Two Input- - - - ->  K    9  <- - - - - Address/Data 0
Timer Two Trigger  - ->  L   10  <- - - - - Address/Data 1
TTL Serial Out - - - ->  M   11  <- - - - - Address/Data 2
TTL Serial In  - - - ->  N   12  <- - - - - Pulse Width Mod.
$\overline{Int\ 0\ -\ DMA\ Req}$ - - ->  P   13  <- - - - - $\overline{Interrupt\ 1}$
$\overline{DMA\ Acknowledge}$ - - ->  R   14  <- - - - - $\overline{Program\ Enable}$
Address 15 - - - - - ->  S   15  <- - - - - $\overline{Program\ Pulse}$
Address 14 - - - - - ->  T   16  <- - - - - No Connection
Address 13 - - - - - ->  U   17  <- - - - - No Connection
Address 12 - - - - - ->  V   18  <- - - - - No Connection
Address 11 - - - - - ->  W   19  <- - - - - No Connection
Address 10 - - - - - ->  X   20  <- - - - - RD/$\overline{WR}$
Address 9  - - - - - ->  Y   21  <- - - - - $\overline{DS}$
Address 8  - - - - - ->  Z   22  <- - - - - $\overline{AS}$
```

FIG. 26

LCD Driver (BCC25) Pin Connect To
MMZ8 Bus Pin Configuration
End View - Edge Card Connector
(signals not used on this board are in parentheses)

```
(- 12 Volts)      ----- A  [ ]  1  ----- +5 Volts
(+ 12 Volts)      ----- B  [ ]  2  ----- Ground
Reset             ----- C  [ ]  3  ----- (No Connection)
(No Connection)   ----- D  [ ]  4  ----- Address/Data 3
(Timer 0 Input)   ----- E  [ ]  5  ----- Address/Data 4
RD̄                ----- F  [ ]  6  ----- Address/Data 5
(Timer 1 Input)   ----- H  [ ]  7  ----- Address/Data 6
P̄S̄Ē̄N̄             ----- J  [ ]  8  ----- Address/Data 7
(Timer 2 Input)   ----- K  [ ]  9  ----- Address/Data 0
(Timer 2 Trigger) ----- L  [ ] 10  ----- Address/Data 1
(TTL Serial Output) --- M  [ ] 11  ----- Address/Data 2
(TTL Serial Input)  --- N  [ ] 12  ----- (PW Modulator)
Īn̄t̄ 0 - DMA Request --- P  [ ] 13  ----- Īn̄t̄ 1
(DMA Acknowledge) ----- R  [ ] 14  ----- (Prog Enable)
Address 15        ----- S  [ ] 15  ----- (Program Pulse)
Address 14        ----- T  [ ] 16  ----- (No Connection)
Address 13        ----- U  [ ] 17  ----- (No Connection)
Address 12        ----- V  [ ] 18  ----- (No Connection)
Address 11        ----- W  [ ] 19  ----- (No Connection)
Address 10        ----- X  [ ] 20  ----- RD/W̄R̄
Address 9         ----- Y  [ ] 21  ----- D̄S̄
Address 8         ----- Z  [ ] 22  ----- ĀS̄
```

FIG. 26A

Console Serial Connector
(DB-258 RS-232 Connector - Top View)

```
No Connection - - - - -> 1        14 <- - - - - No Connection
Console Input - - - - -> 2        15 <- - - - - No Connection
Console Output - - - -> 3         16 <- - - - - No Connection
No Connection - - - - -> 4        17 <- - - - - No Connection
Pull Up to +12 Volts -> 5         18 <- - - - - No Connection
Pull Up to +12 Volts -> 6         19 <- - - - - No Connection
Ground - - - - - - - -> 7         20 <- - - - - No Connection
Pull Up to +12 Vdc - -> 8         21 <- - - - - No Connection
No Connection - - - - -> 9        22 <- - - - - No Corection
No Connection - - - - ->10        23 <- - - - - No Connection
No Connection - - - - ->11        24 <- - - - - No Connection
No Connection - - - - ->12        25 <- - - - - No Connection
No Connection    - - ->13
```

FIG. 27

Serial Printer Connector
(2 x 10 Pin Berg Header - Top View)

| Left | Pin | | | Pin | Right |
|---|---|---|---|---|---|
| No Connection - - - → | 1 | · | · | 14 | ← - - - - No Connection |
| Aux Serial Out - - → | 2 | · | · | 15 | ← - - - - No Connection |
| No Connection - - - → | 3 | · | · | 16 | ← - - - - No Connection |
| No Connection - - - → | 4 | · | · | 17 | ← - - - - No Connection |
| Pull Up to +12 Vdc → | 5 | · | · | 18 | ← - - - - No Connection |
| No Connection - - - → | 6 | · | · | 19 | ← - - - - No Connection |
| Ground - - - - - - → | 7 | · | · | 20 | ← - - Pull Up to +12 Vdc |
| No Connection - - - → | 8 | · | · | 21 | ← - - - - No Connection |
| No Connection - - - → | 9 | · | · | 22 | ← - - - - No Connection |
| No Connection - - - → | 10 | · | · | 23 | ← - - - - No Connection |

*FIG. 28*

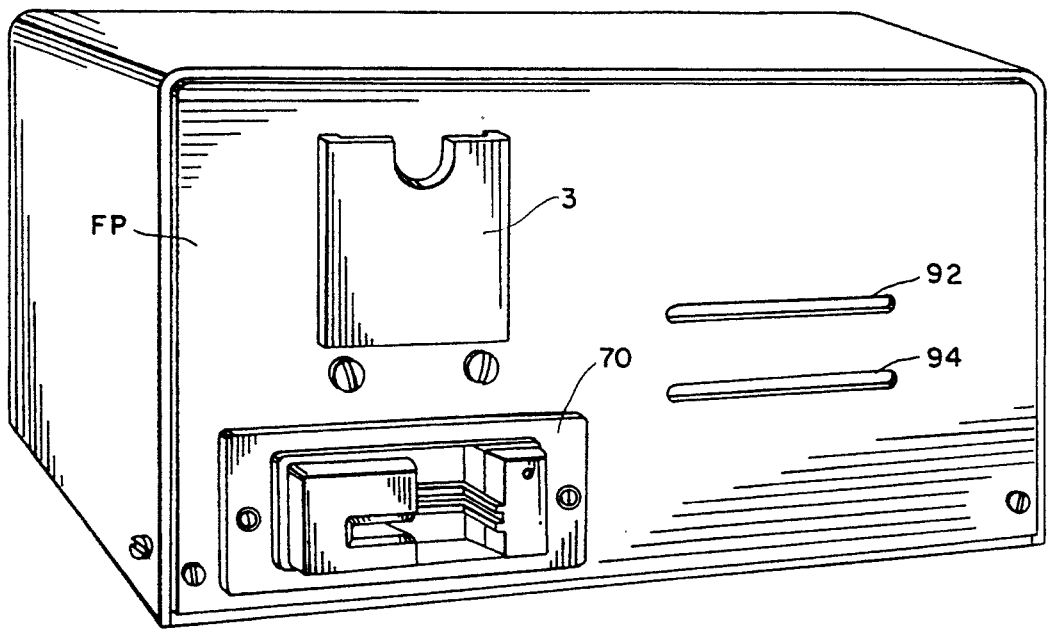
FIG. 31
RS-232C
INPUT (RDX,CTS)
PRINTER SIDE                                          HOST SIDE
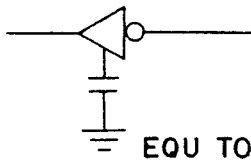 EQU TO 75189
OUTPUT (DTR, FAULT, TXD, RCH, RTS)
PRINTER SIDE
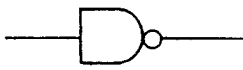
EQU TO 75188
FIG. 32

5,363,453

NON-MINUTIAE AUTOMATIC FINGERPRINT IDENTIFICATION SYSTEM AND METHODS

This application is a continuation, of application Ser. No. 430,421, filed Nov. 2, 1989, now abandoned.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

The invention system and related methods are directed to the automatic identification of fingerprints by video scanning and digitizing analysis of the scanned fingerprint, and to the general field of verification of the identity of a person to be identified, such verification being accomplished by comparing a non-minutiae digitized numeric identifier indicative of a fingerprint of a person to be identified with a numeric identifier recorded within the confines of a portable personnel identification means, personal to the person to be identified, which identification means can be of numerous kinds such as a retail credit card, a smart card, or others as set forth hereinafter. The numeric identifier of such portable personnel identification means is previously derived in accordance with the teachings of the present invention and then recorded within the identification means to enable identity verification, accomplished by comparison.

It is most desirable to have automatic means and methods for identifying human beings. Millions of individuals are checked on a daily basis by cumbersome and unreliable methods in banks, retail stores, classified areas, security environments, and by law enforcement officials. The problem of verifying the identity of an individual to a personnel identification card means held and offered as proof of identification by such individual, is one of the most common faced in the everyday duties of commerce, industry and government. Present day fingerprint verification methods are too time consuming and cumbersome to be expediently implemented into the civilian and military affairs of today's society. What is clearly needed is a means of, and methods for, providing automatic, rapid and positive verification of a person's identification.

The system invention, and the inventive methods utilized therein and related thereto, satisfy this long felt need for methods and means for providing automatic verifiable identification of an individual submitting him or herself for identification for the purpose of: retail credit card purchases, authorized entry, check cashing, obtaining a driver's license, showing proof of age via a driver's license, verification of the identity of a holder of a passport, etc.

A further great need is the development of such a system and methods for providing a verifiable fingerprint identifier which is most applicable to and recordable within a magnetic-stripe of a portable personnel identification card means, such as a magnetic stripe of a credit card. The least number of bytes within a verifiable fingerprint identifier, known to the inventors of the present invention, is a 400 byte numeric identifier developed by FINGERMATRIX. This known development is not at all applicable to a portable personnel identification card of the magnetic-stripe type for reasons well known to those skilled in this art.

The presently disclosed system invention and the inventive methods thereof fully satisfy this further need by providing a verifiable non-minutiae fingerprint identifier having but 24 bytes of fingerprint identification data which affords recordability to magnetic-stripe identification cards.

The invention includes the actual taking of an individual's fingerprint via an inkless means each time an identification is to be made. The print can be taken of any digit of a person, i.e. index finger or thumb or toe, and the image of a digitprint is video scanned to produce image data which is digitized in accordance with the teachings of the invention to produce a non-minutiae digitized numerical identifier indicative of the digit print image, and this digitized numerical identifier is compared with a numerical identifier read from an identification card means identifying the person to be identified, to verify the identity of that person.

Various other objects and advantages of the invention methods and system will be apparent from that set forth hereinafter, and some of the specific objectives of the invention are recited hereinbelow.

OBJECTS OF THE INVENTION

It is an object of the invention to provide a biometric means for comparing the fingerprint of an individual whereby a rapid and highly fraud-proof check may be made.

It is another object of the invention to make the fingerprint image expediently available for immediate analysis to render approval or disapproval of the identity of a given person from whom the fingerprint is taken.

It is a general objective of the invention to provide a system and related methods by which an individual fingerprint may be video-scanned and digitized in such a manner that the procedure produces a numeric identifier uniquely related to the pattern of the fingerprint, this identifier consisting of a specified number of digits or bytes to identify the fingerprint against an actual fingerprint of an individual at the time positive identification is required.

It is a specific object of the invention to provide a non-minutiae digitized numerical identifier having less than 400 bytes of fingerprint identification data, and in particular, a verifiable identifier having less than 100 bytes of fingerprint identification data for application to mag-stripe personnel identification cards, as exemplified by the provision disclosed herein of a non-minutiae digitized numerical identifier having 24 bytes of fingerprint identification data.

It is yet another object of the invention to provide means by which a fingerprint image format may be positioned automatically in relation to the video scanning means, in such a way that the position is predetermined and will be reestablished each time that a print format means is placed before the video scanner, thus insuring that a subsequent scanning operation will always produce consistent and reliable field of scan results.

It is still another object of the invention to provide means and methods for selectively analyzing, electronically, on a non-minutiae basis, a plurality of different fingerprint image parts of the stored fingerprint image data and computing a ridge count for each of the plurality of fingerprint image parts, and then compiling a data matrix comprised of a plurality of ridge counts computed for the plurality of fingerprint image parts to provide a non-minutiae digitized numerical identifier indicative of the image of a fingerprint of a person to be identified.

It is still another object of the invention to provide a predetermined sequence of selectively analyzing, electronically, on a non-minutiae basis, a plurality of different fingerprint image parts of the stored fingerprint image data, which fingerprint pattern parts exist within a fingerprint identity window defined by the invention.

It is yet still another object of the invention to provide a non-minutiae digitized numerical identifier indicative of an image of a fingerprint of a person to be identified, which is recordable within the magnetic stripe of a credit card personal to the person and therefore, the present invention facilitates the use of a credit card as a verifiable identification card for entitling the user to certain services such as charged purchases and check cashing.

It is even a further object of the invention to provide a fingerprint identification system and inventive methods utilized therein, which can be completely software controlled and automated to eliminate the possibility of human error, to increase the reliability of the identification being made and to eliminate any constant supervision as usually required with conventional identification procedures. The invention, by utilizing an unchanging characteristic of an individual for making an identification, is not subject to obsolescence and at the same time may be constructed at various levels of sophistication depending on the degree of security of reliability which is desired. The system can be made an integral part of other systems in which information about individuals is taken and recorded and the system can be so constructed with controls that provide for immediate revocation of the privileges of benefits given any individual identified in the system.

It is also another object of the invention to provide a method for the automatic non-minutiae identification of a fingerprint of a person to be identified which includes a method for determining the location of the fingerprint image data stored in a memory means with the whitespace data produced by scanning an image of a fingerprint, and to define a fingerprint or digitprint identity window so as to define a predetermined "area of analysis" which area is defined depending on the specific needs of the end-user application, and with respect to a predetermined "window-size", to enable defining the dimensional area of the fingerprint identity window.

The foregoing and other objects, features and advantages of the invention will be apparent from the following more detailed description of preferred embodiments and methods of the invention, as illustrated in the accompanying drawings.

BRIEF DESCRIPTION OF THE DRAWINGS

FIGS. 7A, 8A, 9A, and 10A, illustrate the values computed in reference to a fingerprint image produced on an inkless framed format means; and FIGS. 7B, 8B, 9B and 10B provide illustrations of how the respective values are determined from the performance of their respective method steps which are performed on the digital fingerprint image and whitespace data stored in the memory means of the video digitizer, in accordance with the teachings of the present invention.

FIG. 25 illustrates the System Bus Pinout diagram for interconnection of the digitizer 10 to the MMZ8 edge connector Z8.

FIG. 26 illustrates the MMZ8 bus pin configuration interconnections of processor 20 and the Z8 edge connector via J4.

FIG. 26A illustrates the interconnections of LCD Driver 30 with Z8.

FIG. 27 illustrates a console serial connector J1 which is utilized to interconnect the PPI/MS Reader 60 with processor 20.

FIG. 28 illustrates the serial printer connector J2 which is utilized to interconnect the processor 20 with the printer 50.

FIG. 31 illustrates a third embodiment of the system invention employed in an application pertaining to check cashing-personnel identity verification of check payee, which embodiment incorporates the use of PPI/MS Reader 60 and printer means 50.

FIG. 32 illustrates the connection of printer 50 to the processor 20.

DEFINITIONS

Figure 1B:
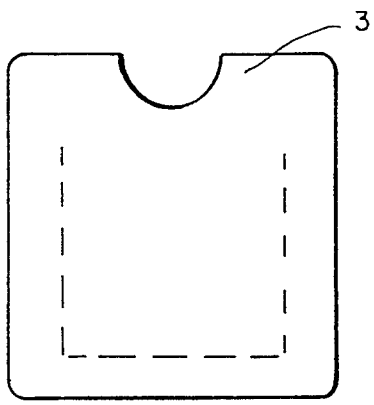
FIG. 1B shows the inkless framed format holder means which is mounted on the face of the system housing.

It is well known that fingerprints contain specific features, called minutiae, which are unique and allow identification of people by their fingerprints or even a toe print. By definition, a minutiae is either: (1) a bifurcation, which is the location where a given line forks into different lines; or (2) a ridge ending. Minutiae are usually recorded with three coordinates: two coordinates "x" and "y" for the position of the minutiae relative to a coordinate system: and one coordinate "a" which is an angle representing the average direction of the lines around the minutiae point.

In contrast, the present invention methods and system are "non-minutiae" based and either provide or utilize a non-minutiae digitized numerical identifier which is uniquely related to the pattern of a fingerprint it identifies. The non-minutiae digitized numerical identifier is provided by selectively analyzing electronically, on a non-minutiae basis, different parts of a fingerprint and deriving from each part a byte numeric which is directly related to the ridge count computed for that part. This non-minutiae digitized numerical identifier can also be described as a "verification string".

The term "digitizing" is used herein to refer to the process by which the non-minutiae digitized numerical identifier is derived by the respective invention methods disclosed herewith; and, the term "digitized" is used herein to identify the non-minutiae numerical identifier derived by such process.

The "ridge counts" are computed by analyzing or examining selected horizontal and vertical and diagonal memory data lines of the fingerprint identity window defined by the present invention, and counting the number of greylevel shifts from "white" (greylevels 13, 14 or 15) to "black" (greylevels 0 through 12).

The video digitizer of the system invention is the means employed for converting the video scanned fingerprint image data (FID) and whitespace data into digital data to generate within its memory a digitalized picture of that scanned by the video scanner, i.e. the inkless format providing an image of a fingerprint of a person to be identified; but, it is the software-controlled processor means of the invention which functions to selectively analyze the digital data to provide a digitized numerical identifier indicative of the fingerprint image.

The present invention discloses an inventive method step termed "image framing" wherein, prior to selectively analyzing different parts of the fingerprint image data and prior to defining a fingerprint identity window, the fingerprint image and whitespace digital data stored in an addressable memory means (RAM), located in the video digitizer, are framed to a predetermined dimension, and the location of the fingerprint image data stored in this memory means with whitespace data is determined by determining: (1) X-START and X-END values to indicate the start and the end of the fingerprint image data along the X-axis, and (2) Y-START and Y-END values to indicate the start and end of the fingerprint image data along the Y-axis. The "image framing" invention method also includes an "image frame sizing" step which essentially frames the digital fingerprint and whitespace image data contained in memory.

The "fingerprint identity window" defined by the present invention is the "area of analysis" defined within the fingerprint image data stored in memory. It is this fingerprint identity window which is selectively scanned and analyzed in accordance with the teachings of the present invention, to provide a non-minutiae digitized numerical identifier indicative of the fingerprint image data of a fingerprint of a person to be identified. The "fingerprint identity window" is defined depending on the specific needs of the end-user application, and is set by determining a "window-size".

The purpose of the "verification string" is to provide a tailorable degree of certainty into the comparison of encoded data on i.e., the magnetic stripe of a credit card, or other article presented by an individual used as a personal identification means, and the individual's fingerprint image.

This "verification string" can be variable in size, depending on multiple factors. The invention affords the provision of a verification string (or digitized numerical identifier) which has less than 400 bytes of fingerprint identification data, or one having less than 100 bytes of FID as applicable to a magnetic stripe credit card or a smart card or other personal identification card means, or, in particular, an identifier having only 24 bytes of FID which as disclosed in a preferred method and embodiment of the present invention is uniquely applicable to the magnetic stripe of a credit card.

An "element" is a calculated value, generated by the end-user application.

A first factor is the size of the "window" in which image analysis is performed. The larger the window, the more verification data can be generated for comparison purposes. Since the "window" is variable depending on end-user applications, the size of the verification string can vary as well. Thus, it is reasonable to say that increasing the "window-size" used in verification string generation presents the opportunity to increase the number of elements which comprise the verification string.

A second factor is the formulas or calculations used to generate or calculate the verification string. The calculations performed to generate the verification string can vary from one end-user application to another. Any mathematical formula or statistical computation based on ridge counts, whether individually or as a sum, can be used as an element in the verification string data matrix which is compiled.

Both of the above scenarios address the flexibility of the verification string size in designing end-user applications with varied degrees of verification confidence. Of course, different applications might have the same number of verification string elements, yet comprise of entirely different formulas used to generate that data. In other words, two end-user applications may comprise verification strings having a different total number of elements, and the applications may generate each element of its verification string differently.

Lastly, the positioning of each element within the verification string could be different from one application to another. For instance, one application might use Yc (Y Center Line Count) as a value for the seventh element of the verification string, as disclosed herein, and yet another application may use the same value in another element of its verification string.

DETAILED DESCRIPTION OF INVENTION METHODS

Figure 1A:
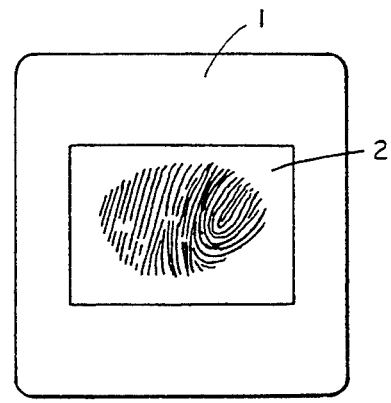
FIG. 1A shows an inkless framed format having produced thereon an image of a fingerprint.

A preferred form of the present invention system and methods combinatively utilize an inkless media for the purpose of taking or providing an image of a fingerprint or digitprint. An image of such print is produced by placing a digit of the person to be identified within a 2"x 2" framed format 1 as shown in FIG. 1A, which contains a treated material which when touched by a finger, utilizing an inkless process, causes immediate development of an image of a fingerprint of such finger in a black and white appearance, to provide a good quality scannable image of a fingerprint. The use of this inkless means for taking a fingerprint of a person to be identified overcomes the disadvantages of conventional fingerprint taking techniques. Of course, it is within the scope of the present invention to be applicable to video scan a fingerprint image imprinted upon other media, or by other methods.

After the fingerprint has been taken, the inkless framed format 1 is placed within a format holder 3 which is mounted on the face plate of the system housing. The placement of the inkless framed format within the format holder 3 is illustrated in FIG. 1B.

Figure 2:
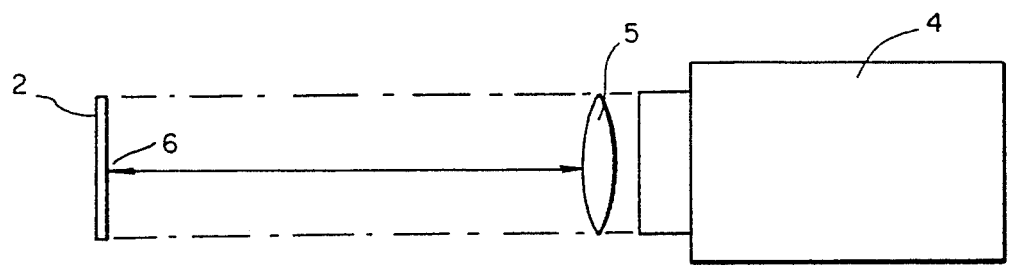
FIG. 2 shows the predetermined position orientation of a video scanning camera and a 16 mm lens to the center of an inkless framed format positioned within the framed format holder means.
Figure 3:
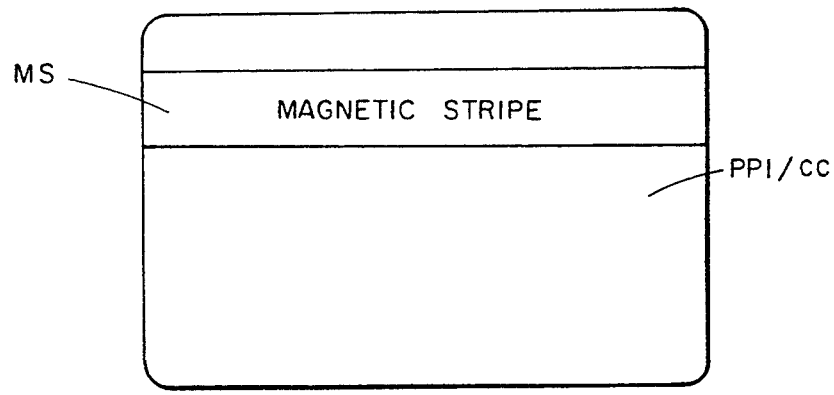
FIG. 3 shows a portable personnel identification card of the magnetic-stripe kind.
Figure 4:
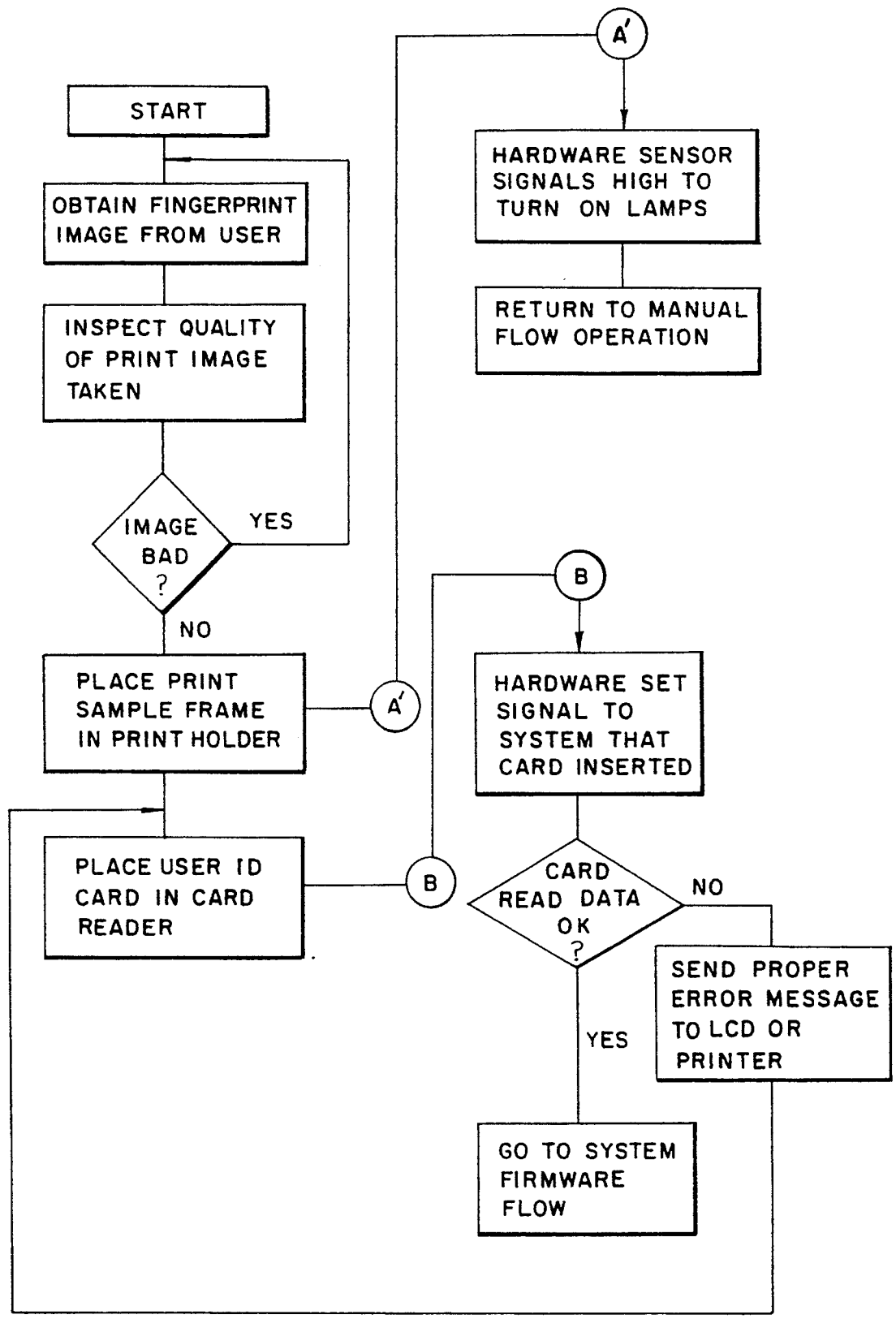
FIG. 4 is a flow diagram of the system manual and hardware flow of the present invention.
Figure 5:
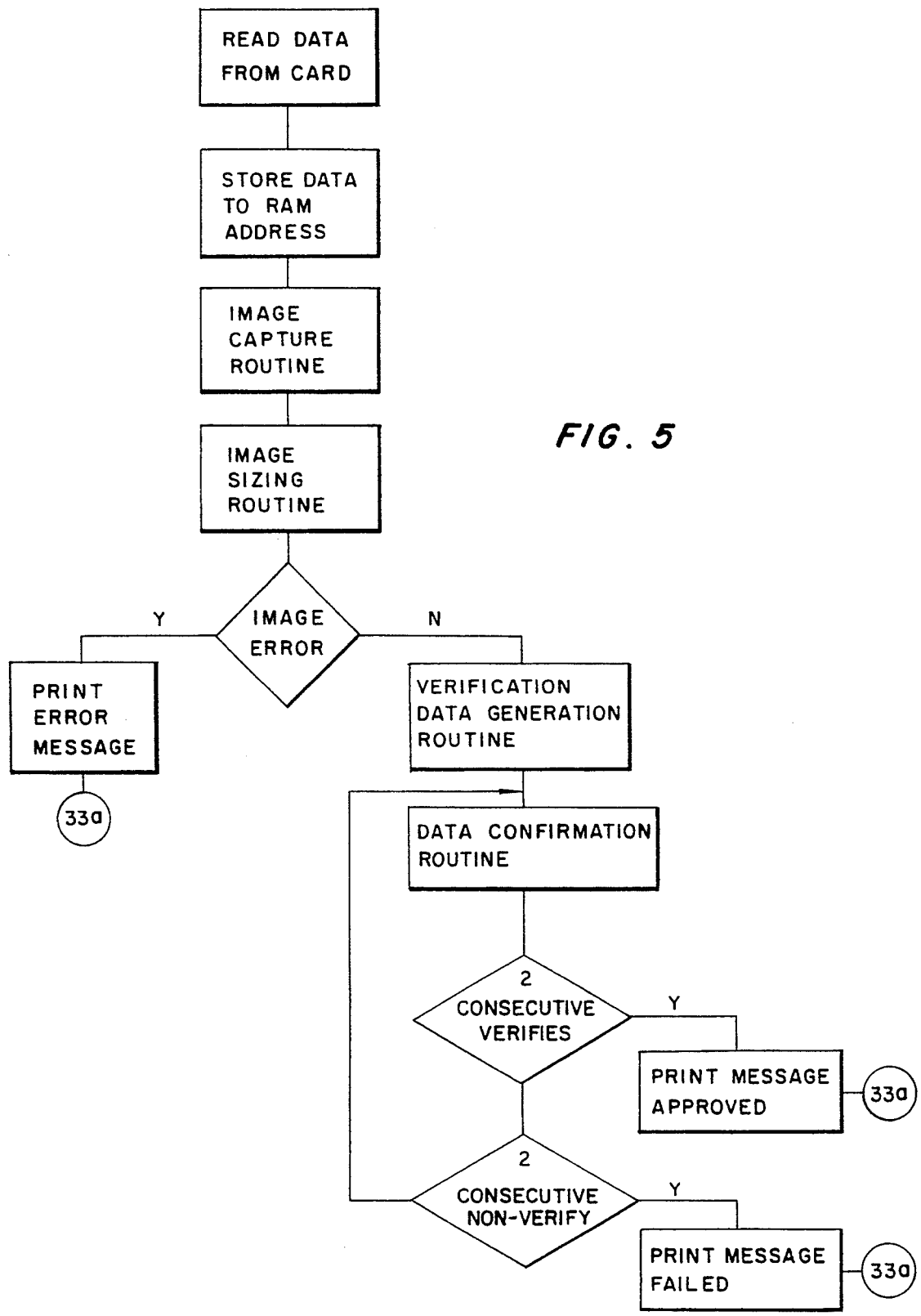
FIG. 5 is a flow diagram of the software process of fingerprint identification verification of the present invention.

FIG. 2 shows the predetermined position orientation of a video scanning camera 4 and a 16 mm lens 5 associated therewith, to the center of the inkless framed format when it is positioned within the format holder. The center 6 is the center of the inkless media 2 bearing the fingerprint image. A preferred predetermined distance of 2½ inches is set between the center 6 and the face of lens 5.

Accordingly, this provides means by which a fingerprint may be positioned automatically in relation to a video scanning system, in such a way that the position is unique and will be reestablished each time that the framed format 1 is placed within the format holder and thus within the field of scan of the video scanner, to insure that any subsequent scanning operation will always produce proper and desirable results. The use of the inkless fingerprint media for taking the person's fingerprint without requiring the direct application of ink to the person's finger, and under controlled conditions, affords that the person's print may be repeatedly produced with the same clarity and detail, thus facilitating an accurate comparison between prints.

After the fingerprint has been taken on the inkless means of the framed format, the framed format 1 is placed within the holder 3 with the fingerprint image facing the housing face plate and towards the field of view of the video scanner. It is to be noted that in an effort to diminish background reflection of light from the framed format 1, the framed portion has been blackened, as shown in, for example, FIG. 7A.

Figure 6A:
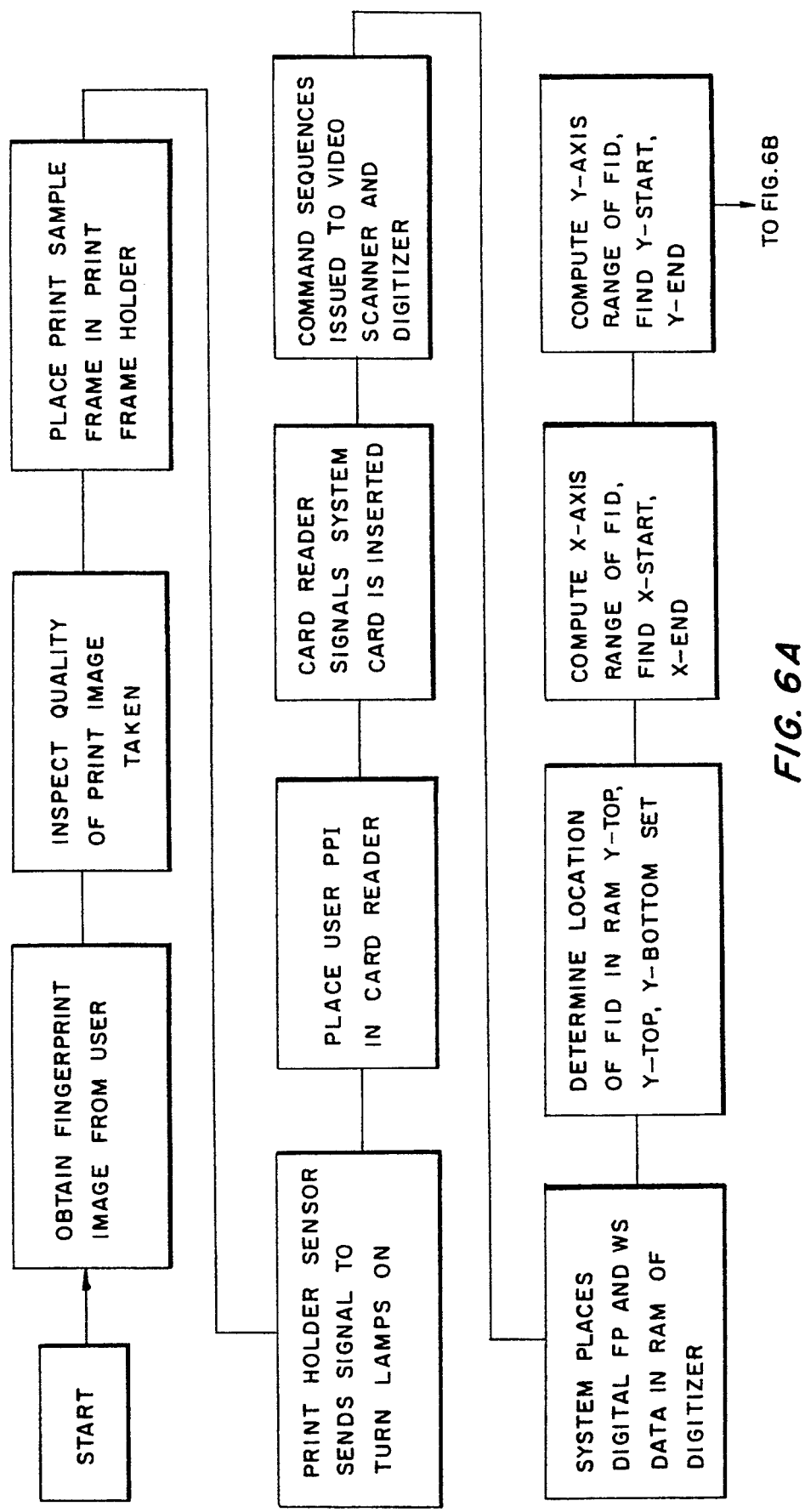
FIGS. 6A and 6B is a combined flow chart diagram of the manual, firmware and software process flow of the present invention.
Figure 6B:
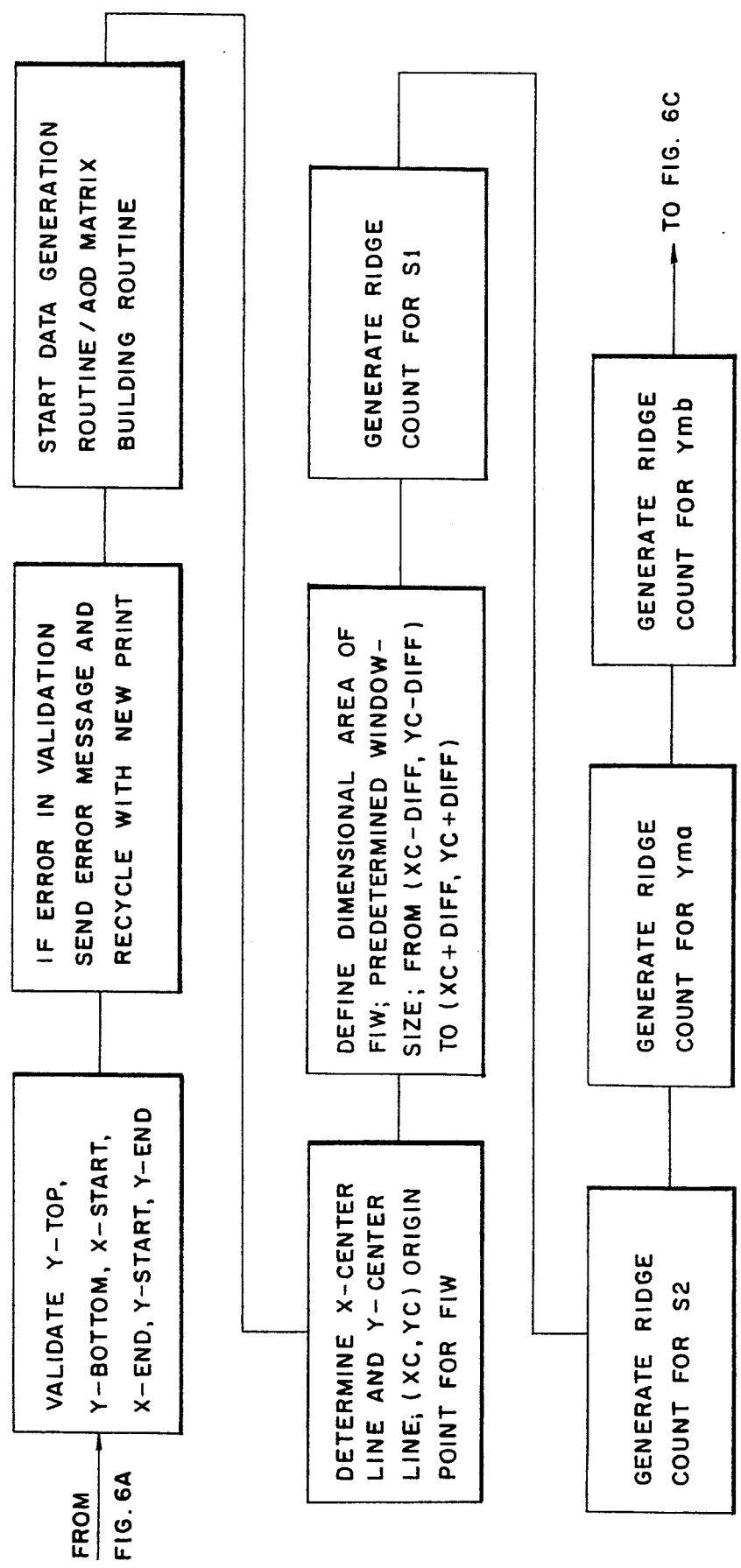
Figure 6C:
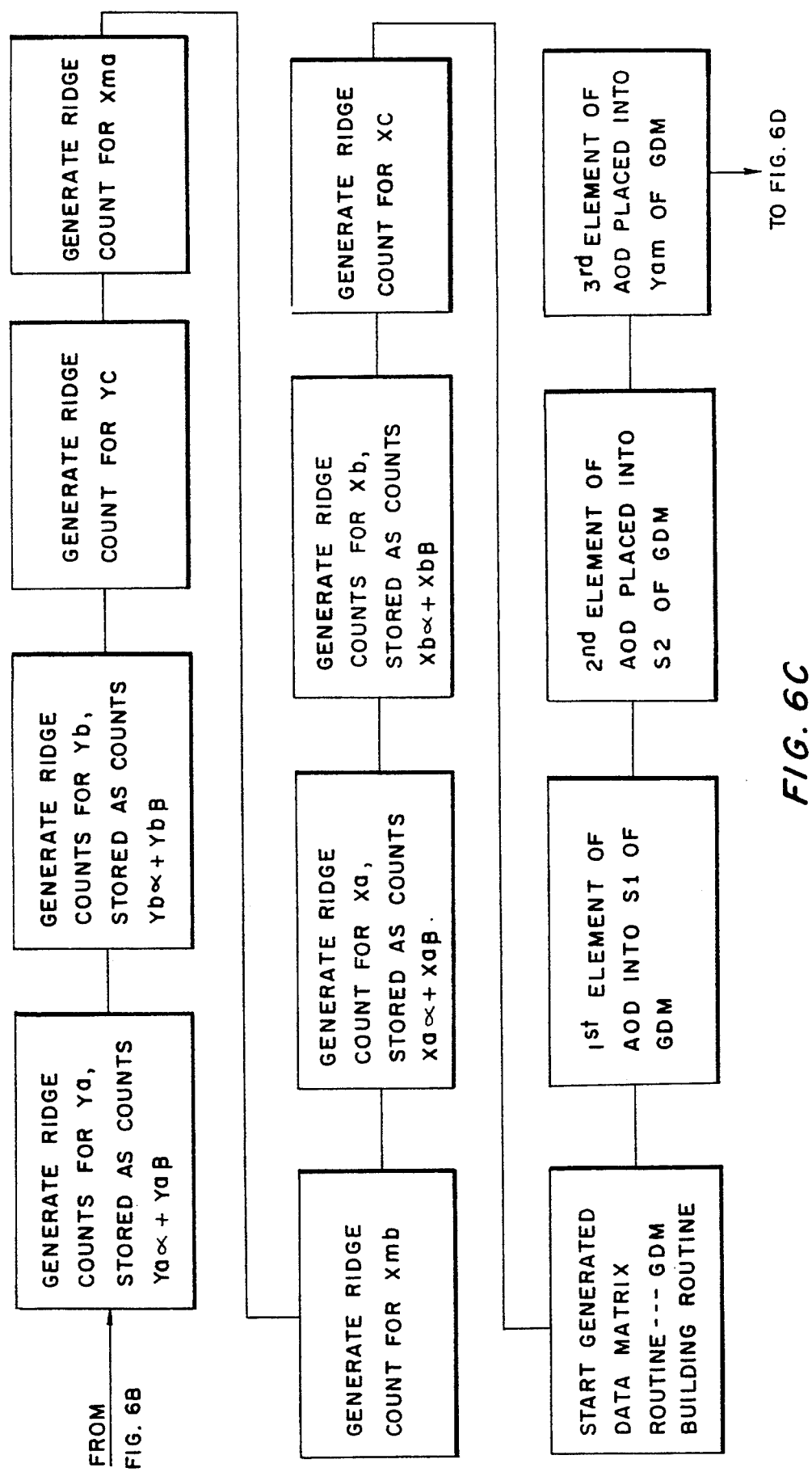
Figure 6D:
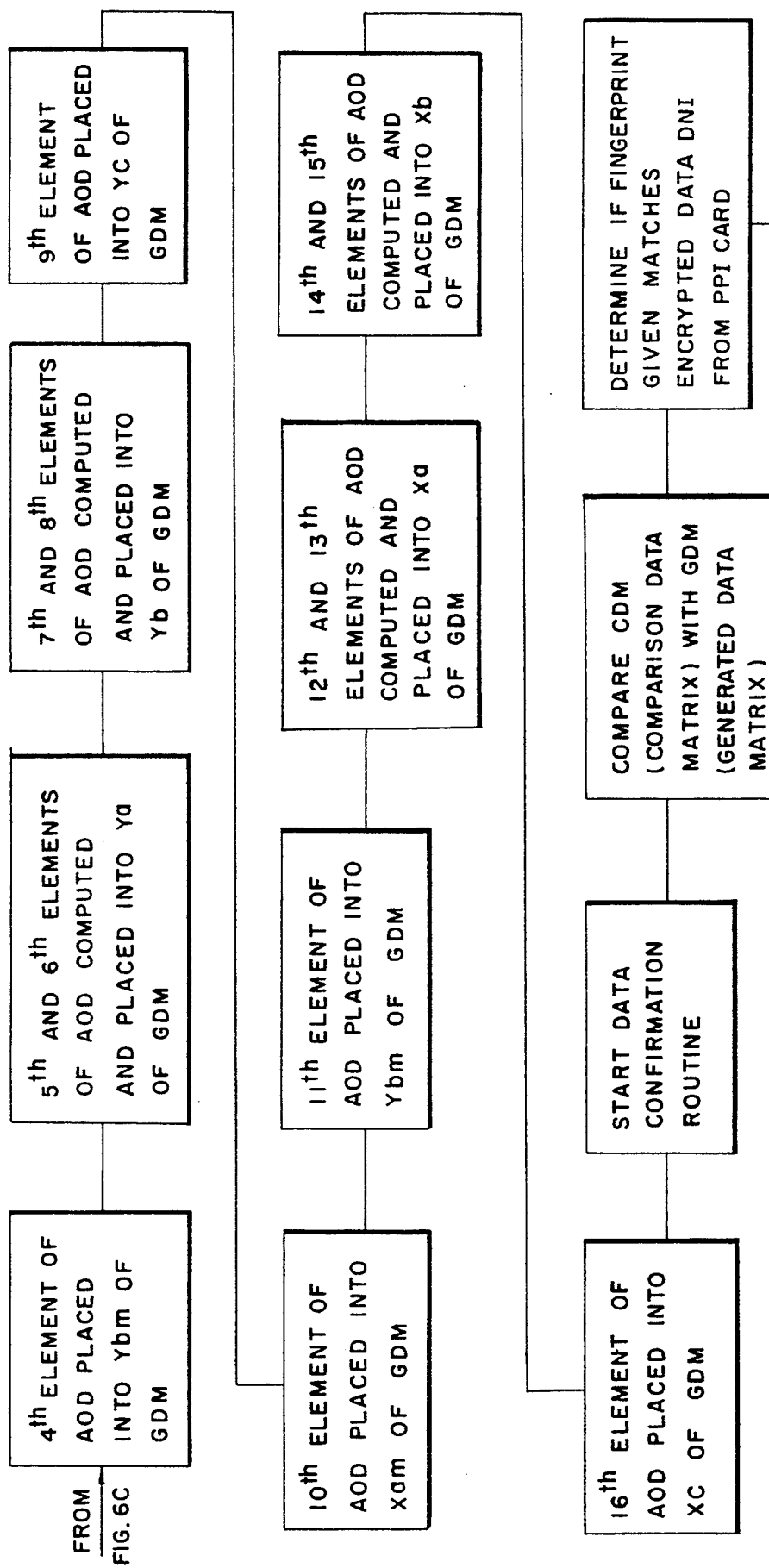
Figure 6E:
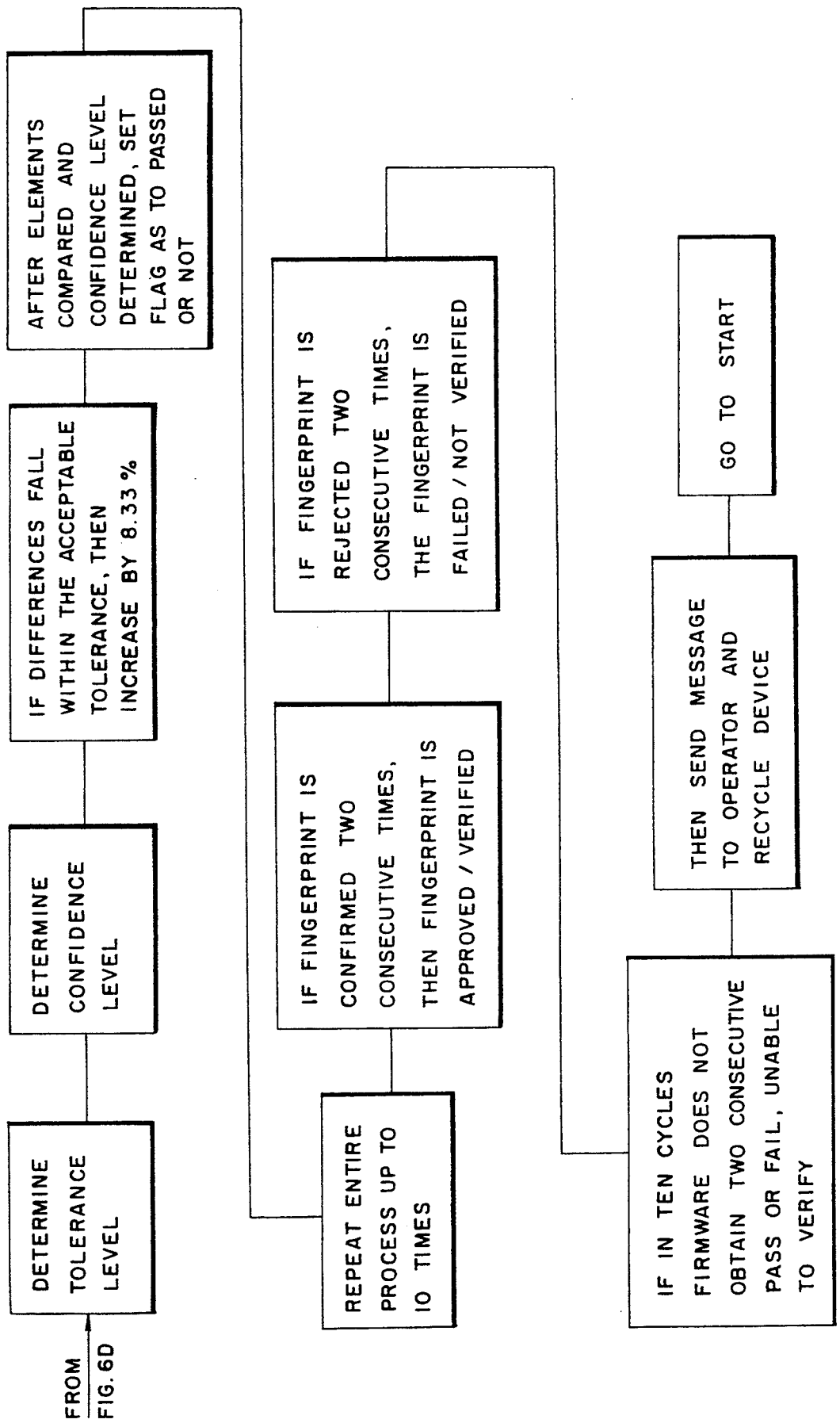

As shown in the FIG. 6A flow chart, in operation, after the fingerprint format is placed in the format holder and an identification card means is placed in a card reader, system command sequences are issued to the video scanner and the digitizer to commence and complete the scanning and digitizer functions.

Thus, the image of a fingerprint is video scanned to produce image data which is provided to a digitizer which converts the image data into digital image data which is stored in an addressable memory means (RAM) of the digitizer. To accomplish this, a sequence of commands are issued to the digitizer's "command port". This command sequence is specific to each end-user application. After these commands are issued, the digital fingerprint image and whitespace data generated by the scanning procedure and contained in memory in the digitizer, is ready for analysis.

Firmware Process Overview—The controlling firmware of the invention system has several components, each of which perform a specific task which, when combined, provide a series of processes that will take a fingerprint sample and verify it against verification data to insure the authenticity of the provider of the sample. These processes include the following routines:

Comparison Data Retrieval Routine
Image Capture Routine
Image Sizing Routine
Algorithm Data Generation Routine
Verification Data Generation Routine
Data Confirmation Routine Each of these routines are executed in sequence, and will be discussed in order. However, before the firmware verification process can commence, that set forth hereinabove must have been performed.

Comparison Data Retrieval Routine—This routine controls receipt of the Provider's verification data recorded on the identification card means, which is compared against data computed from the fingerprint sample to approve or fail the Provider's authenticity. The verification data could be encrypted and this will be discussed in a following disclosure section, along with an associated decryption function. The verification data (also termed "non-minutiae numerical identifier") recorded within the identification card means is read and stored in a 12 element array which is located in the processor of the invention system. This matrix has the same layout as the Generated Data Matrix which will be discussed subsequent to the following.

Figure 7A:
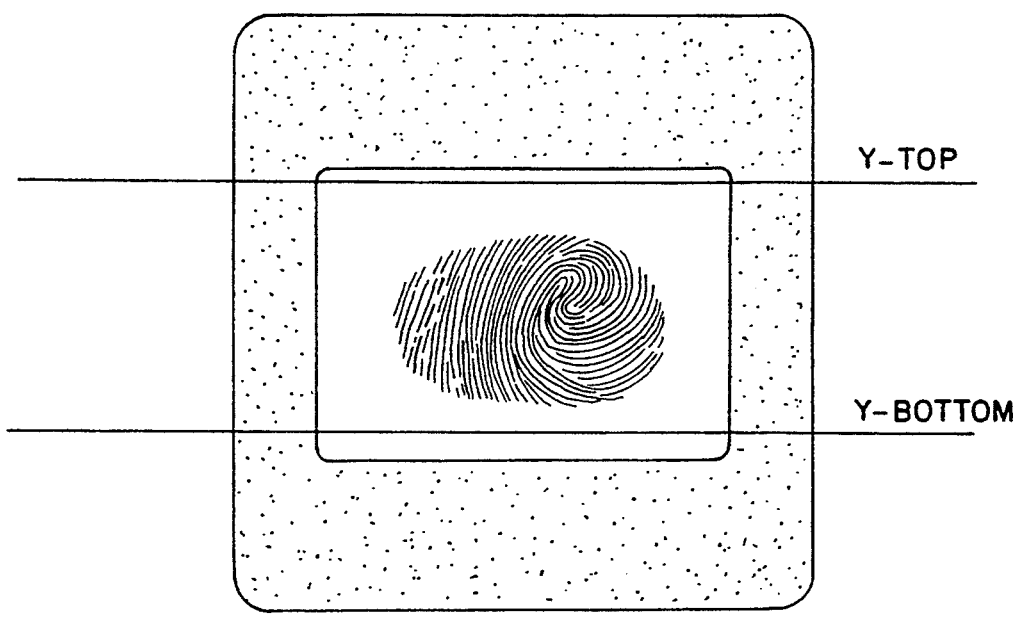
FIGS. 7A, 7B, 8A, 8B, 9A, 9B, 10A, and 10B jointly depict the Image Frame Sizing Routine of the invention, wherein the respective method steps are shown in two forms.
Figure 7B:
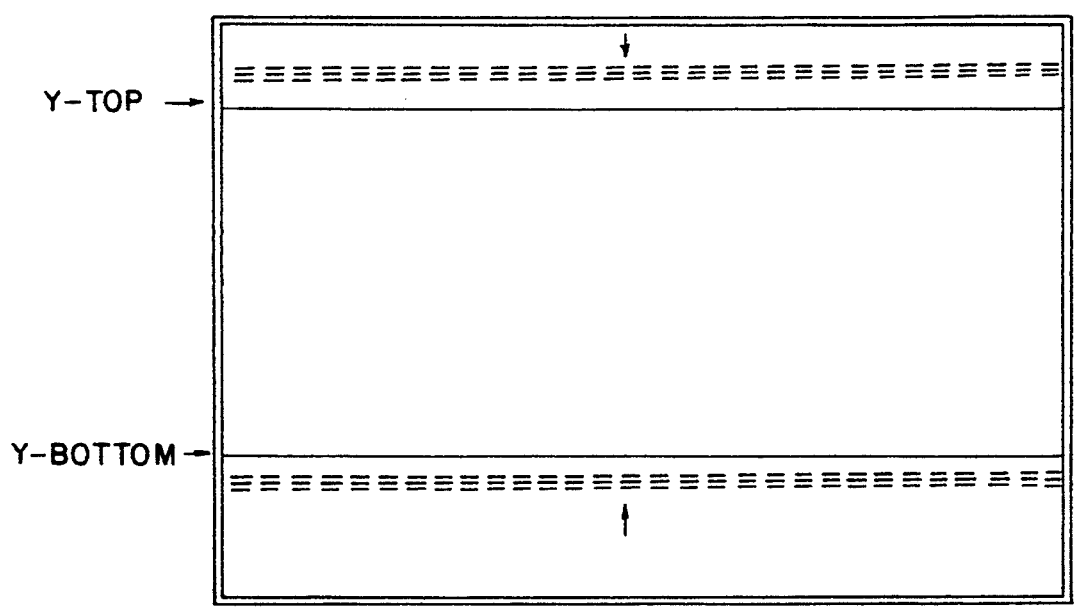
Figure 8A:
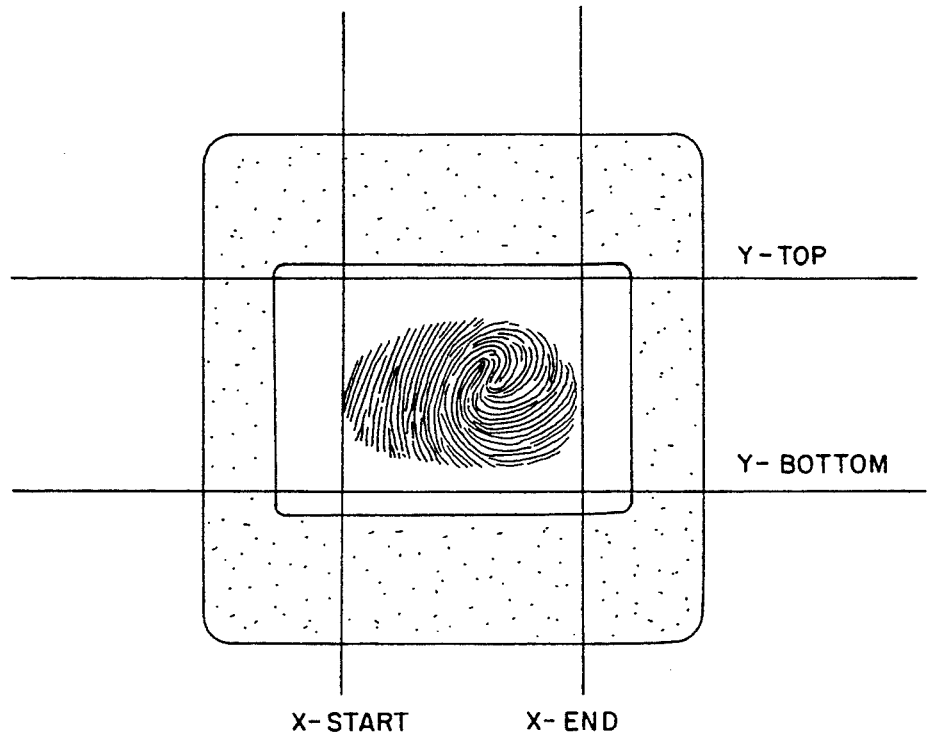
Figure 8B:
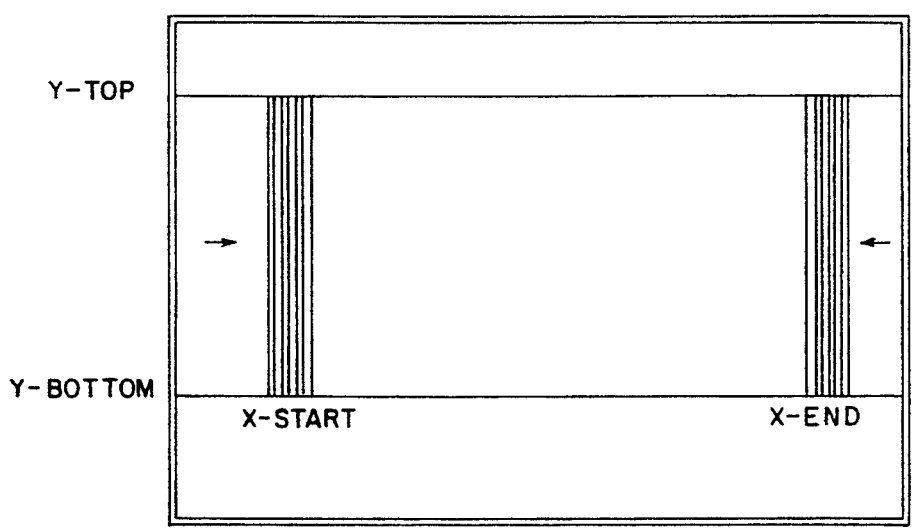

Image Frame Sizing Routine—This routine is generated subsequent to the Image Capture Routine which controls the operation of the video camera and the digitizer to capture the fingerprint image and whitespace data in memory. With reference to FIGS. 7A and 7B, this is accomplished as follows:

Note: "Whitespace" is defined as a greylevel equal to 13, 14, or 15.

a) Memory frame locations (128,Y), where $0 \leq Y \leq 255$ are inspected, when three consecutive rows of whitespace are found, Y-TOP is defined as the current Y-value; and b) Memory frame locations (128,Y), where $255 \geq Y \geq 0$ are inspected, when three consecutive rows of whitespace are found, Y-BOTTOM is defined as the current Y-value.

c) With respect to FIGS. 8A and 8B, once Y-TOP and Y-BOTTOM values are established, the X-Axis Range of the fingerprint image data needs to be computed. This is accomplished by scanning (i.e., examining) each column (vertical line) to find three consecutive columns of whitespace. Once three columns are found, the next column containing a greylevel other than whitespace (i.e., black) is considered to be part of the Image.

Figure 9A:
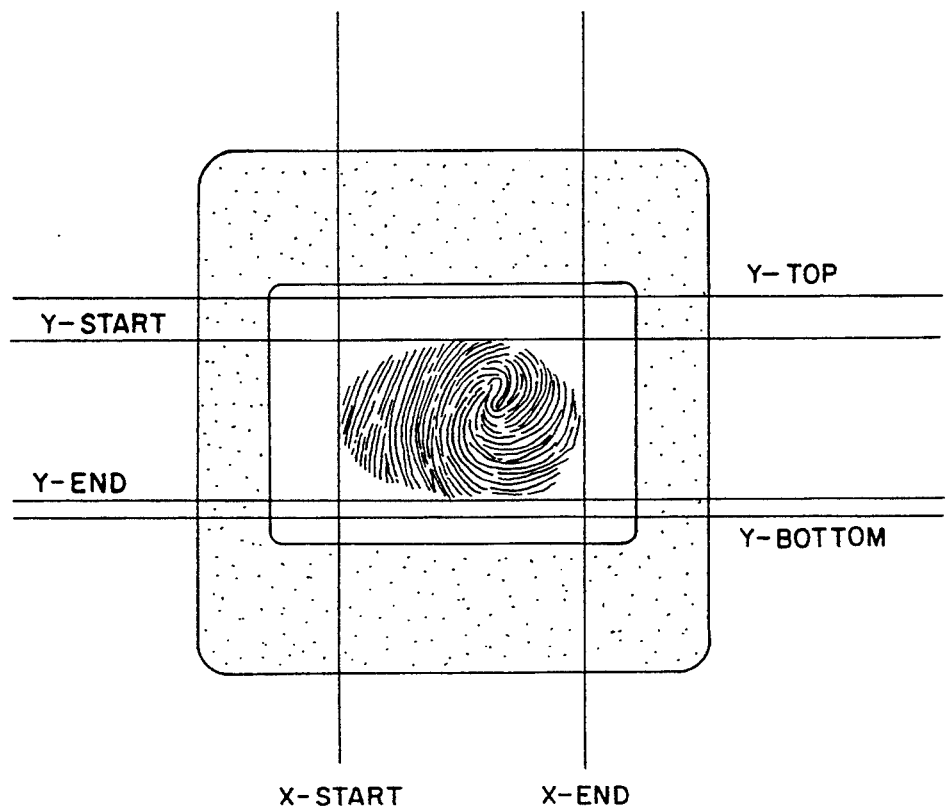
Figure 9B:
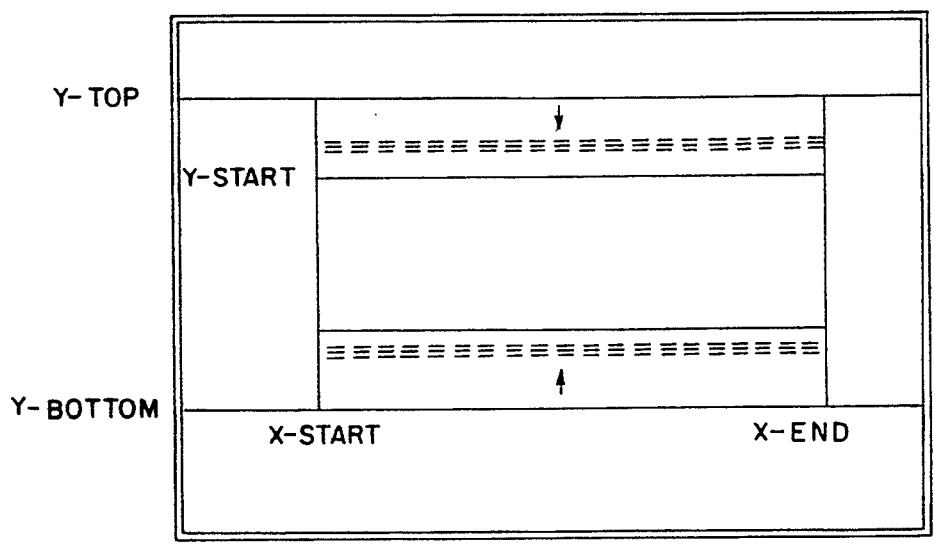

Two X-Axis values, X-START and X-END, need to be set, to indicate the start and end memory data locations of the Image on the X-Axis, respectively. X-START is determined by scanning Frame Locations (X,Y), where $0 \leq X \leq 255$ and Y-TOP $\leq Y \leq$ Y-BOT- TOM. This value indicates where the Image "starts" on the X-Axis. X-END is determined the same way, only reversing the X-Axis scan direction from $255 \geq X \geq 0$, to determine where the Image "Ends" on the X-axis.

d) With respect to FIGS. 9A and 9B, now that the X-Axis range has been computed, the Y-Axis range of the FID needs to be computed. This is accomplished in a method similar to that used for the X-Axis Range.

Each row (horizontal line) is scanned, and, syncing on three consecutive whitespace rows, the next row that contains a greylevel other than whitespace is considered to be part of the image.

Figure 10A:
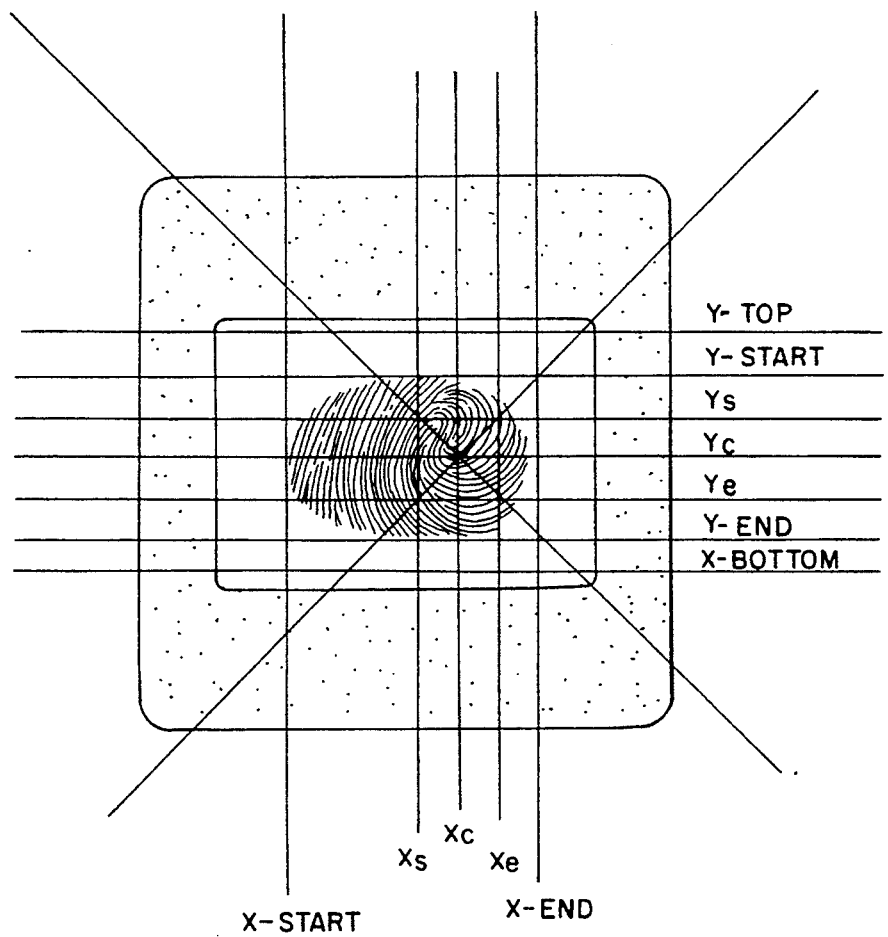
Figure 10B:
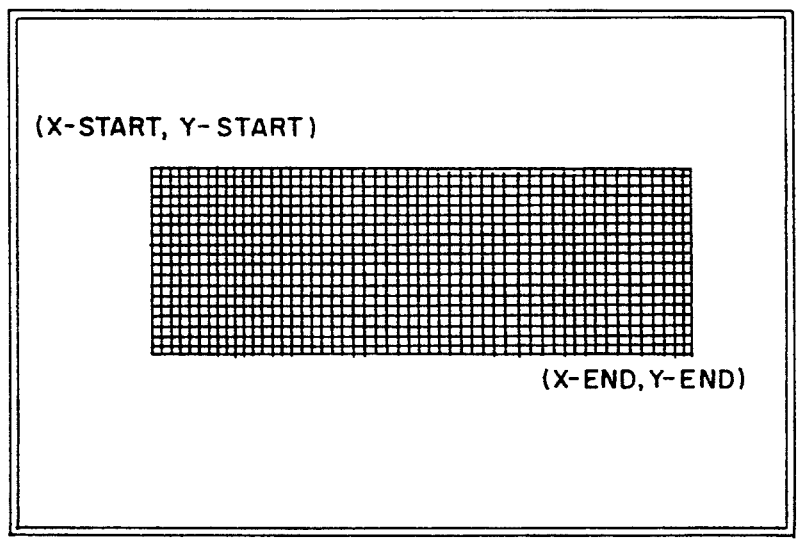

Two Y-Axis values, Y-START and Y-END, need to be set, to indicate the start and end memory data locations of the Image on the Y-Axis, respectively. Y-START is determined by scanning Frame Locations (X,Y), where X-START $\leq X \leq$ X-END and Y-TOP $\leq Y \leq$ Y-BOTTOM. Y-END is determined in similar fashion, only different being that the direction of scan along the Y-Axis is from Y-BOTTOM $\geq Y \geq$ Y-TOP.

e) With respect to FIGS. 10A and 10B, all values generated must be validated to insure that an accurate image has been scanned and sized. If any of the following conditions fail, a "Poor Image Quality" error is generated, and the system recycles.

The conditions which will cause this error are:
i. Y-BOTTOM $\leq$ Y-TOP
ii. X-END $\leq$ X-START
iii. Y-END $\leq$ Y-START If any of the above conditions are true, then the fingerprint sample provided to the Digitizer should be discarded and a new sample taken.

If none of the above error conditions exist, then the fingerprint sample is considered to have been accurately scanned and sized. The area within the memory frame where the fingerprint image data exists can be illustrated as shown in FIG. 10B.

Fingerprint Identity Window "Area of Analysis"

Prior to calling the mainline routine for the algorithm data generation routine (ADGR), locations must be set to describe the "window" within the fingerprint image data, stored in the memory frame, which is going to be analyzed. This "window" is a box, determined around an origin point defined as (XC,YC). XC and YC, or more appropriately called X-Center Line and Y-Center Line, are determined from values generated in the Image Sizing Routine, according to the following formulas:

$$XC = X\text{-END} - (X\text{-END} - X\text{-START})/3$$

$$YC = Y\text{-END} - (Y\text{-END} - Y\text{-START})/2$$

The difference between the two calculations is based upon the knowledge that the lower portion of a person's fingerprint (i.e., the portion containing the whirl) will be located closer to X-END than X-START. Thus, the XC value should start in the rightmost third of the print (hence, the division by 3) as that is where the whirl is likely to exist in the digitalized image. YC is simply determined to be the standard Center Line between the two Y points on the frame's Y-Axis. Thus, assuming a print has been sized to exist from (50,50) to (200,150), (XC,YC) would be defined as (150,100).

Once (XC,YC) has been established, the "area of analysis" can easily be defined to the ADGR mainline routine. This area is defined depending on the specific needs of the end-user application, and is set by determining a "window-size". The "window-size" is always an odd number. The "area of analysis" is then defined as XC$\pm$DIFF and YC$\pm$DIFF. DIFF is computed with the following formula:

$$\text{DIFF} = \tfrac{1}{2}(\text{window-size} - 1)$$

So, if the "window-size" is 73, the "area of analysis" would be appropriately defined as (XC$\pm$36, YC$\pm$36), or, in our example above, from (114,64) to (186,136).

Accordingly, the dimensional area of the fingerprint identity window is defined by predetermining a window-size for the fingerprint identity window and defining its dimensional area as from (XC$-$DIFF, YC$-$DIFF) to (XC+DIFF, YC+DIFF) where DIFF=$\tfrac{1}{2}$ (window-size minus 1), wherein (XC$-$DIFF)=Xs, (YC-DIFF) =Ys, (XC+DIFF)=Xe, and (YC+DIFF)=Ye.

In addition to the X and Y Center Line values, there are four other variables which are used in Algorithm computations and these values are set forth hereinbelow and have been recited in connection with determining the dimensional area of the fingerprint identity window:

| Description: | Symbol: | Value: |
| --- | --- | --- |
| Window X-Axis Start | Xs | XC $-$ DIFF |
| Window X-Axis End | Xe | XC + DIFF |
| Window Y-Axis Start | Ys | YC $-$ DIFF |
| Window Y-Axis End | Ye | YC + DIFF |

Figure 11A:
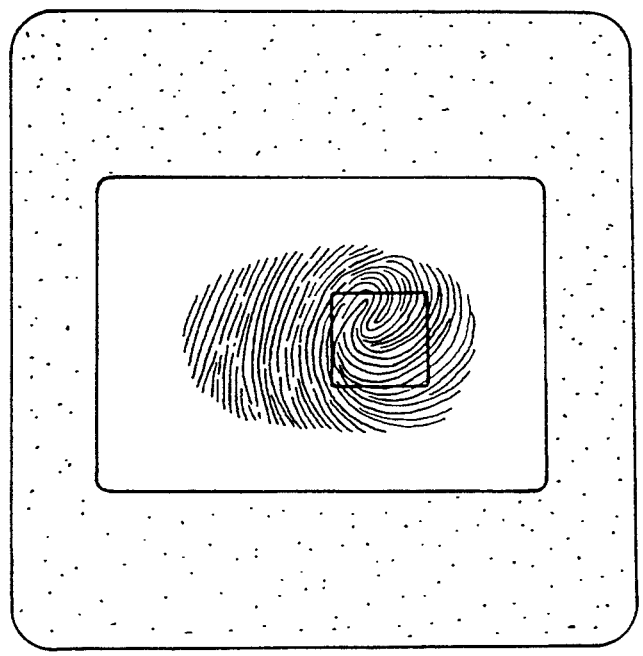
FIGS. 11A and 11B depict in a fashion similar to FIGS. 7-10, a method step of the Algorithm Data Generation Routine, wherein the inventive methods of defining a fingerprint identity window and determining the dimensional area of such window, are accomplished.
Figure 11B:
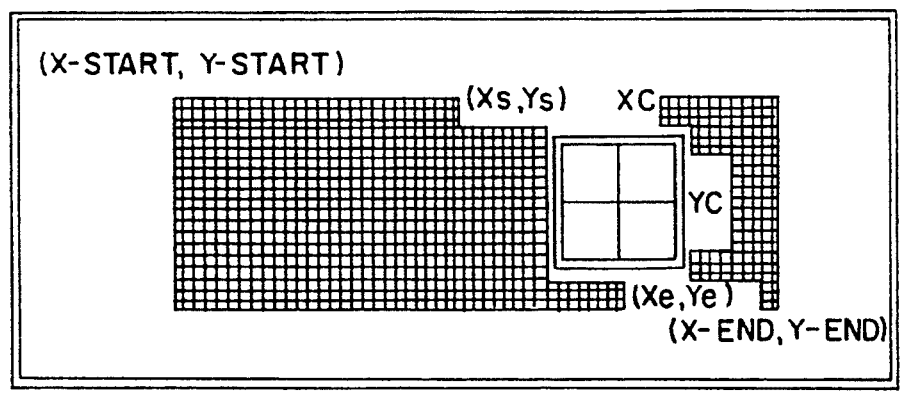

Once the proper values have been set, the "area of analysis" can be illustrated as shown in FIGS. 11A and 11B.

Algorithm Data Generation Routine—The Algorithm Data Generation Routine (ADGR) consists of a series of modules designed to generate 16 ridge-count values to be used in the computation of the Generated Data Matrix. The processing for each of these values will be discussed after the following presentation:

Algorithm Output Data

Key: S1—Diagonal \ Absolute Count
S2—Diagonal / Absolute Count
Yam—Y-Axis A-Range Maximum Absolute Count
Ybm—Y-Axis B-Range Maximum Absolute Count
Ya$\alpha$—Y-Axis A-Range Average Count
Ya$\beta$—Y-Axis A-Range Average Count
Yb$\alpha$—Y-Axis B-Range Average Count
Yb$\beta$—Y-Axis B-Range Average Count
Yc—Y-Axis Center Line Absolute Count
Xam—X-Axis A-Range Maximum Absolute Count
Xbm—X-Axis B-Range Maximum Absolute Count
Xa$\alpha$—X-Axis A-Range Average Count
Xa$\beta$—X-Axis A-Range Average Count
Xb$\alpha$—X-Axis B-Range Average Count
Xb$\beta$—X-Axis B-Range Average Count
Xc—X-Axis Center Line Absolute Count

| Algorithm Output Data: | | | | | | | |
| --- | --- | --- | --- | --- | --- | --- | --- |
| 01 | 02 | 03 | 04 | 05 | 06 | 07 | 08 |
| S1 | S2 | Yam | Ybm | Ya$\alpha$ | Ya$\beta$ | Yb$\alpha$ | Yb$\beta$ |
| 09 | 10 | 11 | 12 | 13 | 14 | 15 | 16 |
| Yc | Xam | Xbm | Xa$\alpha$ | Xa$\beta$ | Xb$\alpha$ | Xb$\beta$ | Xc |

Ridge counts are generated by examining the horizontal and vertical lines set forth hereinbelow, and counting the number of greylevel shifts from "white" (greylevels 13, 14, or 15) to "black" (greylevels 0 through 12).

The computation of the counts for the values of the Algorithm Output Data will now be described.

Figure 12:
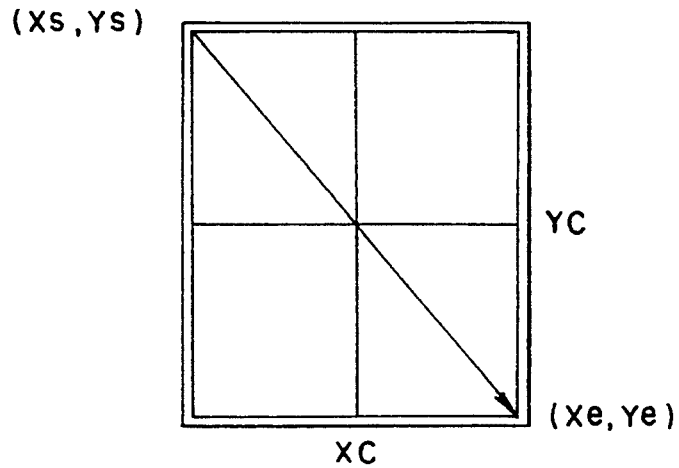
FIG. 12 illustrates the computation of count S1.

Value #1:S1; Diagonal \ Absolute Count (FIG. 12)

This routine generates a count of ridges contained on the diagonal line drawn from point (Xs,Ys) to (Xe,Ye). Since the "window" is an absolute square, this relationship is a one-for-one increment along the X-Axis and Y-Axis, starting at Xs, and ending at Xe.

Figure 13:
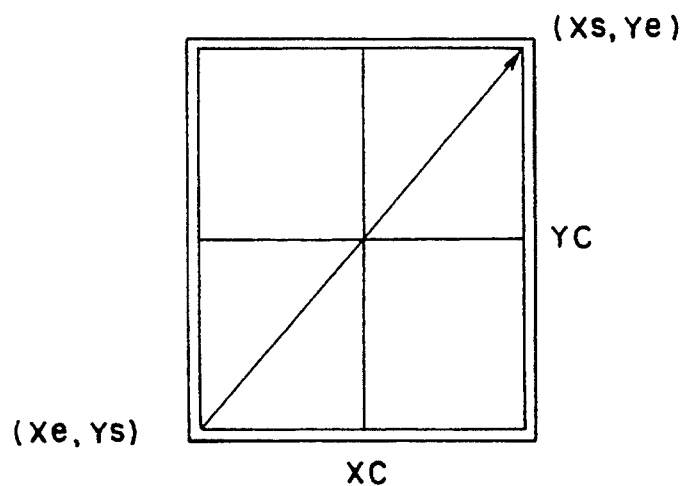
FIG. 13 illustrates the computation of count S2.

Value #2:S2; Diagonal / Absolute Count (FIG. 13)

This routine generates a count of ridges contained on the diagonal line drawn from point (Xs,Ye) to (Xe,Ys). Since the "window" is an absolute square, this relationship is a one-for-one increment along the Y-Axis for each decrement along the X-Axis, starting at Xs, and ending at Xe.

Value #3: Yam; Y-Axis A-Range Maximum Absolute Count (FIG. 14)

This routine yields the highest number of ridges found on a horizontal line in the Y-Axis "A-Range". The Y-Axis "A-Range" is defined as: Ys $\leq$ horizontal line $<$ YC.

Figure 14:
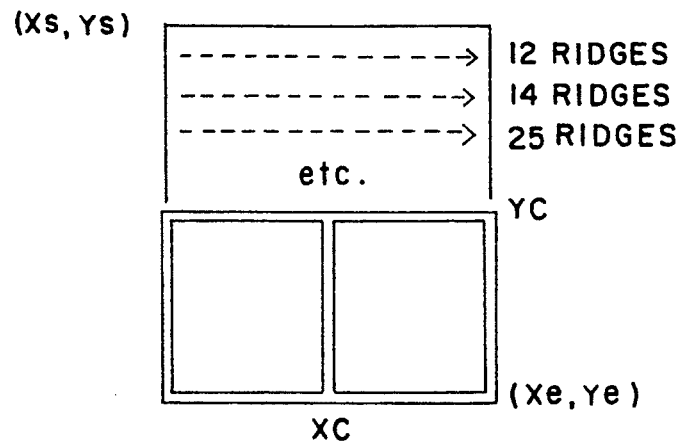
FIG. 14 illustrates the computation of count Yam.

In the example of FIG. 14, of the horizontal lines counted, the value of "Yam" would be set to "25", assuming that no other horizontal line contained a ridge count greater than 25. The "A-Range" is indicated with single-line borders.

Value #4: Ybm; Y-Axis B-Range Maximum Absolute Count (FIG. 15)

This routine yields the number of highest number of ridges found on a horizontal line in the Y-Axis "B-Range". The Y-Axis "B-Range" is defined as: YC $<$ horizontal line $\leq$ Ye.

Figure 15:
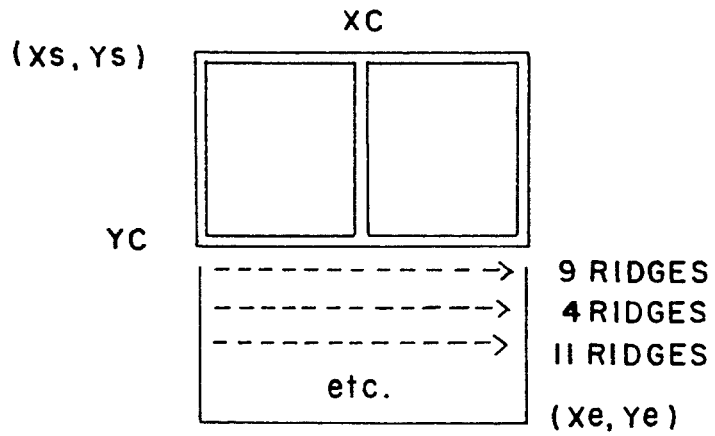
FIG. 15 illustrates the computation of count Ybm.

In the example of FIG. 15, of the horizontal lines counted, the value of "Ybm" would be set to "11", assuming that no other horizontal line contained a ridge count greater than 11. The "B-Range" is indicated with single-line borders.

Values #5 & 6: Ya; Y-Axis A-Range Average Count (FIG. 16)

This routine yields the total number or ridges found on horizontal lines in the Y-Axis "A-Range". For computation purposes, this "overall total" is stored as two numbers, Ya$\alpha$ and Ya$\beta$. Ya$\alpha$ is the total number of 256 ridges in the "overall total" (i.e.: if Ya$\alpha$ is "2" then there are at least 512 ridges in the "overall total"). Ya$\beta$ is the remaining number of ridges counted (i.e.: 6) which is always a number under 256. The Y-Axis "A-Range" is defined as: Ys $\leq$ horizontal line $<$ YC.

Figure 16:
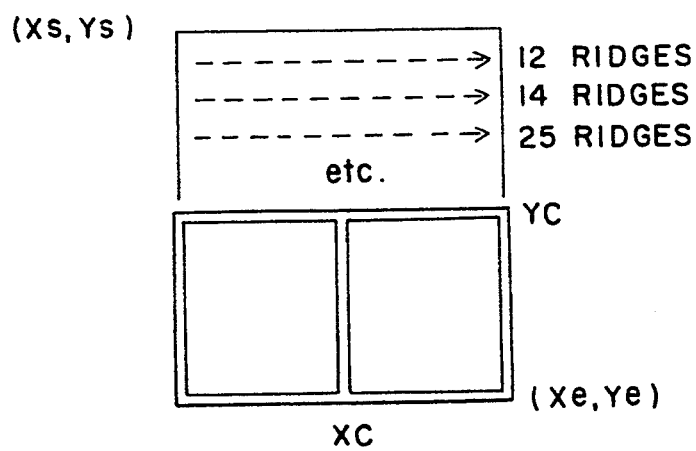
FIG. 16 illustrates the computation of count Ya.

In the example of FIG. 16, if the horizontal lines summed to 516, the value of "Ya$\alpha$" would be set to "2", and the value of "Ya$\beta$" would be set to "4". The "A-Range" is indicated with single-line borders.

Values #7 & 8: Yb; Y-Axis B-Range Average Count (FIG. 17)

This routine yields the total number of ridges found on horizontal lines in the Y-Axis "B-Range". For computation purposes, this "overall total" is stored as two numbers, Yb$\alpha$ and Yb$\beta$. Yb$\alpha$ is the total number of 256 ridges in the "overall total" (i.e.: if Yb$\alpha$ is "2" then there are at least 512 ridges in the "overall total"). Yb$\beta$ is the remaining number of ridges counted (i.e.: 6) which is always a number under 256. The Y-Axis "B-Range" is defined as: YC $<$ horizontal line $\leq$ Ye.

Figure 17:
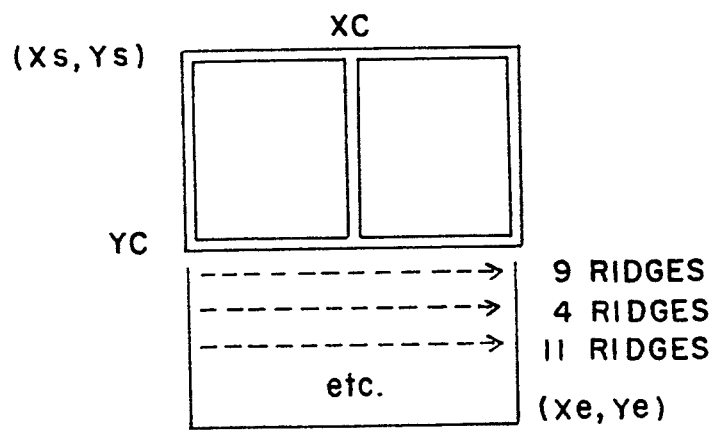
FIG. 17 illustrates the computation of count Yb.

In the example of FIG. 17, if the horizontal lines summed to 300, the value of "Yb$\alpha$" would be set to "1", and the value of "Yb$\beta$" would be set to "44". The "B-Range" is indicated with single-line borders.

Figure 18:
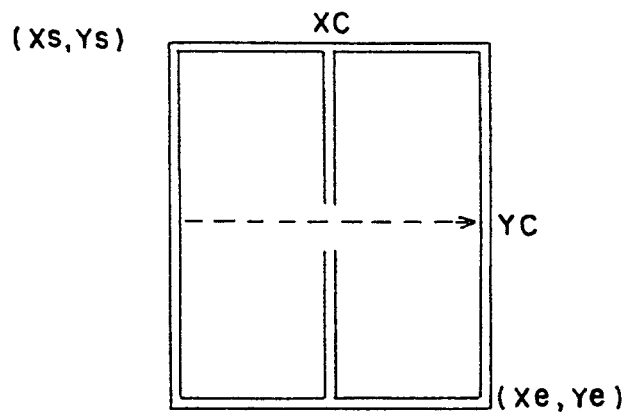
FIG. 18 illustrates the computation of count Yc.

Value #9: Yc; Y-Axis Center Line Absolute Count (FIG. 18)

This routine yields the number or ridges found on the horizontal line on the Y-Axis defined as YC, or Y-Center Line. This would be a whole number, such as 7, if 7 ridges were counted on the Y-Center Line.

Value #10: Xam; X-Axis A-Range Maximum Absolute Count (FIG. 19)

This routine yields the number of highest number of ridges found on a vertical line on the X-Axis "A-Range". The X-Axis "A-Range" is defined as: Xs $\leq$ vertical line $<$ XC.

Figure 19:
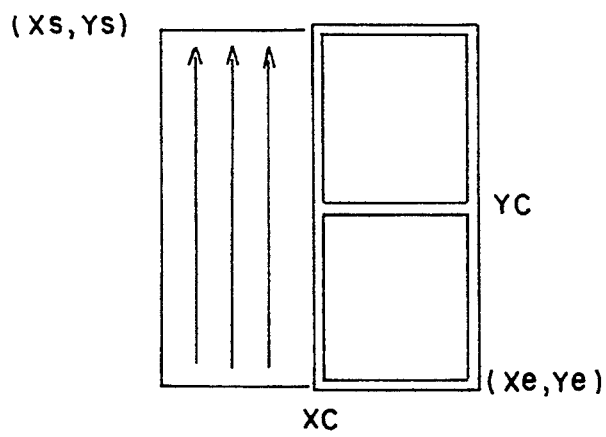
FIG. 19 illustrates the computation of count Xam.

In the example of FIG. 19, of the vertical lines counted, the value of "Xam" would be set to "15" assuming that no other vertical line contained a ridge count greater than 15. The "A-Range" is indicated with single-line borders.

Value #11: Xbm; X-Axis B-Range Maximum Absolute Count (FIG. 20)

This routine yields the number of highest number of ridges found on a vertical line in the X-Axis "B-Range". The X-Axis "B-Range" is defined as: XC $<$ vertical line $\leq$ Xe.

Figure 20:
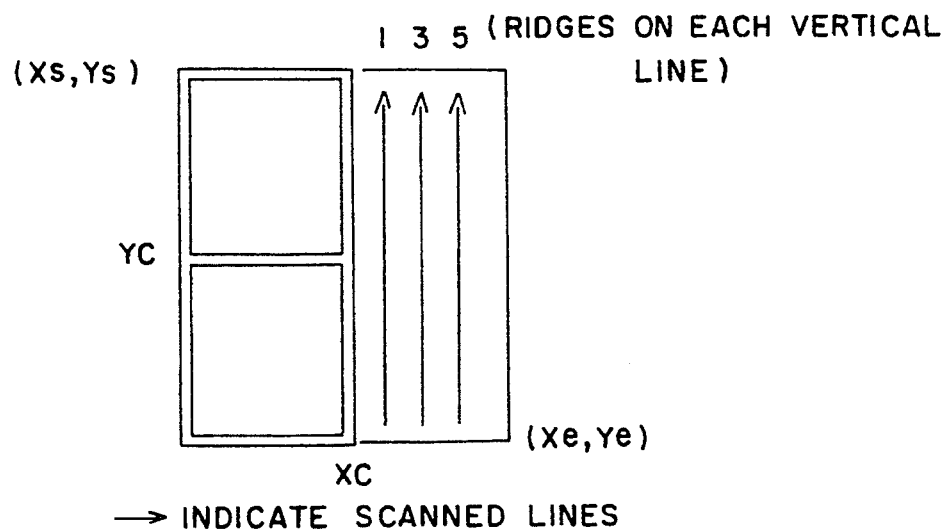
FIG. 20 illustrates the computation of count Xbm.

In the example of FIG. 20, of the horizontal lines counted, the value of "Xbm" would be set to "5", assuming that no other vertical line contained a ridge count greater than 5. The "B-Range" is indicated with single-line borders.

Values #12 & 13: Xa; X-Axis A-Range Average Count (FIG. 21)

This routine yields the total number or ridges found on the vertical lines in the X-Axis "A-Range". For computation purposes, this "overall total" is stored as two numbers, Xa$\alpha$ and Xa$\beta$. Xa$\alpha$ is the total number of 256 ridges in the "overall total" (i e: if Xa$\alpha$ is "2" then there are at least 512 ridges in the "overall total") Xa$\beta$ is the remaining number of ridges counted (i.e.: 6) which is always a number under 256. The X-Axis "A-Range" is defined as: Xs $\leq$ vertical line $<$ XC.

Figure 21:
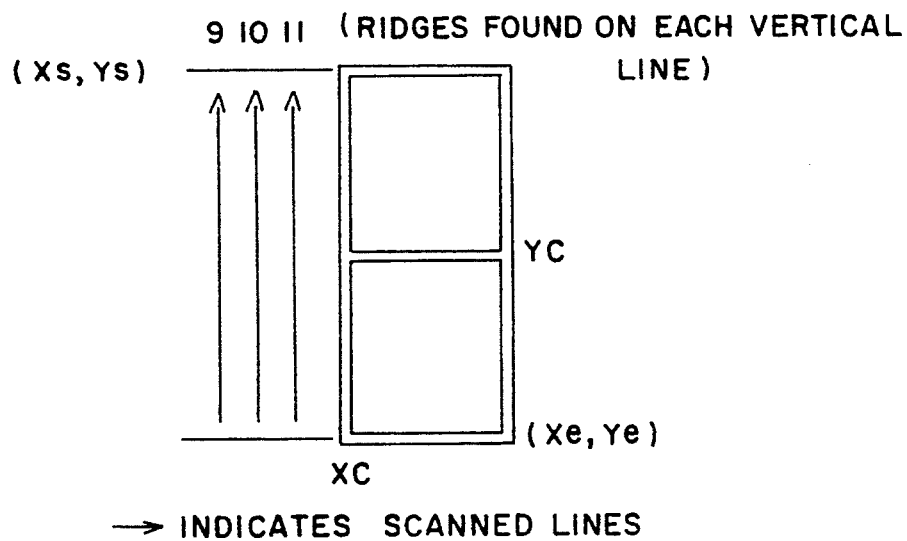
FIG. 21 illustrates the computation of count Xa.

In the example of FIG. 21, if the vertical lines summed to 516, the value of "Xa$\alpha$" would be set to "2", and the value of "Xa$\beta$" would be set to "4". The "A-Range" is indicated with single-line borders.

Values #14 & 15: Xb; X-Axis B-Range Average Count (FIG. 22)

This routine yields the total number of ridges found on vertical lines in the X-Axis "B-Range". For computation purposes, this "overall total" is stored as two numbers, Xb$\alpha$ and Xb$\beta$. Xb$\alpha$ is the total number of 256 ridges in the "overall total" (i.e.: if Xb$\alpha$ is "2" then there are at least 516 ridges in the "overall total"). Xb$\beta$ is the remaining number or ridges counted (i.e.: 6) which is always a number under 256. The X-Axis "B-Range" is defined as: XC<vertical line≦Xe.

Figure 22:
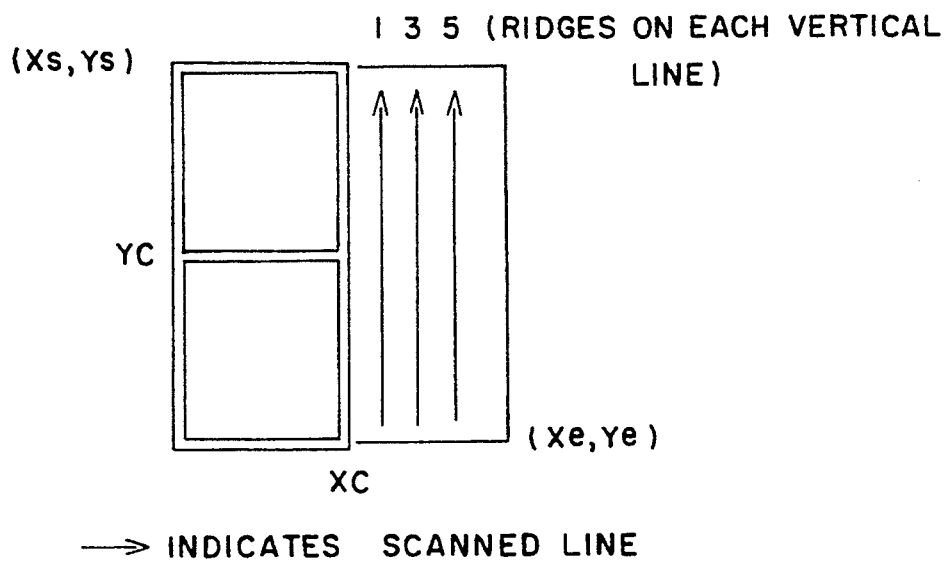
FIG. 22 illustrates the computation of count Xb.

In the example of FIG. 22, if the vertical lines summed to 300, the value of "Xbα" would be set to "1", and the value of "Xbβ" would be set to "44". The "B-Range" is indicated with single-line borders.

Figure 23:
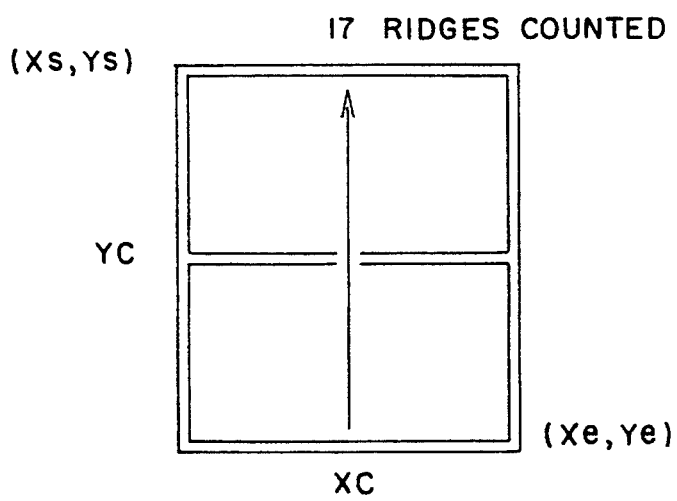
FIG. 23 illustrates the computation of count Xc.

Value #16: Xc; X-Axis Center Line Absolute Count (FIG. 23)

This routine yields the number of ridges found on the vertical line on the X-Axis defined as XC, or X-Center Line. This would be a whole number, such as 17, if 17 ridges were counted on the X-Center Line.

Generated Data Matrix

Key:
S1—Diagonal \ Absolute Count
S2—Diagonal / Absolute Count
Yma—Y-Axis A-Range Maximum Absolute Count
Ymb—Y-Axis B-Range Maximum Absolute Count
Ya—Y-Axis A-Range Average Count
Yb—Y-Axis B-Range Average Count
Yc—Y-Axis Center Line Absolute Count
Xma—X-Axis A-Range Maximum Absolute Count
Xmb—X-Axis B-Range Maximum Absolute Count
Xa—X-Axis A-Range Average Count
Xb—X-Axis B-Range Average Count
Xc—X-Axis Center Line Absolute Count

| Generated Data Matrix: | | | | | | | | | | | |
|---|---|---|---|---|---|---|---|---|---|---|---|
| 01 | 02 | 03 | 04 | 05 | 06 | 07 | 08 | 09 | 10 | 11 | 12 |
| S1 | S2 | Yma | Ymb | Ya | Yb | Yc | Xma | Xmb | Xa | Xb | Xc |

With reference to the Generated Data Matrix, the Verification Data Generation Routine will now be presented.

This routine takes the output of the Algorithm Data Generation Routine and creates the "Generated Data Matrix". For a full understanding of this process, refer to the two tables: "Algorithm Output Data" and "Generated Data Matrix" presented above.

The first element in the GDM (Generated Data Matrix) is equal to the value of the first number in the AOD (Algorithm Output Data). This element is known as "S1", or the "Diagonal \ Absolute Count".

The second element in the GDM is equal to the value of the second number in the AOD. This element is known as "S2", or the "Diagonal / Absolute Count".

The third element in the GDM is equal to the value of the third number in the AOD. This element is known as "Yam" or the "Y-Axis A-Range Maximum Absolute Count".

The fourth element in the GDM is equal to the value of the fourth number in the AOD. This element is known as "Ybm", or the "Y-Axis B-Range Maximum Absolute Count".

The fifth element in the GDM is a calculated value using the fifth and sixth numbers in the AOD. The calculated value can be indicated as follows:

$$\text{value} = (\text{fifth} * 256 + \text{sixth}) \div (\text{window-size} \div 2)$$

In other words, the computation is equal to the fifth number in the AOD multiplied by 256, plus the sixth number in the AOD. The result is then divided by ½ the window size to give the calculated value. This element is known as "Ya" or the "Y-Axis A-Range Average Count".

The sixth element in the GDM is a calculated value using the seventh and eighth numbers in the AOD. The calculated value can be indicated as follows:

$$\text{value} = (\text{seventh} * 256 + \text{eighth}) \div (\text{window-size} \div 2)$$

In other words, the computation is equal to the seventh number in the AOD multiplied by 256, plus the eighth number in the AOD. The result is then divided by ½ the window size to give the calculated value. This element is known as "Yb" or the "Y-Axis B-Range Average Count".

The seventh element in the GDM is equal to the value of the ninth number in the AOD. This element is known as "Yc", or the "Y-Axis Center Line Absolute Count".

The eighth element in the GDM is equal to the value of the tenth number in the AOD. This element is known as "Xam" or the "X-Axis A-Range Maximum Absolute Count".

The ninth element in the GDM is equal to the value of the eleventh number in the AOD This element is known as "Xbm" or the "X-Axis B-Range Maximum Absolute Count".

The tenth element in the GDM is a calculated value using the twelfth and thirteenth numbers in the AOD. The calculated value can be indicated as follows:

$$\text{value} = (\text{twelfth} * 256 + \text{thirteenth}) \div (\text{window-size} \div 2)$$

In other words, the computation is equal to the twelfth number in the AOD multiplied by 256, plus the thirteenth number in the AOD. The result is then divided by ½ the window size to give the calculated value. This element is known as "Xa" or the "X-Axis A-Range Average Count".

The eleventh element in the GDM is a calculated value using the fourteenth and fifteenth numbers in the AOD. The calculated value can be indicated as follows:

$$\text{value} = (\text{fourteenth} * 256 + \text{fifteenth}) \div (\text{window-size} \div 2)$$

In other words, the computation is equal to the fourteenth number in the AOD multiplied by 256, plus the fifteenth number in the AOD. The result is then divided by ½ the window size to give the calculated value. This element is known as "Xb", or the "X-Axis B-Range Average Count".

The twelfth element in the GDM is equal to the value of the sixteenth number in the AOD This element is known as "Xc" or the "X-Axis Center Line Absolute Count".

Fingerprint Identification System Data Confirmation Routine

This routine is responsible for comparing the Comparison Data Matrix (CDM) against the Generated Data Matrix (GDM,) and determining if the fingerprint sample given by the Provider mathematically matches the verification data on the Provider's portable personnel identification means.

Each element of the CDM is compared against its counterpart in the GDM. That is, the first element of the CDM is compared against the first element of the GDM, the second element of the CDM is compared against the second element in the GDM, and so on.

The absolute difference between elements is limited to specific pre-defined "tolerances". These tolerances will vary from application to application, depending on the needs of the end-user. An end-user who wants very strict regulation would have lower tolerances than an end-user who wants average regulation. In other words, one end-user may want ±3 tolerance whereas another might want ±1 tolerance.

As an example, the first through seventh elements will always have one level of tolerance higher than the eighth through twelfth elements. In other words, if the eighth through twelfth elements are measured with a ±2 tolerance, then the first through seventh elements will have a tolerance of ±3.

To determine whether or not a fingerprint sample is approved, a "confidence level" has to be achieved. This confidence level starts at zero. When each CDM/GDM element is compared, and the difference falls within the acceptable tolerance, then the confidence level is increased by 8.33%.

The actual confidence level that must be achieved in order for a fingerprint to be "approved" is again determined by the specific application. One end-user might want a higher confidence level than another end-user.

After all elements have been compared, and the confidence level is determined, a flag is set to indicate whether or not the sample has "passed" the confirmation process.

The entire process (2 - Image Capture through 6 - Data Confirmation) is repeated up to 10 times.

If a sample is confirmed two consecutive times, then the fingerprint sample is "approved", an appropriate confirmation message is generated for the Obtainer to view, and the device recycles.

If a sample is rejected two consecutive times, then the fingerprint sample is "failed", an appropriate rejection message is generated for the Obtainer to view, and the device recycles.

If in the ten process cycles the firmware cannot obtain two consecutive "passes" or "failures" then the fingerprint sample is "unable to verify" an appropriate message is generated for the Obtainer to view, and the device recycles.

It should be apparent to any person skilled in the art to which this invention pertains that the disclosure set forth hereinabove with respect to the calculation of the plurality of counts, with reference to either a diagonal line or a horizontal line or a vertical line, pertains to a line of memory data contained within the fingerprint identity window area being analyzed.

The foregoing has been disclosed with respect to a preferred method and system wherein the Generated Data Matrix provides 24 bytes of fingerprint identification data, each element of the GDM containing 2 bytes of verification data. The 24 byte non-minutiae digitized numerical identifier is recordable within the confines of a portable personnel identification means and in particular, the magnetic stripe of a credit card to allow the credit card to be used as an identification card for entitling the user to certain services, as for example, charged purchases and check cashing. This digitized numerical identifier can also be stored in a memory means included in a smart card.

As to the particular application of the invention system and methods for providing a 24 byte non-minutiae digitized numerical identifier which is recordable within the magnetic stripe of a credit card to allow the credit card to be used as a portable personnel identification card, regulations of the American National Standards for financial services, financial transaction cards magnetic stripe encoding, limit the magnetic stripe and coding as follows:

TRACK 1 maximum of 79 alphanumeric characters
TRACK 2 maximum of 40 characters, numeric only
TRACK 3 maximum of 107 alphanumeric characters Various other market applications of the present invention system and methods are as follows:
Retail Credit Card
Government-federal/State/Local
Used to identify the voter; controlling multiple voting Drivers License; control verification of individual for legal drinking age.
System could be used in control of aliens on green cards and work visa's Social Security cards..verification of holder for check cashing requirements.
Military ID cards for all branches.
Control of welfare recipients and check cashing.
Security Market
Banking industry..Automatic Tellers (ATM's), safety deposit boxes.
Professional Market
Medical . . . ID cards.
Education Market
College entrance exams.
Legal Bar Exams.
Other Markets
Passports.
Prisons.
Security..Computer access as well as commercial use.

VARIABLE RESOLUTION

The foregoing presentation of the invention methods for image sizing, image framing, and that set forth with respect to defining a fingerprint identity window, bear reference to a resolution area base 256. It should be apparent that the present invention is not limited to this exemplary resolution area since it is well within the teachings and scope of the present invention to employ a resolution area base 512. Accordingly, it will be apparent to those skilled in the art in light of the foregoing disclosure that the invention should not be limited to a resolution area base 256.

ENCRYPTION/DECRYPTION

Verification String encryption routines can take a myriad of forms. Each scheme is application dependent, meaning that a scheme used for one application will not be used in a similar application—thus reducing the possibility of fraud. Since the scheme for each application is different, and bound in the verification firmware EPROMS, the possibility of unauthorized card duplication is reduced, as duplicated cards for one application would not yield valid verification data in another application. Two exemplary encryption schemes are as follows:

Scheme 1: Digit Reversal Scheme

This "encryption scheme" takes each of the twelve numbers in the Verification String and reverses the digits. In other words, if the Verification String contains the following numbers:

| 01 | 40 | 36 | 24 | 22 | 05 | 10 | 18 | 14 | 21 | 04 | 07 | then the "encrypted" data would appear as follows:

| 10 | 04 | 63 | 42 | 22 | 50 | 01 | 81 | 41 | 12 | 40 | 70 |

To "decrypt" the data in an application program, the programmer need only reverse the digits back to obtain the original numbers.

Scheme 2: Digit Complement Scheme

This "encryption scheme" operates on all 24 digits of the Verification String as a whole, treating each digit as a separate entity. Each digit is subtracted from nine (9) to achieve a "complement" value. For instance:

| 01 | 40 | 36 | 24 | 22 | 05 | 10 | 18 | 14 | 21 | 04 | 07 | would appear as follows once encrypted:

| 98 | 59 | 63 | 75 | 77 | 94 | 89 | 81 | 85 | 78 | 95 | 93 |

This complement scheme has the same affect as taking each of the twelve numbers and subtracting each number from ninety-nine (99) to achieve the "encrypted" value.

To reverse the process, the user only need to subtract 9 from each of the 24 encrypted digits to achieve the original number (ignoring the negative sign).

As stated above, data encryption will vary from application to application, to avoid multiple applications from having similar verification data, and thus introducing potential misuse of the encrypted verification data. The encryption method is decided in advance, and appropriate decryption logic is programmed into the Comparison Data Retrieval Routine, such that the decrypter logic and means of implementation are contained in the BCC52 processor of the system invention.

As to the implementation of the encryption scheme aspect of the present invention, in addition to providing a fingerprint sample, the Provider also presents identification card means (i.e., identification card with a magnetic stripe) which contains his or her encrypted verification data (i.e., encrypted digitized numerical identifier), the identification card is then placed in the card reader for retrieval and decryption of the "comparison data".

Upon decryption, the "comparison data" is stored in a 12 element array, known as the "Comparison Data Matrix" which has the same layout as the "Generated Data Matrix" presented hereinbefore.

If any errors are encountered during this retrieval process, then an appropriate error message is generated and the system recycles. Such error messages are specific to the individual application (i.e., a system with a magnetic stripe card reader would have a "Card Reader Error" or a "Channel Read Error" error message). Furthermore, the encrypted identifier could also be included on a check payable within a check cashing identity verification application of the present invention.

As set forth in the appended claims, the present invention is applicable to: recording an encrypted or non-encrypted non-minutiae digitized numerical identifier within the confines of a portable personnel identification means, personal to a person, such as a credit card or a smart card; identity verification of a person to be identified with or without an encryption scheme; and payable check verification of identity of payee, with or without encryption.

As to the recording application, two services could be performed: (1) direct or indirect personal contact with the persons to be identified, deriving non-minutiae digitized numerical identifiers indicative of the fingerprints of such persons, and recording the non-minutiae digitized numerical identifiers within identification means, personal to such persons; or (2) performing such a service but providing the derived non-minutiae digitized numerical identifiers to another party for the performance of the recording procedure.

As to the Identity Verification Application of the present invention, this could be accomplished with direct or indirect personal contact with persons to be identified.

With regard to the payable check verification of identity of a check payee, the check payable could include a numerical identifier to be verified with a digitized numerical identifier indicative of a fingerprint of a check payee named on the check payable, or preferably no numeric identifier would be included on the check payable and verification of the identity of the person submitting the check payable in a check cashing application would be accomplished by verification of comparison of a non-minutiae digitized numerical identifier indicative of a fingerprint of a person submitting the check for cashing, with the numerical identifier contained within a portable personnel identification means submitted by such person for identification as the check payee of the check payable.

With reference back to the identification verification application of the present invention, where verification of identity is accomplished by comparing the numerical identifier of identification means with the non-minutiae digitized numerical identifier derived from a fingerprint of such person to be identified, upon finding non-verification, the portable personnel identification means would be withheld by the invention system, or in the case where a smart card is presented as the identification means, the functional integrity of such smart card could be destroyed by known techniques and devices incorporated into the system invention.

Thus, it is apparent that there has been provided, in accordance with the invention, an identification system that fully satisfies the objectives, aims and advantages set forth above. While the invention methods have been described in conjunction with specific applications thereof, it is evident that many alternatives, modifications and variations will be apparent to those skilled in the art in light of the foregoing description. Accordingly, it is intended to embrace all such alternatives, modifications and variations which fall within the spirit and scope of the appended method claims.

The terms and expressions which have been employed in the foregoing specification are used therein as terms of description and not solely of limitation, and there is no intention, in the use of such terms and expressions, of excluding equivalents of the features shown and described or portions thereof, it being recognized that the scope of the invention is defined and limited only by the appended method claims.

FINGERPRINT IDENTIFICATION SYSTEM INVENTION

A description of the system invention will now be presented with reference to FIGS. 24–32 which are illustrative of the system invention, and FIGS. 4–6B and FIGS. 33 and 34 which provide flow charts which are descriptive of the operation control of the system invention.

Figure 24:
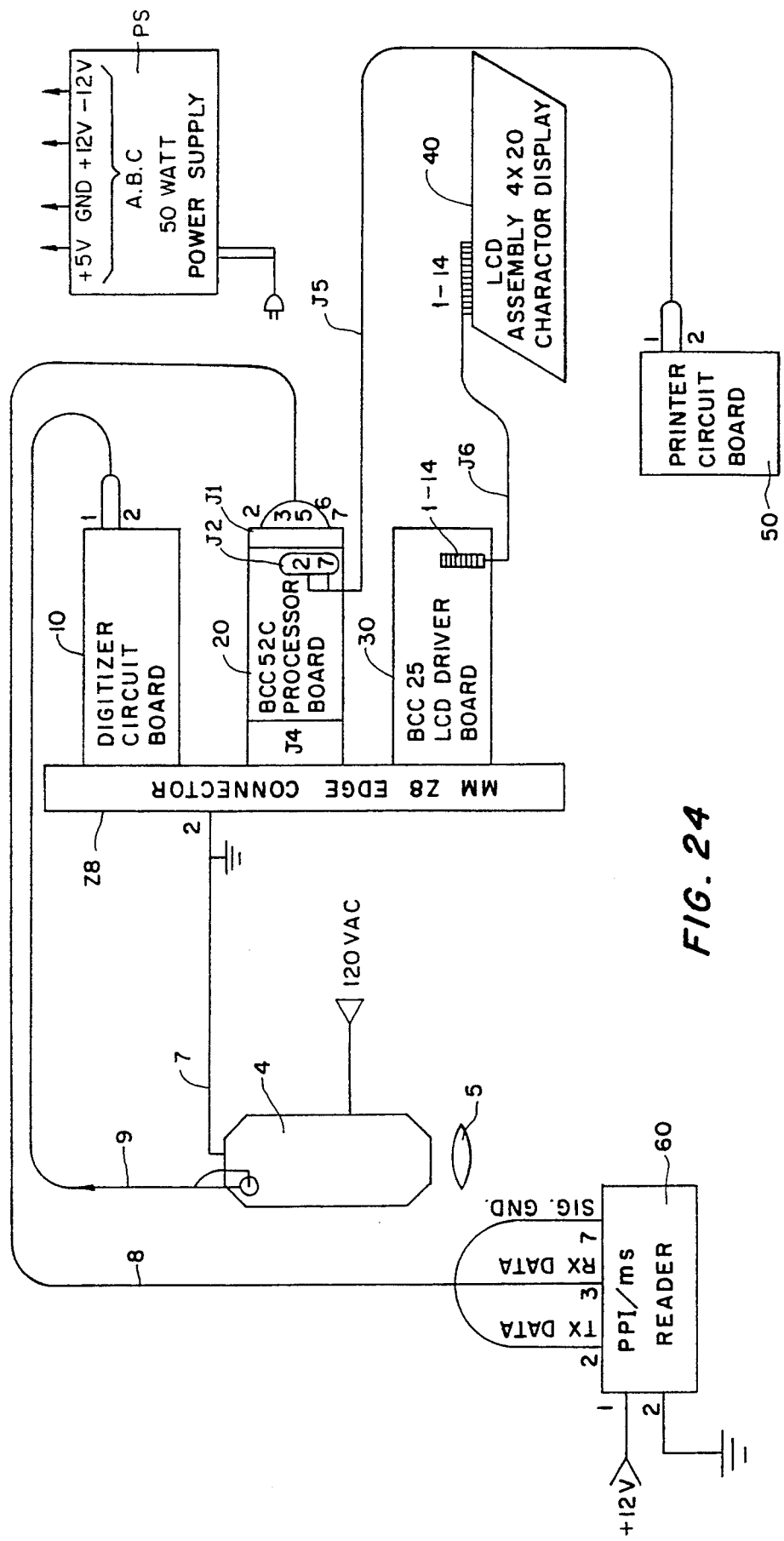
FIG. 24 depicts a block diagram of the system invention.

FIG. 24 is a block diagram of the invention system which shows the basic interconnection of the system components including the video camera 4, and the accessories LCD display 40, printer means 50, and PPI/MS Reader 60. An illustrative power supply means PS for providing appropriate voltage supply to the system components is also shown.

The system invention can be embodied in three specific configurations which differ from each other as to the application of the system invention and the components utilized for a respective application. Each of the three embodiments incorporate the following: an inkless framed format holder means 3, video scanning means 4, lens 5, digitizer 10, processor 20, LCD driver means 30, a four-slot motherboard bus connector Z8, and a portable personnel identification card reader means 60.

Prior to presenting a description for each embodiment of the system invention, the basic system as depicted in FIG. 24 will now be described.

Video scanner 4 scans an inkless format means providing an image of a fingerprint of a person to be identified, after this fingerprint image format 1 is placed within the inkless format holder means 3 which automatically positions the format 1 in relation to the video scanner 4 in such a way that the position is predetermined and will be reestablished each time that a print format means is placed before the video scanner, thus insuring that a subsequent scanning operation will always produce consistent and reliable field of scan results.

As shown in FIG. 24, the video output of scanner 4 is connected to digitizer 10 via a shielded coaxial cable 9. The video scanner 4 receives power from the 120 volts AC supply, and a ground is provided via line 7 from pin 2 of Z8. In operation, the video scanner scans the image of a fingerprint provided on an inkless means 2 to produce fingerprint image data and whitespace data which is outputed to the video digitizer board 10.

The primary function of the video digitizer board 10 is to convert the fingerprint image and whitespace data signals from the video scanner into digital image data i.e., numerical data, which digital image data is stored in an addressable memory means, RAM, included in the digitizer 10. Thus, the stored digital image data is then available to the system program-controlled processor 20 for evaluation of the scanned image data information.

The scanned image data information contained in the video camera output signal is made up of discrete points of picture elements, commonly called pixels. Each pixel varies in brightness, depending on the image scanned, through a range of "grey levels" from black to white. In digitizer 10, these grey levels are separated into 16 numerical values from 0 (black) to 15 (white). Each horizontal line of the image data being viewed contains 256 pixels and the circuitry of the digitizer samples 256 lines. This results in 65,536 pixels or discrete numerical values that the digitizer must store in its random access memory means. Since the pixels are supplied in a scanning sequence (from left to right in the viewed image) it is necessary that the sampling in some subsequent storage of the pixel values be synchronized with camera scanning sequence. Signals are provided, along with the fingerprint image and whitespace data outputed from the camera. These combined signals, image and sync, are commonly referred to as "composite video".

Circuit means of the digitizer functions to extract both horizontal (line) and vertical (frame) synchronization signals. Other circuitry of the digitizer 10 allows the system microprocessor 20 to control a variety of functions under software control. The primary function of the digitizer 10, as referred to earlier, is to convert the scanned image data into numerical values for later evaluation by the software controlled processor. The operation of the digitizer 10 of the invention is well known to those skilled in the art and a specific designation of a digitizer utilized in the system invention is presented hereinafter along with designations for the other components incorporated into the present system.

The program-controlled processor means 20 selectively analyzes a plurality of different fingerprint pattern parts of the digital image data contained in the digitizer, and the processor includes means for accomplishing the inventive methods set forth in the foregoing, such as means for computing a ridge count for each of the plurality of selectively analyzed different fingerprint pattern parts, means for compiling a data matrix comprised of ridge counts computed for these different fingerprint pattern parts, means to provide a non-minutiae digitized numerical identifier indicative of the image of the fingerprint of a person to be identified, and means for comparing the numerical identifier provided by the card reader 60 with the non-minutiae digitized numerical identifier, to verify the identity of a person to be identified. Reference to the foregoing description will also provide information as to the other inventive methods of the invention such as that set forth for Image Capture, Image Sizing and the defining of a fingerprint identity window.

The flow charts illustrated in FIGS. 4–6B, 33 and 34 provide the system operations performed by the processor means 20 under software control.

The LCD Driver means 30 communicates with the processor 20 via J4 and Z8, and its output is connected to LCD display means 40 via connector J6.

Printer 50 is connected to processor 20 via connector J5.

A portable personnel identification means magnetic-stripe reader 60 is connected to processor 20 via RS-232-C, 25 pin serial connector 8 and connector J1. This reader is provided with a simple reset circuit (not shown) to initialize the control microprocessor when power is first supplied to the system.

Appendix A attached hereto describes the software utilized in the system of the invention.

The disclosure set forth hereinabove and attached hereto, with reference to the drawings, will enable any person skilled in the art to which this invention pertains, to assemble and operate the system invention in accordance with the inventive methods provided herein.

The specific circuitry incorporated in the particular embodiment of an automatic fingerprint identification system constructed in accordance with the present invention and described with reference to the respective drawings, can be constructed from discrete elements more advantageously as from integrated circuits. The following Table lists examples of such components.

TABLE A

| Component | Description |
| --- | --- |
| Inkless material | Identicator Corporation |
| Video camera | Associated Systems Model # TC1886, |
| Camera lens | 16 mm, F/1.6 (no iris) |
| PPI/MS card reader | American Magnetics Corporation- |

TABLE A-continued

| Component | Description |
| --- | --- |
| | Model 101 |
| Smart card reader | Microcard Technologies |
| Video digitizer | VIP Ltd - Model # D10010 |
| Processor | Micromint, Inc. - Model # BCC52C |
| LCD Driver | Micromint, Inc. - BCC25, BCC52C ROM A&B, MB04 Passive Backplane |
| Printer | Printer Products - Dot Matrix Printer-40 columns |

The MBO 4-slot motherboard Z8 is an 8 BUS configuration. The processor BCC52C contains RAM/EPROM, an EPROM programmer, 3 parallel ports, and 2 serial ports.

SYSTEM EMBODIMENTS

Figure 29:
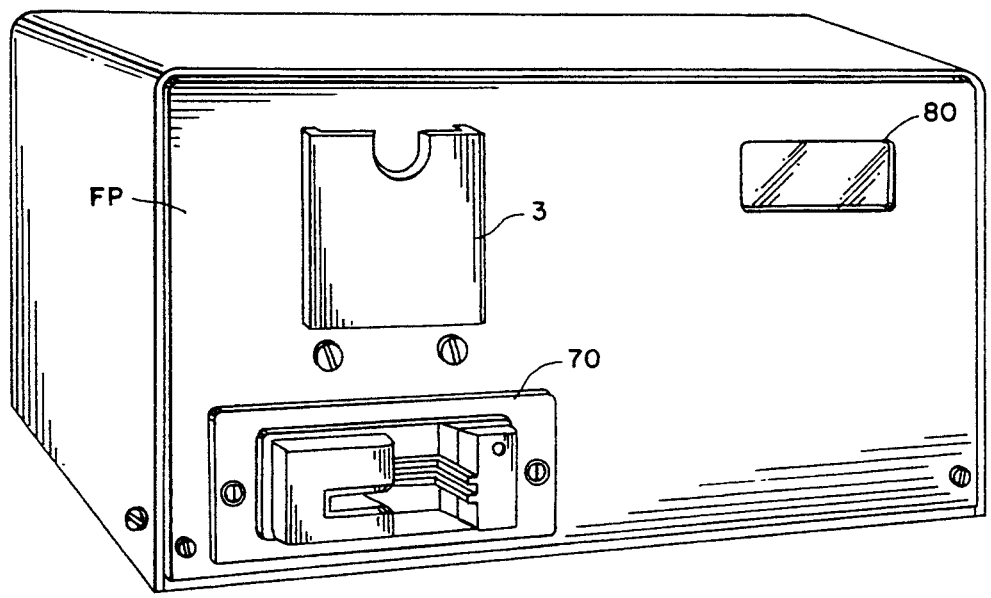
FIG. 29 illustrates one embodiment of the system invention employed in application pertaining to personnel identity verification, which embodiment incorporates the use of PPI/MS Reader 60.

FIG. 29 illustrates a first embodiment of the system invention which incorporates a PPI/MS Reader 60, card entry means 70 and an LCD display window 80 to display messages from LCD assembly 40, this embodiment being devoid of a printer. The fingerprint format holder means 3 for positioning a fingerprint format in a predetermined scanned position is shown. This holder means 3 is fixedly attached to the faceplate FP of the housing. The faceplate FP includes an appropriately positioned, square-hole, around which the format holder means is attached in a predetermined position. This allows the video camera 4 to have viewing access to the fingerprint image contained within a fingerprint format means 1 after it is placed within the fingerprint format holder 3.

The faceplate has mounted on its inner side electroeluminance lamps which illuminate the field of view of the video camera. One of the lamps is mounted in a predetermined position, angled downwardly from the top of the hole, and the other lamp is appropriately mounted and angled from the bottom of the hole.

Figure 30:
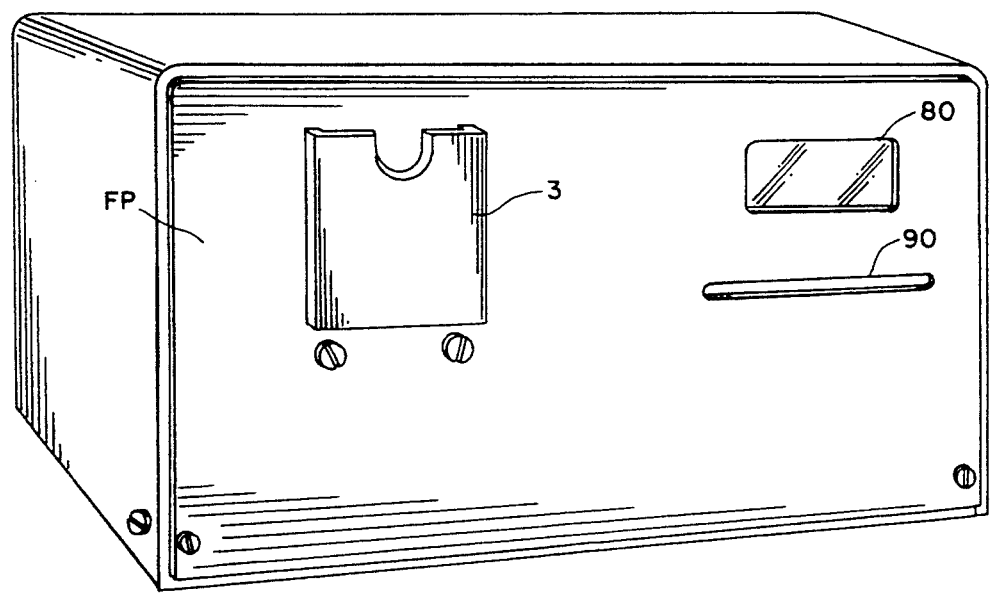
FIG. 30 illustrates a second embodiment of the system invention employed in an application pertaining to personnel identity verification, which embodiment incorporates the use of a smart card identification means.
Figure 33:
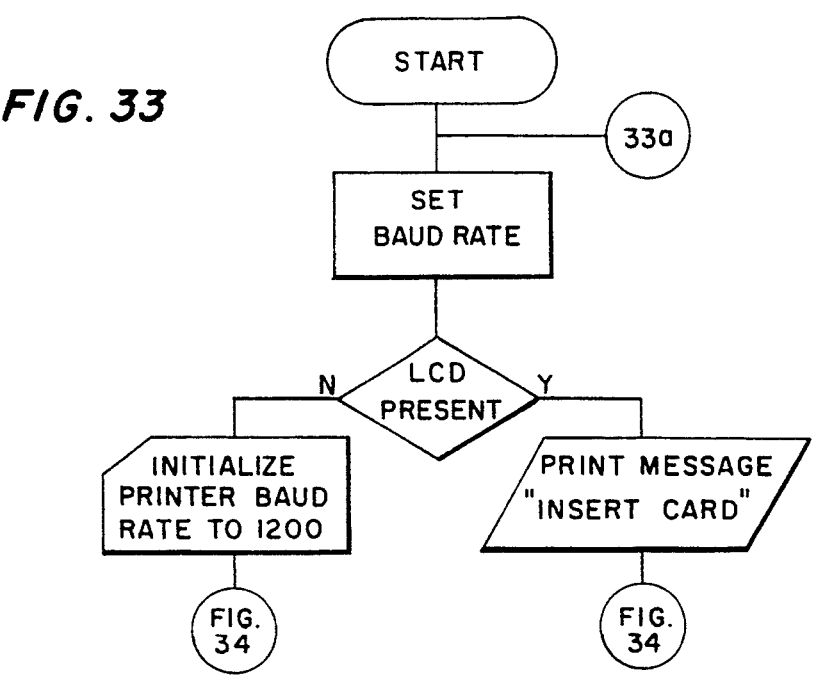
FIG. 33 is a flow diagram of a firmware/software control process of the present invention.
Figure 34:
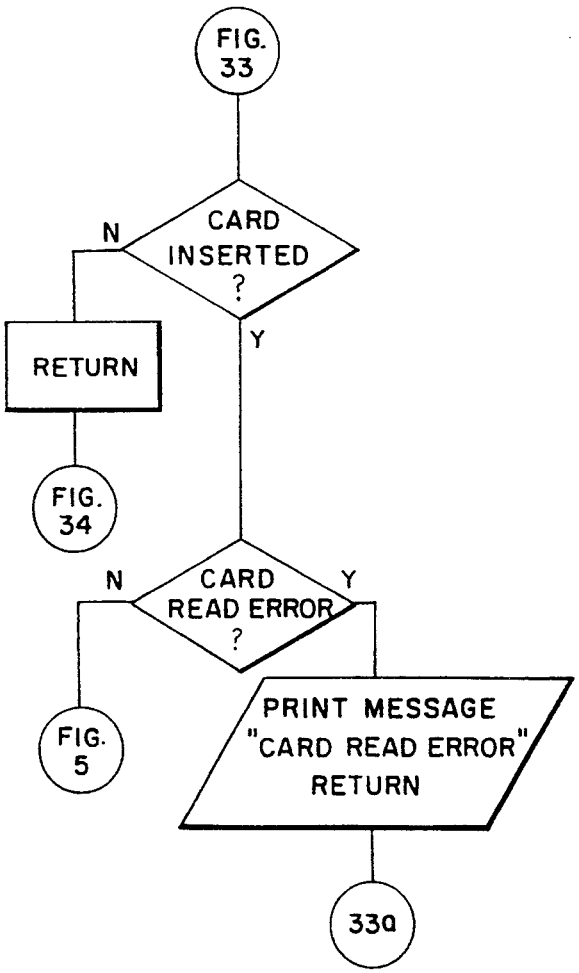
FIG. 34 is a flow diagram of a software process of the invention for card initialization.

FIG. 30 illustrates a second embodiment of the system invention in the application wherein a smart card is provided as the portable personnel identification card means. A smart card reader means (not shown) replaces the PPI/MS reader 60 in the basic system circuitry, and a smart card access slot means 90 is provided to allow entry of the smart card into the smart card reader. This embodiment incorporates the same LCD components, and is devoid of a printer.

FIG. 31 illustrates a third embodiment of the system invention application to payable check verification of identity of a check payee, as set forth hereinbefore. This embodiment employs an identification card reader means 60 and associated means 70, or can employ an appropriate smart card reader means when a smart card is used as the personnel identification card means. Printer means 50 is incorporated in this embodiment to print on a check payable an identification verification message, or any other message provided by this system invention. Slots 92 and 94 are provided to allow access to and from the printer which is accomplished by inserting a check payable into slot 94, and after the system operation is completed, the check will be returned via slot 92.

The specific operations of each of the three embodiments described above is set forth in the foregoing description and in the appended claims.

Thus, it is apparent that there has been provided, in accordance with the system invention, a non-minutiae automatic fingerprint identification system that fully satisfies the objectives, aims and advantages set forth above. While the invention system has been described in conjunction with specific embodiments thereof, it is evident that many alternatives, modifications and variations will be apparent to those skilled in the art in light of the foregoing description. Accordingly, it is intended to embrace all such alternatives, modifications and variations which fall within the spirit and scope of the appended system claims.

APPENDIX

* ROM1.ASM *

```
****************************************************************************
*  The XSTART module is used to analyze where the X-START and X-END values  *
*  on the X-Axis exist. These values indicate where the image exists on the *
*  X-Axis. To accomplish this, each vertical line on the digitizer card is  *
*  examined multiple times. Once three consecutive columns of whitespace are*
*  found, the next vertical line containing a greylevel other than whitespace*
*  is considered to be either X-START or X-END. This module is called twice *
*  by the BASIC Image Sizing Routine, once to scan from left to right to    *
*  determine the value of X-START, and a second time to scan from right to  *
*  left to determine the value of X-END.                                    *
*   The below lines of code are the Entry Point and Initialization routine  *
*  for this module. The ORIGIN of the code is set to 9D00H, where it will   *
*  live on the EPROM. Memory Location 1EH, which is used as the "whitespace *
*  columns counter" keeps track of the number of consecutive vertical lines *
*  of whitespace. Here, it is initialized to the value 00H, to indicate that*
*  no columns have been found yet.                                          *
****************************************************************************
```

| ADDR | OP Codes | Labels/Mnemonics | Comments |
|------|----------|------------------|----------|
| 9D00 |          | XSTART: ORG 9D00H LOC 4000H | ; Set Module Entry Point |
| 9D00 | 75 1E 00 | MOV 1EH,#00H | ; Initialize Row Counter |

```
*********************************************************************
* The YRESET routine resets values pertinent to each vertically analyzed *
* line in this module. First, a "working" Y-Axis value is set to the    *
* starting value of the Y-Axis scan direction. A "working" area is used as *
* the Y-Axis is scanned numerous times thus preventing use of the actual *
* Memory Location which contains Y-TOP. After the Working Y-Axis value is *
* set, Memory Location 1DH is set to the hexidecimal value 0FH. This Memory *
* Location keeps track of the Minimum Greylevel found on the working Y-Axis *
* column. The importance of this value will become evident later.        *
*********************************************************************
```

| 9D03 | 85 1A 21 | YRESET: MOV 21H,1AH | ; Reset Working Y Val |
| 9D06 | 75 1D 0F | MOV 1DH,#0FH | ; Reset Min Grey Val |

```
*********************************************************************
* The YLOOP routine is responsible for analysis of each vertical line. It *
* determines what the minimum Greylevel value is on each vertical line.  *
* -The current X-Axis value is retrieved from Memory Location 18H. This *
* value is then output to the Digitizer card's "X-Port" register, located at *
* External Memory Location 0C003H.                                       *
* The Working Y-Axis value is retrieved from Memory Location 21H. This  *
* value is then output to the Digitizer card's "Y-Port" register, located at *
* External Memory Location 0C002H.                                       *
* Upon setting the X and Y coordinates, two NOP instructions are executed *
* to "delay" the Greylevel retrieval process, to give the Digitizer card up *
* to 24 milliseconds to adjust its internal pointers.                    *
* The Greylevel at location (X,Y) is then retrieved via the Digitizer card *
* "Data Port" register, located at External Memory Location 0C002H.      *
* This "New" Greylevel is temporarily stored at Memory Location 20H for  *
* later access.                                                          *
* The 8052 Processor Carry Bit is cleared for subtraction, and the OLD   *
* Greylevel is subtracted from the NEW Greylevel. If the Carry Bit is not *
* set after subtraction, this means that the NEW value is greater than the *
* OLD value, and program flow is transferred to the YNEXTY routine.      *
* If the Carry Bit IS set, this means that the NEW Greylevel is less than *
* the OLD Greylevel. Because the subtraction routine destroys the value in *
* the Accumulator, the "stored" NEW Greylevel is moved to the OLD Greylevel *
* Memory Location.                                                       *
*********************************************************************
```

| 9D09 | E5 18    | YLOOP: MOV A,18H     | ; Get X coordinate into ACC |
| 9D0B | 90 C0 03 | MOV DPTR,#0C003H     | ; Set X-Port Extern Mem Loc |
| 9D0E | F0       | MOVX @DPTR,A         | ; Move ACC to set X-Port |
| 9D0F | E5 21    | MOV A,21H            | ; Get Working Y coordinate |
| 9D11 | 90 C0 02 | MOV DPTR,#0C002H     | ; Set Y-Port Extern Mem Loc |
| 9D14 | F0       | MOVX @DPTR,A         | ; Move ACC to set Y-Port |
| 9D15 | 00       | NOP                  | ; Delay 1 machine cycle |
| 9D16 | 00       | NOP                  | ; Delay 1 machine cycle |
| 9D17 | 90 C0 01 | MOV DPTR,#0C001H     | ; Set Data-Port Loc |

```
9D1A  E0         MOVX A,@DPTR        ; Get NEW GreyLevel Val
9D1B  F5 20      MOV  20H,A          ; Store NEW Greylevel Val
9D1D  C3         CLR  C              ; Clear Carry Bit
9D1E  95 1D      SUBB A,1DH          ; Subtract OLD Greylevel
9D20  50 03      JNC  YNEXTY         ; If NEW>OLD, goto next Y
9D22  85 20 1D   MOV  1DH,20H        ; Store NEW Grey as OLD
```

```
***********************************************************************
*  The YNEXTY routine increments the Y-Axis position, and transfers control  *
*  back to the YLOOP routine to analyze the next Greylevel value. This       *
*  process continues until Y-BOTTOM is reached, indicating that the end of   *
*  vertical line has been reached.                                           *
*  This process is accomplished as follows: The "Increment value" is         *
*  retrieved from Memory Location 1CH into the Accumulator. Then, the Working *
*  Y-Axis Value is added into the Accumulator, giving the new Working Y-Axis *
*  Value. This value is then back at Memory Location 21H, which is used by   *
*  the Y-LOOP routine to set the Y-Axis coordinate for Greylevel value       *
*  retrieval. Note that the "Increment Value" might be a +1 or -1 (or, more  *
*  appropriately, a 01H or FFH, respectively) depending on the direction of  *
*  the X-Axis scan (Left-to-Right is a 01H, Right-to-Left is a FFH.)         *
*  The new Working Y-Axis Value is compared against the ending Y-Value       *
*  stored at Memory Location 1BH. If the values do not match, control of the *
*  module is transferred back to the YLOOP routine for further Greylevel     *
*  analysis.                                                                 *
***********************************************************************
```

```
9D25  E5 1C    YNEXTY: MOV A,1CH     ; Get Axis Increment Val
9D27  25 21            ADD A,21H     ; Add Working Y Val to it
9D29  F5 21            MOV 21H,A     ; Store Val as Working Y
9D2B  B5 1B DB         CJNE A,1BH,YLOOP  ; GOTO YLOOP if not at end
```

```
***********************************************************************
*  The YDONE routine checks to see if 3 consecutive whitespace columns have *
*  been found, and if the current Greylevel is less than 0DH (13 decimal)   *
*  meaning that a "black" value (part of the image) has been found on the   *
*  current X-Axis value. If so, module execution is terminated.             *
*  This is accomplished as follows: Memory Location 1EH, previously defined *
*  as the Whitespace column count, is retrieved into the Accumulator. The   *
*  Carry Flag is cleared, and the value 04H is subtracted from the          *
*  Accumulator. If Carry is Set (ie: Accumulator is less than 04H) then 3   *
*  columns of Whitespace have not been located, thus control is passed to the *
*  YGREY routine.                                                           *
*  If the Carry bit is not set, then at least 3 lines of Whitespace have    *
*  been found. The current minimum Greylevel value is moved from Memory     *
*  Location 1DH into the Accumulator. The Carry Flag is cleared, and 0DH is *
*  subtracted from the Accumulator. If Carry is not set, then the current   *
*  column contains only Whitespace, and control is passed to the YGREY      *
*  routine. Otherwise, at least 3 rows of whitespace have been found, and a *
*  row containing "Black" has been located, so the routine passes control to *
*  the module termination routine.                                          *
***********************************************************************
```

```
9D2E  E5 1E    YDONE: MOV A,1EH      ; Get # of White col in ACC
9D30  C3              CLR C          ; Clear Carry Bit
```

```
9D31  94 04        SUBB A,#04H        ; Subtract 04H from ACC
9D33  40 09        JC   YGREY         ; If not equal to 04, Jump
9D35  E5 1D        MOV  A,1DH         ; Get OLD Greylevel val
9D37  C3           CLR  C             ; Clear Carry
9D38  94 0D        SUBB A,#0DH        ; Subtract 0DH from ACC
9D3A  50 02        JNC  YGREY         ; Jump if ACC> =0DH
9D3C  80 17        SJMP RETX          ; Otherwise, exit module
```

***************************************************************
* YGREY checks to see if the current column contains a value other than *
* Whitespace. If so, the Whitespace Counter is reset to zero. If the column *
* contains only Whitespace, the Whitespace counter is incremented. This is *
* accomplished as follows:                                  *
* The current minimum Greylevel value is moved from Memory Location 1DH *
* into the Accumulator. The Carry Flag is cleared, and 0DH is subtracted *
* from the Accumulator. If Carry is set, then the current column contains a *
* Greylevel considered to be Black, and control is transferred to the YZERO *
* routine.                                                *
* Otherwise, the Whitespace Counter value at Memory Location 1EH is *
* incremented, and control is transferred to the YNEXTX routine, where the *
* next X-Axis value is determined.                         *
***************************************************************

```
9D3E  E5 1D   YGREY:  MOV  A,1DH      ; Move Min Grey Val to ACC
9D40  C3              CLR  C          ; Clear Carry
9D41  94 0D           SUBB A,#0DH     ; Subtract 0DH from ACC
9D43  40 04           JC   YZERO      ; Jump Carry, ACC<0DH
9D45  05 1E           INC  1EH        ; Increment White Counter
9D47  80 03           SJMP YNEXTX     ; Jump to YNEXTX
```

***************************************************************
* YZERO resets the Whitespace Counter at Memory Location 1EH to zero (00H) *
* and module control is passed unconditionally to the YNEXTX routine. *
***************************************************************

```
9D49  75 1E 00 YZERO: MOV  1EH,#00H   ; Reset White Cntr to 00H
```

***************************************************************
* The YNEXTX routine increments the X-Axis position, and transfers control *
* back to the YRESET routine to start analysis of the next vertical line if *
* the end of the X-Axis scan direction has not been reached. *
* This process is accomplished as follows: The "Increment value" is *
* retrieved from Memory Location 1CH into the Accumulator. Then, the current *
* X-Axis Value stored at Memory Location 18H is added into the Accumulator, *
* giving the new X-Axis Value. This value is then back at Memory Location *
* 18H, which is used by the Y-LOOP routine to set the X-Axis coordinate for *
* Greylevel value retrieval. Note that the "Increment Value" might be a +1 *
* or -1 (or, more appropriately, a 01H or FFH, respectively) depending on the *
* direction of the X-Axis scan (Left-to-Right is a 01H, Right-to-Left is a *
* FFH.)                                                   *
* The new current X-Axis Value is compared against the ending X-Value *
* stored at Memory Location 19H. If the values do not match, control of the *
* module is transferred back to the YRESET routine to reset the Y-Axis and *
* Minimum Greylevel values, and proceed to analyze the next vertical line. *
***************************************************************

```
9D4C  E5 1C      YNEXTX:  MOV  A,1CH           ; Get Increment Val to ACC
9D4E  25 18               ADD  A,18H           ; Add X-Axis Val to ACC
9D50  F5 18               MOV  18H,A           ; Store new X-Axis Val
9D52  B5 19 AE            CJNE A,19H,YRESET    ; Jump if not at end
```

**************************************************************
* RETX is the generic module termination routine to which module control *
* is passed when module termination is desired. This can either happen   *
* via an EXPLICIT call from one of the above routines, of an IMPLICIT call *
* from the YNEXTX routine when the end of the X-Axis scan has been reached *
* (meaning three consecutive columns of Whitespace were not found.)      *
**************************************************************

```
9D55  22         RETX:    RET                  ; Return to caller
```

* ROM1.ASM *

**************************************************************
* The YSTART module is used to analyze where the Y-START and Y-END values *
* on the Y-Axis exist. These values indicate where the image exists on the *
* Y-Axis. To accomplish this, each horizontal line on the digitizer card is *
* examined multiple times. Once three consecutive rows of whitespace are *
* found, the next horizontal line containing a greylevel other than      *
* whitespace is considered to be either Y-START or Y-END. This module is *
* called twice by the BASIC Image Sizing Routine, once to scan from top to *
* bottom to determine the value of Y-START, and a second time to scan from *
* bottom to top to determine the value of Y-END.                         *
* The below lines of code are the Entry Point and Initialization routine *
* for this module. The ORIGIN of the code is set to 9D60H, where it will *
* live on the EPROM. Memory Location 1EH, which is used as the "whitespace *
* columns counter" keeps track of the number of consecutive vertical lines *
* of whitespace. Here, it is initialized to the value 00H, to indicate that *
* no columns have been found yet.                                        *
**************************************************************

```
ADDR  OP Codes   Labels/Mnemonics             Comments
----  --------   ----------------             --------

9D60             YSTART:  ORG  9D60H LOC 4060H ; Set Module Entry Point
9D60  75 1E 00            MOV  1EH,#00H        ; Set White Cntr to 00H
```

**************************************************************
* The XRESET routine resets values pertinent to each vertically analyzed *
* line in this module. First, a "working" X-Axis value is set as the start *
* of the Y-Axis scan range. A "working" area is used as the Y-Axis because *
* it is scanned numerous times, thus preventing use of the actual Memory *
* Location which contains the X value.                                   *
*  After the Working X-Axis value is set, Memory Location 1DH is set to the *
* hexidecimal value 0FH. This Memory Location keeps track of the Minimum *
* Greylevel found on the working X-Axis column. The importance of this value *
* will become evident later.                                             *
**************************************************************

```
9D63  85 18 21   XRESET:  MOV  21H,18H         ; Reset X-Axis start Val
9D66  75 1D 0F            MOV  1DH,#0FH        ; Reset Min Grey Val
```

```
****************************************************************
*  The XLOOP routine is responsible for analysis of each horizontal line.  *
*  It determines what the minimum Greylevel value is on each horizontal line. *
*  The Working X-Axis value is retrieved from Memory Location 21H. This   *
*  value is then output to the Digitizer card's "X-Port" register, located at *
*  External Memory Location 0C003H.                                       *
*  The current X-Axis value is retrieved from Memory Location 1AH. This   *
*  value is then output to the Digitizer card's "Y-Port" register, located at *
*  External Memory Location 0C002H.                                       *
*  Upon setting the X and Y coordinates, two NOP instructions are executed *
*  to "delay" the Greylevel retrieval process, to give the Digitizer card up *
*  to 24 milliseconds to adjust its internal pointers.                    *
*  The Greylevel at location (X,Y) is then retrieved via the Digitizer card *
*  "Data Port" register, located at External Memory Location 0C002H.      *
*  This "New" Greylevel is temporarily stored at Memory Location 20H for  *
*  later access.                                                          *
*  The 8052 Processor Carry Bit is cleared for subtraction, and the OLD   *
*  Greylevel is subtracted from the NEW Greylevel. If the Carry Bit is not *
*  set after subtraction, this means that the NEW value is greater than the *
*  OLD value, and program flow is transferred to the XNEXTX routine.      *
*  If the Carry Bit IS set, this means that the NEW Greylevel is less than *
*  the OLD Greylevel. Because the subtraction routine destroys the value in *
*  the Accumulator, the "stored" NEW Greylevel is moved to the OLD Greylevel *
*  Memory Location.                                                       *
****************************************************************

9D69  E5 21    XLOOP:  MOV  A,21H          ; Get Working X-Axis Val
9D6B  90 C0 03         MOV  DPTR,#0C003H   ; Set X-Port Register Loc
9D6E  F0               MOVX @DPTR,A        ; Set X coordinate
9D6F  E5 1A            MOV  A,1AH          ; Get Current Y-Axis Val
9D71  90 C0 02         MOV  DPTR,#0C002H   ; Set Y-Port Register Loc
9D74  F0               MOVX @DPTR,A        ; Set Y coordinate
9D75  00               NOP                 ; Delay 1 machine cycle
9D76  00               NOP                 ; Delay 1 machine cycle
9D77  90 C0 01         MOV  DPTR,#0C001H   ; Set Data-Port Loc
9D7A  E0               MOVX A,@DPTR        ; Get Greylevel into ACC
9D7B  F5 20            MOV  20H,A          ; Store at Loc 20H
9D7D  C3               CLR  C              ; Clear Carry
9D7E  95 1D            SUBB A,1DH          ; Subtract OLD Greylevel
9D80  50 03            JNC  XNEXTX         ; Jump if OLD>NEW
9D82  85 20 1D         MOV  1DH,20H        ; Store OLD as NEW
```

```
****************************************************************
*  The XNEXTX routine increments the X-Axis position, and transfers control *
*  back to the XLOOP routine to analyze the next Greylevel value. This    *
*  process continues until the end of the X-Axis is reached, meaning that the *
*  end of the horizontal line scanning range has been reached.            *
*  This process is accomplished as follows: The "Increment value" is      *
*  retrieved from Memory Location 1CH into the Accumulator. Then, the Working *
*  X-Axis Value is added into the Accumulator, giving the new Working X-Axis *
*  Value. This value is then back at Memory Location 21H, which is used by *
*  the X-LOOP routine to set the X-Axis coordinate for Greylevel value    *
*  retrieval. Note that the "Increment Value" might be a +1 or -1 (or, more *
```

```
* appropiately, a 01H or FFH, respectively) depending on the direction of  *
* the Y-Axis scan (Top-to-Bottom is a 01H, Bottom-to-Top is a FFH.)        *
*   The new Working X-Axis Value is compared against the ending X-Value    *
* stored at Memory Location 19H. If the values do not match, control of the *
* module is transferred back to the XLOOP routine for further Greylevel    *
* analysis.                                                                *
****************************************************************************

9D85  E5 1C      XNEXTX:  MOV  A,1CH          ; Get Increment Val
9D87  25 21               ADD  A,21H          ; Add Working X to it
9D89  F5 21               MOV  21H,A          ; Store new Working X Val
9D8B  B5 19 DB            CJNE A,19H,XLOOP    ; Jump if not end
```

****************************************************************************
*   The XDONE routine checks to see if 3 consecutive whitespace rows have  *
* been found, and if the current Greylevel is less than 0DH (13 decimal)   *
* meaning that a "black" value (part of the image) has been found on the   *
* current Y-Axis value. If so, module execution is terminated.             *
*   This is accomplished as follows: Memory Location 1EH, previously defined *
* as the Whitespace row count, is retrieved into the Accumulator. The Carry *
* Flag is cleared, and the value 04H is subtracted from the Accumulator. If *
* Carry is Set (ie: Accumulator is less than 04H) then 3 rows of Whitespace *
* have not been located, thus control is passed to the XGREY routine.      *
*   If the Carry bit is not set, then at least 3 rows of Whitespace have   *
* been found. The current minimum Greylevel value is moved from Memory     *
* Location 1DH into the Accumulator. The Carry Flag is cleared, and 0DH is *
* subtracted from the Accumulator. If Carry is not set, then the current   *
* row contains only Whitespace, and control is passed to the XGREY routine. *
* Otherwise, at least 3 rows of whitespace have been found, and a row      *
* containing "Black" has been located, so the routine passes control to the *
* module termination routine.                                              *
****************************************************************************

```
9D8E  E5 1E      XDONE:   MOV  A,1EH          ; Get White Cntr Val
9D90  C3                  CLR  C              ; Clear Carry Flag
9D91  94 04               SUBB A,#04H         ; Subtract 04H from ACC
9D93  40 09               JC   XGREY          ; Jump if ACC<04H
9D95  E5 1D               MOV  A,1DH          ; Get Min Grey Val to ACC
9D97  C3                  CLR  C              ; Clear Carry Flag
9D98  94 0D               SUBB A,#0DH         ; Subtract 0DH from ACC
9D9A  50 02               JNC  XGREY          ; Jump if ACC>=0DH
9D9C  80 17               SJMP RETY           ; Otherwise, exit module
```

****************************************************************************
*   YGREY checks to see if the current row contains a value other than     *
* Whitespace. If so, the Whitespace Counter is reset to zero. If the row   *
* contains only Whitespace, the Whitespace counter is incremented. This is *
* accomplished as follows:                                                 *
*   The current minimum Greylevel value is moved from Memory Location 1DH  *
* into the Accumulator. The Carry Flag is cleared, and 0DH is subtracted   *
* from the Accumulator. If Carry is set, then the current row contains a   *
* Greylevel considered to be Black, and control is transferred to the XZERO *
* routine.                                                                 *
*   Otherwise, the Whitespace Counter value at Memory Location 1EH is      *

* incremented, and control is transferred to the XNEXTY routine, where the  *
* next Y-Axis value is determined.  *
*************************************************************************

```
9D9E  E5 1D    XGREY:  MOV  A,1DH          ; Get Min Grey Val to ACC
9DA0  C3               CLR  C              ; Clear Carry Flag
9DA1  94 0D            SUBB A,#0DH          ; Subtract 0DH from ACC
9DA3  40 04            JC   XZERO           ; Jump if ACC<0DH
9DA5  05 1E            INC  1EH             ; Add 1 to White Cntr
9DA7  80 03            SJMP XNEXTY          ; Jump to XNEXTY routine
```

*************************************************************************
* XZERO resets the Whitespace Counter at Memory Location 1EH to zero (00H) *
* and module control is passed unconditionally to the XNEXTY routine.     *
*************************************************************************

```
9DA9  75 1E 00  XZERO:  MOV  1EH,#00H       ; Reset White Cntr to 00H
```

*************************************************************************
* The XNEXTY routine increments the Y-Axis position, and transfers control *
* back to the XRESET routine to start analysis of the next horizontal line *
* if the end of the Y-Axis scan direction has not been reached.           *
* This process is accomplished as follows: The "Increment value" is       *
* retrieved from Memory Location 1CH into the Accumulator. Then, the current *
* Y-Axis Value stored at Memory Location 1AH is added into the Accumulator, *
* giving the new Y-Axis Value. This value is then back at Memory Location *
* 1AH, which is used by the X-LOOP routine to set the Y-Axis coordinate for *
* Greylevel value retrieval. Note that the "Increment Value" might be a +1 *
* or -1 (or, more appropiately, a 01H or FFH, respectively) depending on the *
* direction of the Y-Axis scan (Top-to-Bottom is a 01H, Bottom-to-Top is a *
* FFH.)                                                                   *
* The new current Y-Axis Value is compared against the ending Y-Value     *
* stored at Memory Location 1BH. If the values do not match, control of the *
* module is transferred back to the YRESET routine to reset the X-Axis and *
* Minimum Greylevel values, and proceed to analyze the next horizontal line. *

*************************************************************************

```
9DAC  E5 1C    XNEXTY:  MOV  A,1CH          ; Get Increment Val
9DAE  25 1A             ADD  A,1AH          ; Add Current Y to ACC
9DB0  F5 1A             MOV  1AH,A          ; Store new Y-Axis Val
9DB2  B5 1B AE          CJNE A,1BH,XRESET   ; Jump if not at end
```

*************************************************************************
* RETY is the generic module termination routine to which module control  *
* is passed when module termination is desired. This can either happen    *
* via an EXPLICIT call from one of the above routines, of an IMPLICIT call *
* from the XNEXTY routine when the end of the Y-Axis scan has been reached *
* (meaning three consecutive columns of Whitespace were not found.)       *
*************************************************************************

```
9DB5  22       RETY:    RET                 ; Return to caller
```

* ROM1.ASM *

```
****************************************************************
* Module MAGREAD is utilized for high-speed magnetic stripe card reader  *
* input (speeds up to 9600 baud.) This module simply reads a string of data *
* from the serial port of the card reader, stores it in memory, and returns *
* to the caller.                                                 *
* The initial routine in the MAGREAD module initializes various values. *
* First, the card reader Output Buffer location is set to External Memory *
* Location 4F80H. This is where actual characters read from the card reader *
* will be stored.                                                *
* Next, Memory Location 21H is initialized to 00H. This location will *
* store the number of characters read from the serial buffer.    *
* Module control is now passed to the CHKSER routine at this point. *
****************************************************************
```

```
ADDR   OP Codes   Labels/Mnemonics              Comments
----   --------   ----------------              --------

9DC0              MAGREAD: ORG 9DC0H LOC 40C0H  ; Set Module Entry Point
9DC0   90 4F 80           MOV DPTR,#4F80H       ; Set Output Buffer Loc
9DC3   75 21 00           MOV 21H,#00H          ; Set Character Count to 0
```

```
****************************************************************
* The CHKSER routine serves two purposes. Its first purpose is to sit in a *
* constant "wait state" until a character is received over the serial port. *
* This "wait state" is determined by the value of Bit 0 in the Serial Port *
* Control Register, at Memory Location 98H. Bit 0, or the Receive Data *
* Interrupt Bit, is set to 1 when there is a character waiting to be read on *
* the Serial Port Data Buffer, at Memory Location 99H.           *
* To check this "wait state", the value of Memory Location 98H is read *
* into the Accumulator. A "Logical AND" is performed to strip Bits 1 thru 7. *
* If the result after the AND is zero, no data is waiting to be read, and *
* the process continues again.                                   *
* Once a character is waiting to be read, the "wait state" is exited, and *
* the data is retrieved off the Serial Port Data Buffer. The Receive Data *
* Interrupt Bit must be reset to zero as well. The read character is then *
* stored in the Output Buffer.                                   *
* Finally, if the character is equal to a 'Q', the card reader has *
* finished its transmission, so control of the module is passed to the exit *
* routine. Otherwise, control is passed to the PTRINC routine.   *
****************************************************************
```

```
9DC6   E5 98     CHKSER: MOV A,98H       ; Get Serial Control Reg
9DC8   54 01             ANL A,#01H      ; Strip Bits 1 thru 7
9DCA   60 FA             JZ CHKSER       ; If 0, no data, so loop
9DCC   53 98 FE          ANL 98H,#0FEH   ; Reset Bit 0 to 0
9DCF   E5 99             MOV A,99H       ; Get Serial Port char
9DD1   54 7F             ANL A,#7FH      ; Strip Parity Bit 8
9DD3   F0                MOVX @DPTR,A    ; Store in Output Buffer
9DD4   B4 51 02          CJNE A,#51H,PTRINC ; Jump if not equal to 'Q'
9DD7   80 08             SJMP RETMAG     ; Otherwise, exit module
```

```
****************************************************************
* PTRINC has a dual purpose. First, it increments the Output Buffer *
```

```
* location by 1. It also increments the Character counter at Memory Location *
* 21H by 1.                                                                  *
*  PTRINC's second purpose is to check the number of characters read by the  *
*  MAGREAD routine. If the number of characters does not exceed 47, then     *
*  module control is passed back to CHKSER to wait for the next incoming     *
*  character. Otherwise, control falls through to the module exit routine.   *
******************************************************************************

9DD9  A3          PTRINC:  INC DPTR             ; Increment Output Buffer
9DDA  05 21                INC 21H              ; Increment Char Counter
9DDC  E5 21                MOV A,21H            ; Move Char Cnt to ACC
9DDE  B4 30 E5             CJNE A,#30H,CHKSER   ; Jump to CHKSER if ACC<48

******************************************************************************
*  RETMAG is the generic module termination routine to which module control  *
*  is passed when module termination is desired. This can either happen      *
*  via an EXPLICIT call from one of the above routines, of an IMPLICIT call  *
*  from the PTRINC routine when the maximum number of characters have been   *
*  read off the magnetic stripe card reader.                                 *
******************************************************************************

9DE1  22          RETMAG:  RET                  ; Return to caller
```

* ROM2.ASM *

```
******************************************************************************
*  ALGOL is the mainline control module of the Algorithm Data Generation     *
*  Routine. This routine merely calls several Ridge Count generation modules *
*  to set up the appropiate Algorithm Output Data values. Control is then    *
*  returned to the caller upon completion of those modules.                  *
******************************************************************************
ADDR  OP Codes   Labels/Mnemonics          Comments
----  --------   ----------------          --------

9E00              ALGOL:   ORG 9E00H LOC 4100H  ; Set Entry Location
9E00  12 9E 0D            LCALL SLOPE1         ; Call \ Slope Routine
9E03  12 9E 2C            LCALL SLOPE2         ; Call / Slope Routine
9E06  12 9E 4B            LCALL YCALCS         ; Call Y-Axis Calc Routine
9E09  12 9E C7            LCALL XCALCS         ; Call X-Axis Calc Routine
9E0C  22                  RET                  ; Return to caller
```

* ROM2.ASM *

```
******************************************************************************
*  The SLOPE1 module is responsible for generating a Ridge Count along the   *
*  \ Diagonal from (X-START,Y-START) to (X-END,Y-END).                       *
*                                                                            *
*  The initialization routine of this module sets the Ridge Counter (Memory  *
*  Location 21H) to 00H, and stores the value of X-START (Memory Location    *
*  18H) in X-TEMP (Memory Location 1EH). It also stores the value of Y-START *
*  (Memory Location 1AH) to Y-TEMP (Memory Location 1FH). The TEMP memory    *
*  locations are used by the GETCARD routine to analyze the Greylevel value  *
```

* at (X-TEMP,Y-TEMP) against the Previous Greylevel. Because of this, the *
* Previous Greylevel value (Memory Location 20H) is initialized to 0FH *
* (meaning whitespace.) *
*************************************************************************

```
ADDR   OP Codes   Labels/Mnemonics        Comments
----   --------   ----------------        --------

9E0D   75 21 00   SLOPE1:  MOV 21H,#00H   ; Init Ridge Ctr to 00H
9E10   85 18 1E            MOV 1EH,18H    ; Move X-START to temp area
9E13   85 1A 1F            MOV 1FH,1AH    ; Move Y-START to temp area
9E16   75 20 0F            MOV 20H,#0FH   ; Init Prev Grey to 0FH
```

*************************************************************************
*  The S1LOOP routine is the main loop of SLOPE1. This routine checks for *
*  the presence of a Ridge at (X-TEMP,Y-TEMP). Then, it increments both  *
*  X-TEMP and Y-TEMP for continuation down the \ slope.                  *
*  When X-TEMP equals X-END, the loop is terminated. The generated Ridge *
*  Count at Memory Location 21H is then loaded into the Accumulator, and *
*  stored at Memory Location 4FF0H. The routine then passes control back to *
*  the ALGOL module.                                                     *
*************************************************************************

```
9E19   12 9F 43   S1LOOP:  LCALL GETCARD        ; Check for a ridge @ (x,y)
9E1C   05 1E               INC 1EH              ; Increment X-Axis
9E1E   05 1F               INC 1FH              ; Increment Y-Axis
9E20   E5 1E               MOV A,1EH            ; Move X-TEMP into ACC
9E22   B5 19 F4            CJNE A,19H,S1LOOP    ; Loop until X-TEMP=X-END
9E25   90 4F F0            MOV DPTR,#4FF0H      ; Set Data Pointer to 4FF0H
9E28   E5 21               MOV A,21H            ; Move Ridge Count to ACC
9E2A   F0                  MOVX @DPTR,A         ; Store \ Ridge Count
9E2B   22                  RET                  ; Return to ALGOL
```

* ROM2.ASM *

*************************************************************************
*  The SLOPE2 module is responsible for generating a Ridge Count along the *
*  / Diagonal from (X-START,Y-END) to (X-END,Y-START).                   *
*                                                                        *
*  The initialization routine of this module sets the Ridge Counter (Memory *
*  Location 21H) to 00H, and stores the value of X-START (Memory Location *
*  18H) in X-TEMP (Memory Location 1EH). It also stores the value of Y-END *
*  (Memory Location 1BH) to Y-TEMP (Memory Location 1FH). The TEMP memory *
*  locations are used by the GETCARD routine to analyze the Greylevel value *
*  at (X-TEMP,Y-TEMP) against the Previous Greylevel. Because of this, the *
*  Previous Greylevel value (Memory Location 20H) is initialized to 0FH  *
*  (meaning whitespace.)                                                 *
*************************************************************************

```
ADDR   OP Codes   Labels/Mnemonics        Comments
----   --------   ----------------        --------

9E2C   75 21 00   SLOPE2:  MOV 21H,#00H   ; Init Ridge Ctr to 00H
9E2F   85 18 1E            MOV 1EH,18H    ; Move X-START to temp area
9E32   85 1B 1F            MOV 1FH,1BH    ; Move Y-END to temp area
9E35   75 20 0F            MOV 20H,#0FH   ; Init Prev Grey to 0FH
```

```
****************************************************************
* The S1LOOP routine is the main loop of SLOPE1. This routine checks for *
* the presence of a Ridge at (X-TEMP,Y-TEMP). Then, it increments the X-TEMP *
* value, and decrements the Y-TEMP value for continuation up the / slope. *
* When X-TEMP equals X-END, the loop is terminated. The generated Ridge *
* Count at Memory Location 21H is then loaded into the Accumulator, and *
* stored at Memory Location 4FF1H. The routine then passes control back to *
* the ALGOL module. *
****************************************************************

9E38  12 9F 43   S2LOOP:  LCALL GETCARD      ; Check for a Ridge @ (x,y)
9E3B  05 1E               INC 1EH            ; Increment X-Axis
9E3D  15 1F               DEC 1FH            ; Decrement Y-Axis
9E3F  E5 1E               MOV A,1EH          ; Move X-TEMP into ACC
9E41  B5 19 F4            CJNE A,19H,S2LOOP  ; Loop until X-TEMP=X-END
9E44  90 4F F1            MOV DPTR,#4FF1H    ; Set Data Pointer to 4FF1H
9E47  E5 21               MOV A,21H          ; Move Ridge Count into ACC
9E49  F0                  MOVX @DPTR,A       ; Store / Ridge Count
9E4A  22                  RET                ; Return to ALGOL
```

* ROM2.ASM *

```
****************************************************************
* The XCALCS module is responsible for generating Ridge Count values for *
* Xma, Xmb, Xa MSB and LSB, Xb MSB and LSB, and Xc. *
*                                                                *
* The initialization routine of this module sets the Max Counter (Memory *
* Location 0BH) to 00H, and stores the value of X-START (Memory Location *
* 18H) in X-TEMP (Memory Location 1EH). It also initializes the values *
* 16-MSB, 16-LSB, and Hold Area (Memory Locations 0DH, 0EH, and 0FH, *
* respectively, to 00H. Control then falls through to the YMMRSET routine. *
****************************************************************

ADDR  OP Codes   Labels/Mnemonics           Comments
----  --------   ----------------           --------

9E4B  85 18 1E   XCALCS:  MOV 1EH,18H       ; Move X-START to temp area
9E4E  75 0B 00            MOV 0BH,#00H      ; Init Max Count to 00F
9E51  75 0D 00            MOV 0DH,#00H      ; Init 16-MSB to 00F
9E54  75 0E 00            MOV 0EH,#00H      ; Init 16-LSB to 00F
9E57  75 0F 00            MOV 0FH,#00H      ; Init hold area to 00F

****************************************************************
* The YRESET routine resets values pertinent to each vertical line *
* analysis. Y-START (Memory Location 1AH) is moved to Y-TEMP (Memory *
* Location 1FH). The Previous Greylevel value is set to 0FH (meaning *
* whitespace), and the Ridge Counter (Memory Location 21H) is reset to 00H. *
* Control then falls through to the YAXISLUP routine. *
****************************************************************

9E5A  85 1A 1F   YRESET:  MOV 1FH,1AH       ; Move Y-START to temp area
9E5D  75 20 0F            MOV 20H,#0FH      ; Reset Prev Grey to 0FH
9E60  75 21 00            MOV 21H,#00H      ; Reset Ridge Ctr to 00H

****************************************************************
```

```
*  The YAXISLUP routine is responsible for determining the Ridge Count on    *
*  current vertical line. To accomplish this, each (x,y) coordinate on the   *
*  vertical line is checked for a white to black shift (indicating a Ridge). *
*  This process continues until the end of the vertical line is reached      *
*  (Y-TEMP = Y-END.) The Ridge Count is stored in Memory Location 21H.       *
*****************************************************************************
9E63  12 9F 43   YAXISLUP: LCALL GETCARD      ; Check for a ridge @ (x,y)
9E66  05 1F                INC 1FH            ; Increment Y-Axis
9E68  E5 1F                MOV A,1FH          ; Move Y-TEMP into ACC
9E6A  B5 1B F6             CJNE A,1BH,YAXISLUP ; Loop until YTEMP=Y-END

*****************************************************************************
*  The XABSUM Routine is responsible for determining if the X-Axis has       *
*  reached X Center-Line. If X Center-Line has been reached, then the X-Axis *
*  A-Range values have been computed in their entirety and can be stored.    *
*  Since X-TEMP must be equal to X Center-Line for values to be saved, then  *
*  The Ridge Count stored at Memory Location 21H will accurately reflect the *
*  Ridge count on X Center-Line, so that value can be stored as well. The Max*
*  Ctr, as well as 16-MSB and 16-LSB are reset to 00H for computation of the *
*  B-Range values. Control Then passes to the XMAXTST routine.               *
*  If the X-TEMP value is not equal to X-Center Line, then we are in the     *
*  process of computing the A/B-Range values, so control passes automatically*
*  to the XABSUM2 routine.                                                   *
*****************************************************************************
9E6D  E5 1E     XABSUM:  MOV A,1EH           ; Move X-TEMP into ACC
9E6F  B5 1C 23           CJNE A,1CH,XABSUM2  ; Jump if not at XC
9E72  90 4F F9           MOV DPTR,#4FF9H     ; Set Data Pointer to 4FF9H
9E75  E5 0B              MOV A,0BH           ; Get Max Ctr into ACC
9E77  F0                 MOVX @DPTR,A        ; Store Xma Ridge Count
9E78  90 4F FB           MOV DPTR,#4FFBH     ; Set Data Pointer to 4FFBH
9E7B  E5 0D              MOV A,0DH           ; Get 16-bit MSB into ACC
9E7D  F0                 MOVX @DPTR,A        ; Store Xa MSB Ridge Count
9E7E  90 4F FC           MOV DPTR,#4FFCH     ; Set Data Pointer to 4FFCH
9E81  E5 0E              MOV A,0EH           ; Get 16-bit LSB into ACC
9E83  F0                 MOVX @DPTR,A        ; Store Xa LSB Ridge Count
9E84  90 4F FF           MOV DPTR,#4FFFH     ; Set Data Pointer to 4FFFH
9E87  E5 21              MOV A,21H           ; Get Center Line Ridge Ct
9E89  F0                 MOVX @DPTR,A        ; Store Xc Ridge Count
9E8A  75 0B 00           MOV 0BH,#00H        ; Reset Max Ctr to 00H
9E8D  75 0D 00           MOV 0DH,#00H        ; Reset 16-MSB to 00H
9E90  75 0E 00           MOV 0EH,#00H        ; Reset 16-LSB to 00H
9E93  80 0B              SJMP XMAXTST        ; Jump to XMAXTST

*****************************************************************************
*  The XABSUM2 routine is responsible for accumulating the X-Axis Ridge      *
*  Counts into a 2-byte 16-bit accumulator, since no 16-bit register other   *
*  than DPTR exists on the 8052 microprocessor.                              *
*  To accomplish this, the 16-LSB (Least Significant Bits - Memory Location  *
*  0EH) are retrieved. The value of the current vertical line Ridge Count    *
*  (Memory Location 21H) is added to the Accumulator, giving a new 16-LSB.   *
*  This new value is stored at Memory Location 0EH.                          *
*  If the Carry Flag is not set (meaning that 16-LSB did not "roll over"     *
```

```
* from FFH to 00H,) control is passed to the XMAXTST routine. Otherwise,   *
* 16-MSB (most significant bits - Memory Location 0DH) is incremented, and *
* control falls through automatically to XMAXTST.                          *
****************************************************************************

9E95  C3        XABSUM2: CLR C          ; Clear Carry Flag
9E96  E5 0E              MOV A,0EH      ; Get 16-bit LSB
9E98  25 21              ADD A,21H      ; Add in column ridge count
9E9A  F5 0E              MOV 0EH,A      ; Store back as 16-bit LSB
9E9C  50 02              JNC XMAXTST    ; Jump no carry to XMAXTST
9E9E  05 0D              INC 0DH        ; Increment 16-bit MSB

****************************************************************************
*  The XMAXTST routine is responsible for determining the maximum Ridge    *
*  Count in whatever X-Axis range is currently being analyzed. To determine *
*  this, the current vertical line Ridge Count (Memory Location 21H) is    *
*  compared against Max Ctr (Memory Location 0BH). If 21H contains a value *
*  greater than 0BH, the value in 0BhH is replaced with the value in 21H.  *
*  Control then passes to XAXISINC.                                        *
****************************************************************************

9EA0  85 0B 0F  XMAXTST: MOV 0FH,0BH    ; Move Max Ctr to hold area
9EA3  E5 21              MOV A,21H      ; Get Ridge Ctr into ACC
9EA5  C3                 CLR C          ; Clear Carry Flag
9EA6  95 0F              SUBB A,0FH     ; Sub Max Ctr frm Ridge Ctr
9EA8  40 03              JC XAXISINC    ; Jump if Max Ctr>Ridge Ctr
9EAA  85 21 0B           MOV 0BH,21H    ; Store NEW Max value

****************************************************************************
*  The XAXISINC routine is responsible for incrementing the X-Axis temp    *
*  value and determining if X-END has been reached. If X-END has not been  *
*  reached, then another vertical line exists to analyze, so control is    *
*  passed back to the YRESET routine. Otherwise, control passes automatically *
*  to the XBRNGSV routine.                                                 *
****************************************************************************

9EAD  05 1E     XAXISINC: INC 1EH        ; Increment X-Axis
9EAF  E5 1E               MOV A,1EH      ; Move X-TEMP into ACC
9EB1  B5 19 A6            CJNE A,19H,YRESET ; Loop until X-TEMP=X-END

****************************************************************************
*  The XBRNGSV routine saves the values Xmb, Xb MSB and Xb LSB in their    *
*  appropiate memory locations prior to returning to the ALGOL module.     *
*  Values are retrieved from Max Ctr (Memory Location 0BH), 16-MSB (Memory *
*  Location 0DH), and 16-LSB (Memory Location 0EH) to save in their        *
*  respective Memory Locations as defined by the Algorithm Output Data Chart. *
****************************************************************************

9EB4  90 4F FA  XBRNGSV: MOV DPTR,#4FFAH ; Set Data Pointer to 4FFAH
9EB7  E5 0B              MOV A,0BH       ; Move Max Ctr into ACC
9EB9  F0                 MOVX @DPTR,A    ; Store Xmb Ridge Count
9EBA  90 4F FD           MOV DPTR,#4FFDH ; Set Data Pointer to 4FFDH
9EBD  E5 0D              MOV A,0DH       ; Move 16-MSB to ACC
9EBF  F0                 MOVX @DPTR,A    ; Store Xb MSB Ridge Count
9EC0  90 4F FE           MOV DPTR,#4FFEH ; Set Data Pointer to 4FFEH
9EC3  E5 0E              MOV A,0EH       ; Move 16-LSB to ACC
9EC5  F0                 MOVX @DPTR,A    ; Store Xb LSB Ridge Count
9EC6  22                 RET             ; Return to ALGOL
```

* ROM2.ASM *

```
************************************************************
* The YCALCS module is responsible for generating Ridge Count values for *
* Yma, Ymb, Ya MSB and LSB, Yb MSB and LSB, and Yc.         *
*                                                            *
* The initialization routine of this module sets the Max Counter (Memory *
* Location 0BH) to 00H, and stores the value of Y-START (Memory Location *
* 1AH) in Y-TEMP (Memory Location 1FH). It also initializes the values *
* 16-MSB, 16-LSB, and Hold Area (Memory Locations 0DH, 0EH, and 0FH, *
* respectively, to 00H. Control then falls through to the YRESET routine. *
************************************************************
```

| ADDR | OP Codes | Labels/Mnemonics | Comments |
|------|----------|------------------|----------|
| 9EC7 | 85 1A 1F | YCALCS: MOV 1FH,1AH | ; Move Y-START to temp area |
| 9ECA | 75 0B 00 | MOV 0BH,#00H | ; Init Max Ctr to 00H |
| 9ECD | 75 0D 00 | MOV 0DH,#00H | ; Init 16-MSB to 00H |
| 9ED0 | 75 0E 00 | MOV 0EH,#00H | ; Init 16-LSB to 00H |
| 9ED3 | 75 0F 00 | MOV 0FH,#00H | ; Init hold area to 00H |

```
************************************************************
* The XRESET routine resets values pertinent to each horizontal line *
* analysis. X-START (Memory Location 18H) is moved to X-TEMP (Memory *
* Location 1EH). The Previous Greylevel value is set to 0FH (meaning *
* whitespace), and the Ridge Counter (Memory Location 21H) is reset to 00H. *
* Control then falls through to the XAXISLUP routine.       *
************************************************************
```

| | | | |
|------|----------|------------------|----------|
| 9ED6 | 85 18 1E | XRESET: MOV 1EH,18H | ; Move X-START in temp area |
| 9ED9 | 75 20 0F | MOV 20H,#0FH | ; Reset Prev Grey to 0FH |
| 9EDC | 75 21 00 | MOV 21H,#00H | ; Reset Ridge Ctr to 00H |

```
************************************************************
* The XAXISLUP routine is responsible for determining the Ridge Count on *
* current horizontal line. To accomplish this, each (x,y) coordinate on the *
* horizontal line is checked for a white to black shift (indicating a *
* Ridge. This process continues until the end of the vertical line is *
* reached (X-TEMP=X-END.) The Ridge Count is stored in Memory Location 21H. *
* Control then falls through to the YABSUM routine.         *
************************************************************
```

| | | | |
|------|----------|------------------|----------|
| 9EDF | 12 9F 43 | XAXISLUP: LCALL GETCARD | ; Check for a ridge @ (x,y) |
| 9EE2 | 05 1E | INC 1EH | ; Increment X-Axis |
| 9EE4 | E5 1E | MOV A,1EH | ; Move X-TEMP into ACC |
| 9EE6 | B5 19 F6 | CJNE A,19H,XAXISLUP | ; Loop until X-TEMP=X-END |

```
************************************************************
* The YABSUM Routine is responsible for determining if the Y-Axis has *
* reached Y Center-Line. If Y Center-Line has been reached, then the Y-Axis *
* A-Range values have been computed in their entirety and can be stored. *
* Since Y-TEMP must be equal to Y Center-Line for values to be saved, then *
* The Ridge Count stored at Memory Location 21H will accurately reflect the *
* Ridge count on Y Center-Line, so that value can be stored as well. The Max *
* Ctr, as well as 16-MSB and 16-LSB are reset to 00H for computation of the *
```

```
* B-Range values. Control Then passes to the YMAXTST routine.        *
* If the Y-TEMP value is not equal to Y-Center Line, then we are in the  *
* process of computing the A/B-Range values, so control passes automatically *
* to the YABSUM2 routine.                                             *
***********************************************************************
9EE9  E5 1F      YABSUM:  MOV A,1FH        ; Move Y-TEMP into ACC
9EEB  B5 1D 23            CJNE A,1DH,YABSUM2  ; Jump if not at YC
9EEE  90 4F F2            MOV DPTR,#4FF2H  ; Set Data Pointer to 4FF2H
9EF1  E5 0B               MOV A,0BH        ; Get Max Ctr into ACC
9EF3  F0                  MOVX @DPTR,A     ; Store Yma Ridge Count
9EF4  90 4F F4            MOV DPTR,#4FF4H  ; Set Data Pointer to 4FF4H
9EF7  E5 0D               MOV A,0DH        ; Get 16-MSB into ACC
9EF9  F0                  MOVX @DPTR,A     ; Store Ya MSB Ridge Count
9EFA  90 4F F5            MOV DPTR,#4FF5H  ; Set Data Pointer to 4FF5H
9EFD  E5 0E               MOV A,0EH        ; Get 16-LSB into ACC
9EFF  F0                  MOVX @DPTR,A     ; Store Ya LSB Ridge Count
9F00  90 4F F8            MOV DPTR,#4FF8H  ; Set Data Pointer to 4FF8H
9F03  E5 21               MOV A,21H        ; Get current Ridge Count
9F05  F0                  MOVX @DPTR,A     ; Store YC Ridge Count
9F06  75 0B 00            MOV 0BH,#00H     ; Reset Max Ctr to 00H
9F09  75 0D 00            MOV 0DH,#00H     ; Reset 16-MSB to 00H
9F0C  75 0E 00            MOV 0EH,#00H     ; Reset 16-LSB to 00H
9F0F  80 0B               SJMP YMAXTST     ; Jump to YMAXTST
```

```
***********************************************************************
* The YABSUB2 routine is responsible for accumulating the Y-Axis Ridge *
* Counts into a 2-byte 16-bit accumulator, since no 16-bit register other *
* than DPTR exists on the 8052 microprocessor.                        *
* To accomplish this, the 16-LSB (Least Significant Bits - Memory Location *
* 0EH) are retrieved. The value of the current horizontal line Ridge Count *
* (Memory Location 21H) is added to the Accumulator, giving a new 16-LSB. *
* This new value is stored at Memory Location 0EH.                    *
* If the Carry Flag is not set (meaning that 16-LSB did not "roll over" *
* from FFH to 00H,) control is passed to the YMAXTST routine. Otherwise, *
* 16-MSB (most significant bits - Memory Location 0DH) is incremented, and *
* control falls through automatically to YMAXTST.                     *
***********************************************************************
9F11  C3         YABSUM2:  CLR C           ; Clear Carry Flag
9F12  E5 0E                MOV A,0EH       ; Move 16-LSB into ACC
9F14  25 21                ADD A,21H       ; Add in Ridge Count
9F16  F5 0E                MOV 0EH,A       ; Store new 16-LSB
9F18  50 02                JNC YMAXTST     ; Jump no carry to YMAXTST
9F1A  05 0D                INC 0DH         ; Increment 16-MSB
```

```
***********************************************************************
* The YMAXTST routine is responsible for determining the maximum Ridge *
* Count in whatever Y-Axis range is currently being analyzed. To determine *
* this, the current horizontal line Ridge Count (Memory Location 21H) is *
* compared against Max Ctr (Memory Location 0BH). If 21H contains a value *
* greater than 0BhH, the value in 0BhH is replaced with the value in 21H. *
* Control then passes to YAXISINC.                                    *
***********************************************************************
```

```
9F1C  85 0B 0F   YMAXTST: MOV 0FH,0BH      ; Move Max Ctr to hold area
9F1F  E5 21               MOV A,21H        ; Get Ridge Ctr into ACC
9F21  C3                  CLR C            ; Clear Carry
9F22  95 0F               SUBB A,0FH       ; Sub Max Ctr from ACC
9F24  40 03               JC YAXISINC      ; Jump if Max Ctr > Ridge Ctr
9F26  85 21 0B            MOV 0BH,21H      ; Move Ridge Ctr to Max Ctr
```

```
***************************************************************
* The YAXISINC routine is responsible for incrementing the Y-Axis temp  *
* value and determining if Y-END has been reached. If Y-END has not been *
* reached, then another vertical line exists to analyze, so control is  *
* passed back to the XRESET routine. Otherwise, control passes automatically *
* to the YBRNGSV routine.                                          *
***************************************************************
```

```
9F29  05 1F     YAXISINC: INC 1FH          ; Increment Y-Axis
9F2B  E5 1F               MOV A,1FH        ; Move Y-TEMP into ACC
9F2D  B5 1B A6            CJNE A,1BH,XRESET ; Loop until Y-TEMP=Y-END
```

```
***************************************************************
* The YBRNGSV routine saves the values Ymb, Yb MSB and Yb LSB in their  *
* appropiate memory locations prior to returning to the ALGOL module.   *
* Values are retrieved from Max Ctr (Memory Location 0BH), 16-MSB (Memory *
* Location 0DH), and 16-LSB (Memory Location 0EH) to save in their       *
* respective Memory Locations as defined by the Algorithm Output Data Chart. *
***************************************************************
```

```
9F30  90 4F F3  YBRNGSV: MOV DPTR,#4FF3H   ; Set Data Pointer to 4FF3H
9F33  E5 0B              MOV A,0BH         ; Move Max Ctr into ACC
9F35  F0                 MOVX @DPTR,A      ; Store Ymb Ridge Count
9F36  90 4F F6           MOV DPTR,#4FF6H   ; Set Data Pointer to 4FF6H
9F39  E5 0D              MOV A,0DH         ; Move 16-MSB into ACC
9F3B  F0                 MOVX @DPTR,A      ; Store Yb MSB Ridge Count
9F3C  90 4F F7           MOV DPTR,#4FF7H   ; Set Data Pointer to 4FF7H
9F3F  E5 0E              MOV A,0EH         ; Move 16-LSB into ACC
9F41  F0                 MOVX @DPTR,A      ; Store Yb LSB Ridge Count
9F42  22                 RET               ; Return to ALGOL
```

* ROM2.ASM *

```
***************************************************************
* The GETCARD routine determines if a Ridge has been encountered at the  *
* location defined in (X-TEMP, Y-TEMP). To accomplish this, the X-Port and *
* Y-Port on the digitizer card are set to the appropiate (x,y) value, the *
* Current Greylevel is retrieved from there, and stored in a hold area for *
* later use. The Current Greylevel is then checked for equality to 0FH. If *
* it is (meaning we're currently in a valley), control is passed to the   *
* CARDEXIT routine. Otherwise, control is passed to the CHK1 routine.     *
***************************************************************
```

```
ADDR   OP Codes   Labels/Mnemonics          Comments
----   --------   ----------------          --------

9F43  90 C0 03  GETCARD: MOV DPTR,#0C003H   ; Set Data Pointer to C003H
9F46  E5 1E              MOV A,1EH          ; Move X-TEMP into ACC
9F48  F0                 MOVX @DPTR,A       ; Set X-Axis Coordinate
```

```
9F49  90 C0 02        MOV DPTR,#0C002H    ; Set Data Pointer to C002H
9F4C  E5 1F           MOV A,1FH           ; Move Y-TEMP into ACC
9F4E  F0              MOVX @DPTR,A        ; Set Y-Axis Coordinate
9F4F  90 C0 01        MOV DPTR,#0C001H    ; Set Data Pointer to C001H
9F52  00              NOP                 ; Delay 1 machine cycle
9F53  00              NOP                 ; Delay 1 machine cycle
9F54  E0              MOVX A,@DPTR        ; Get (x,y) Grey Level
9F55  F5 0F           MOV 0FH,A           ; Store in hold area
9F57  B4 0D 02        CJNE A,#0DH,CHK1    ; Jump if Greylevel < > 0DH
9F5A  80 13           SJMP CARDEXIT       ; Exit module if equal
```

```
****************************************************************
*  The CHK1 routine determines if the Current Greylevel is equal to 0EH. If *
*  it is, then control is passed to the CARDEXIT routine. Otherwise, control *
*  is passed to the CHK2 routine.                               *
****************************************************************
```

```
9F5C  B4 0E 02  CHK1:  CJNE A,#0EH,CHK2   ; Jump if Greylevel < > 0EH
9F5F  80 0E            SJMP CARDEXIT      ; Exit module if equal
```

```
****************************************************************
*  The CHK2 routine determines if the Current Greylevel is equal to 0FH. If *
*  it is, then control is passed to the CARDEXIT routine. Otherwise, control *
*  is passed to the CHKRDG routine.                             *
****************************************************************
```

```
9F61  B4 0F 02  CHK2:  CJNE A,#0FH,CHKRDG  ; Jump if Greylevel < > 0FH
9F64  80 09            SJMP CARDEXIT       ; Exit module if equal
```

```
****************************************************************
*  The CHKRDG routine is executed when the Current Greylevel is less than  *
*  0DH (ie: black). This routine checks the Previous Greylevel to see if it  *
*  was white. If the Previous Greylevel was not White (ie: still part of the *
*  current Ridge) then control is passed to the CARDEXIT routine.  *
****************************************************************
```

```
9F66  E5 20     CHKRDG:  MOV A,20H        ; Get Prev Greylevel val
9F68  C3                 CLR C            ; Clear Carry Flag
9F69  94 0D              SUBB A,#0DH      ; Subtract 0DH from ACC
9F6B  40 02              JC CARDEXIT      ; Jump if PREV < 0DH (black)
```

```
****************************************************************
*  The RIDGE routine is executed when a Greylevel shift from White to Black *
*  has occurred between the Previous and Current Greylevel values,  *
*  respectively. This routine increments the Ridge Counter, located at Memory *
*  Location 21H, and falls thru to the CARDEXIT routine.        *
****************************************************************
```

```
9F6D  05 21   RIDGE:  INC 21H            ; Increment Ridge Ctr
```

```
****************************************************************
*  The CARDEXIT routine stores the current Greylevel retrieved from (x,y)  *
*  (temporarily stored at Memory Location 0FH) as the "Previous" Greylevel, *
*  stored at Memory Location 20H. This insures that the next entry into this *
*  routine will have an accurate "Previous Greylevel" to use in determining  *
*  if a Ridge (Greylevel shift from White to Black) has occurred. The routine *
```

* then returns to the caller.                                        *
*************************************************************************
9F6F  85 0F 20   CARDEXIT:  MOV 20H,0FH        ; Move (x,y) Grey to Prev
9F72  22                    RET                ; Return to caller REM *************************************************************************
REM * Set flag to prevent Control-C break                          *
REM *************************************************************************
1000 DBY(38) = DBY(38).OR.01H REM *************************************************************************
REM * Initialize variable space, dimension image data storage area, set all *
REM * array values to zero, and put the digitizer card in its "wait state". *
REM *************************************************************************
2000 STRING 500,125
2010 DIM IMAGE(100)
2020 FOR I = 1 TO 100: IMAGE(I) = 0: NEXT I
2030 CC=7:GOSUB 9800:CC=6:GOSUB 9800:CC=5:GOSUB 9800

REM *************************************************************************
REM * Print "Ready" message on user's terminal, and wait for a keypress to  *
REM * initiate the analysis process.                               *
REM *************************************************************************
2500 PRINT CHR(12)
2510 INPUT "Place print in holder and press [ENTER]: ", $(0)

REM *************************************************************************
REM * Set the SIZED variable to FALSE, and perform the Image Analysis       *
REM * Process 7 times, from pass 0 to 7.                           *
REM *************************************************************************
3010 SIZED=0:FOR K = 0 TO 6
3020 PRINT "Pass #",K,"...",
3030 GOSUB 5000
3040 NEXT K REM *************************************************************************
REM * Clear the screen, print heading information, and call the Suggested   *
REM * Value Generation routine for each element in the Generated Data Matrix *
REM *************************************************************************
3100 PRINT CHR(12)
3110 PRINT "--1-- --2-- --3-- --4-- --5-- --6-- --7-- SUGGESTED:"
3120 FOR I=1 TO 12: GOSUB 4000: NEXT I:PRINT
3130 CC=7:GOSUB 9800:CC=6:GOSUB 9800:CC=5:GOSUB 9800
3140 INPUT "Finished. Press [ENTER] for next print...", $(0)
3150 GOTO 2000

REM *************************************************************************
REM * Suggested Value Generation Routine - This routine calculates the      *
REM * suggested value that should be used for each element in the Generated *
REM * Data Matrix. The suggested value is calculated by summing each of the *
REM * values from the 7 analysis passes, subtracting the Maximum and Minimum *
REM * Anomalies, and dividing the sum by 5. NSUM, NMAX, and NMIN contain the *
REM * Sum, Maximum value, and Minimum value, respectively. Each of the 7    *

```
REM * values is printed, followed by the suggested value, for the operator  *
REM * to see.                                                                *
REM ****************************************************************************
4000 NSUM=0:NMAX=0:NMIN=99
4010 FOR K=1 TO 7:A=IMAGE((K-1)*12+I):PRINT " ",:PRINT USING(##),A,
4020 NSUM=NSUM+A:PRINT " ",
4030 IF NMAX<A THEN NMAX=A
4040 IF NMIN>A THEN NMIN=A
4050 NEXT K
4060 SUGG = (NSUM-NMAX-NMIN)/5
4070 PRINT "   ",:PRINT USING(###),SUGG
4080 RETURN REM ****************************************************************************
REM * This routine handles control of Image Analysis. A snapshot of the       *
REM * fingerprint image is taken, sized (only once, as indicated by the       *
REM * SIZED variable), analyzed, and the values stored for later averaging.   *
REM ****************************************************************************
5000 REM *** ANALYZE PICTURE ROUTINE
5010 PRINT "Grabbing...",
5020 CC=7:GOSUB 9800:CC=6:GOSUB 9800:CC=5:GOSUB 9800:CC=6:GOSUB 9800
5030 PRINT "Sizing...",:GOSUB 5100
5040 PRINT "Computing...",:GOSUB 5500
5050 PRINT "Done!"
5060 RETURN REM ****************************************************************************
REM * This code handles sizing of the Fingerprint on the digitizer card.      *
REM * Several values are determined here:                                     *
REM *                                                                         *
REM * Y0 - Y Top          XS - Temp "Start @ X Pos" Variable                  *
REM * Y9 - Y Bottom       XE - Temp "End @ X Pos" Variable                    *
REM * X1 - X Start        YS - Temp "Start @ Y Pos" Variable                  *
REM * X2 - X End          YE - Temp "End @ Y Pos" Variable                    *
REM * Y1 - Y Start                                                            *
REM * Y2 - Y End                                                              *
REM *                                                                         *
REM * Variable SP is used to indicate the "step", or direction of the scan,   *
REM * whether it be from +1 or -1 (255). Several routines are called to set   *
REM * values and call Assembler routines to speed the sizing of the image.    *
REM * Once sizing is successfully run, this routine is bypassed on            *
REM * subsequent passes.                                                      *
REM ****************************************************************************
5100 REM *** INITIAL IMAGE CAPTURE AND FRAME ANALYSIS SETUP
5110 IF SIZED=1 THEN RETURN:ELSE X1=0 : Y1=0 : X2=0 : Y2=0
5120 YS=1  :YE=255:SP=+1 :GOSUB 5400 :Y0=YR
5130 YS=255:YE=1  :SP=-1 :GOSUB 5400 :Y9=YR
5140 XS=000:XE=255:YS=Y0:YE=Y9:SP=001:GOSUB 5300:X1=XR
5150 XS=255:XE=000:YS=Y9:YE=Y0:SP=255:GOSUB 5300:X2=XR
5160 XS=X1 :XE=X2 :YS=Y0:YE=Y9:SP=001:GOSUB 5200:Y1=YR
5170 XS=X2 :XE=X1 :YS=Y9:YE=Y0:SP=255:GOSUB 5200:Y2=YR
5180 IF X2<X1.OR.Y2<Y1 THEN 9900 ELSE SIZED=1
5190 RETURN
```

REM *************************************************************
REM * This code calls one of the two sizing routines (in this case, the *
REM * X-Axis sizing routine) by passing several variables in memory *
REM * locations to the assembler routine. The returned value, XR, gives the *
REM * "Return" Value from the assembler routine. This value is either *
REM * X-START or X-END, depending on the scan direction (+1 and -1, *
REM * respectively.) *
REM *************************************************************
5200 REM *** IMAGE Y-AXIS BYTE ANALYSIS ROUTINE
5210 DBY(18H)=XS : DBY(19H)=XE : DBY(1AH)=YS : DBY(1BH)=YE : DBY(1CH)=SP
5220 CALL 9D00H
5230 XR=DBY(18H) :RETURN REM *************************************************************
REM * This code calls one of the two sizing routines (in this case, the *
REM * Y-Axis sizing routine) by passing several variables in memory *
REM * locations to the assembler routine. The returned value, YR, gives the *
REM * "Return" Value from the assembler routine. This value is either *
REM * Y-START or Y-END, depending on the scan direction (+1 and -1, *
REM * respectively.) *
REM *************************************************************
5300 REM *** IMAGE X-AXIS BYTE ANALYSIS ROUTINE
5310 DBY(18H)=XS : DBY(19H)=XE : DBY(1AH)=YS : DBY(1BH)=YE : DBY(1CH)=SP
5320 CALL 9D60H
5330 YR=DBY(1AH) :RETURN REM *************************************************************
REM * This code helps to determine where the black border ends on the X-Axis *
REM * Center Line, from both top and bottom. It determines two variables, *
REM * Y-TOP and Y-BOTTOM, depending on the scan direction (+1 and -1, *
REM * respectively.) The routine examines the Y-Axis values at X Center *
REM * Line. In other words, the Digitizer card is examined at (127,y), where *
REM * Y goes from 0 to 255, and then from 255 to 0, to determine the two *
REM * values. *
REM *************************************************************
5400 REM *** DETERMINE Y-RANGE ON FRAME SIZE
5410 YR=-1:LC=0
5420 FOR Y=YS TO YE STEP SP
5430 XBY(49155)=127:XBY(49154)=Y:V=XBY(49153)
5440 IF V<14 THEN LC=0:GOTO 5460
5450 LC=LC+1: IF LC>3 THEN YR=Y:Y=YE
5460 NEXT Y:IF YR=-1 THEN 9900 ELSE RETURN REM *************************************************************
REM * This code calls the Algorithm Data Generation Routine, which returns *
REM * 16 values used in the generation of the Generated Data Matrix. To call *
REM * the assembler routine, the Center Line of the Analysis window must be *
REM * determined. This is arbitrarily set at the bottom 1/3rd of the image *
REM * (for the X value) and the middle of the image (for the Y value.) From *
REM * there, our Analysis window is +/- 36. X-END and Y-END are passed to *
REM * the assembler routine as + 37 because the routine stops when it *
REM * reaches X/Y-END (before calculating any values for it.) Thus, we have *

REM * to "trick" the assembler routine into counting all 36 rows in the   *
REM * B-Range. The returned values are then converted into the 12 element *
REM * Generated Data Matrix.                                              *
REM ****************************************************************
5500 REM *** GENERATE VERIFICATION STRING
5510 XC=X2-(X2-X1)/3:YC=Y2-(Y2-Y1)/2
5520 DBY(18H)=XC-36 : DBY(19H)=XC+37 : DBY(1AH)=YC-36 : DBY(1BH)=YC+37
5530 DBY(1CH)=XC : DBY(1DH)=YC
5540 FOR I=1 TO 16: XBY(4FEFH+I)=0:NEXT I:CALL 9E00H
5550 IMAGE(K*12+01)=XBY(4FF0H)
5560 IMAGE(K*12+02)=XBY(4FF1H)
5570 IMAGE(K*12+03)=XBY(4FF2H)
5580 IMAGE(K*12+04)=XBY(4FF3H)
5590 IMAGE(K*12+05)=(XBY(4FF4H)*256+XBY(4FF5H))/36
5600 IMAGE(K*12+06)=(XBY(4FF6H)*256+XBY(4FF7H))/36
5610 IMAGE(K*12+07)=XBY(4FF8H)
5620 IMAGE(K*12+08)=XBY(4FF9H)
5630 IMAGE(K*12+09)=XBY(4FFAH)
5640 IMAGE(K*12+10)=(XBY(4FFBH)*256+XBY(4FFCH))/36
5650 IMAGE(K*12+11)=(XBY(4FFDH)*256+XBY(4FFEH))/36
5660 IMAGE(K*12+12)=XBY(4FFFH)
5670 RETURN REM ****************************************************************
REM * This code is the generic "camera command" routine. A digitizer card *
REM * command is sent via the CC variable. This routine then outputs the  *
REM * variable to the digitizer "Command Port", loops for delay purposes, *
REM * and then returns to caller.                                         *
REM ****************************************************************
9800 XBY(49152) = CC: FOR L=1 TO 100: NEXT L: RETURN REM ****************************************************************
REM * The following code is executed when the SIZING routine cannot       *
REM * accurately determine where the fingerprint image exists on the      *
REM * digitizer card. It simply instructs the user to adjust the print, or *
REM * use another image. This program is then re-executed.                *
REM ****************************************************************
9900 PRINT CHR(7):PRINT "  * Image READ Error *"
9910 PRINT "* Adjust or retake image *":PRINT
9920 INPUT "Press any key to continue ", $(0)
9930 GOTO 2000

REM ****************************************************************
REM * Set flag to prevent Control-C break                                 *
REM ****************************************************************
0010 DBY(38) = DBY(38).OR.01H REM ****************************************************************
REM * Determine if system startup was successful, and initialize the LCD  *
REM * card if startup was successful.                                     *
REM ****************************************************************
0110 IF XTAL < > 11059200 THEN 9910

```
0120 IF TMOD <> 16 THEN 9920
0130 IF T2CON <> 52 THEN 9940
0140 GOSUB 9850
```

REM ****************************************************************
REM * Initialize variable space, dimension image and card data storage area, *
REM * set all array values to zero.                                  *
REM ****************************************************************
```
1000 STRING 500,125
2010 DIM CARD(12), IMAGE(12)
2020 FOR I=1 TO 12: CARD(I) = 0: IMAGE(I) = 0: NEXT I
```

REM ****************************************************************
REM * Flush the Serial Port input buffer, advance the LCD display 40 spaces, *
REM * print a "Ready" message, and put the digitizer card in a "wait state". *
REM ****************************************************************
```
2400 GOSUB 9700:GOSUB 9860:$(1)="Ready - Insert Card.":GOSUB 9800
2410 CC=7:GOSUB 9900:CC=6:GOSUB 9900:CC=5:GOSUB 9900
```

REM ****************************************************************
REM * Call the Serial Port Input Routine. Check to make sure the data that *
REM * was returned is in the correct format and length (@21H). If not, call *
REM * a message print routine at 9970 or 9980. If so, convert the read data *
REM * into the CARD array for later comparison against Generated Data. *
REM ****************************************************************
```
2500 CALL 9DC0H:GOSUB 9850:GOSUB 9860:IF DBY(21H)<26 THEN 9970
2510 IF XBY(4F80H) <> 80 THEN 9970
2520 IF XBY(4F81H) = 81 THEN 9970
2530 IF XBY(4F81H) <> 51 THEN 9980
2540 IF XBY(4F80H+DBY(21H)) <> 81 THEN 9970
2550 FOR I = 1 TO 10
2560   CARD(I) = (XBY(4F80H+2*I)-48) + (XBY(4F80H+2*I+1)-48)*10
2570 NEXT I
```

REM ****************************************************************
REM * Set initial pass parameters (THIS = Pass (1)/Reject(0) this loop, PREV *
REM * = Pass/Reject on last loop, PASSES = Number of loops). Call the Image *
REM * Capture Routine (5000), Image Sizing Routine (5100), and the Algorithm *
REM * Data Generation Routine and Generate Verification Matrix Routine (5500)*
REM ****************************************************************
```
3000 THIS = -1: PREV = -1: PASSES = 0
3010 GOSUB 5000
3020 GOSUB 5100
3030 GOSUB 5500
```

REM ****************************************************************
REM * Data Confirmation Routine - Check CARD data against IMAGE data. If *
REM * the data falls within certain tolerances, increase confidence level *
REM * accordingly. If Confidence Level is okay, set THIS to passed (1), *
REM * otherwise set it to reject (0).                                *
REM ****************************************************************
```
3100 PREV=THIS: PERC = 0.01
3110 FOR I=1 TO 12
```

```
3120 IF I<8 THEN IF ABS(CARD(I)-IMAGE(I))<4 THEN PERC=PERC+8.33
3130 IF I>7 THEN IF ABS(CARD(I)-IMAGE(I))<3 THEN PERC=PERC+8.33
3140 NEXT I
3150 IF PERC > 79 THEN THIS=1 ELSE THIS = 0

REM ***************************************************************
REM * If we have two consecutive passes (THIS & PREV = 1), Verify Image.   *
REM * If we have two consecutive failures (THIS & PREV = 0), Reject Image. *
REM * If we have 10 passes without specific results, then generate the    *
REM * "unable to verify" message.                                          *
REM ***************************************************************
3200 IF THIS = 1 .AND. PREV = 1 THEN 3310
3210 IF THIS = 0 .AND. PREV = 0 THEN 3320
3220 PASSES=PASSES + 1
3230 IF PASSES < 10 THEN 3010

REM ***************************************************************
REM * Verification messages called by the Data Confirmation Routine.      *
REM ***************************************************************
3300 $(1)="Unable to Verify   .": GOSUB 9800: GOTO 3330
3310 $(1)="Image Verified     .": GOSUB 9800: GOTO 3330
3320 $(1)="Verification Failed .": GOSUB 9800:GOTO 3330
3330 GOTO 1000

REM ***************************************************************
REM * Image Capture Routine. This routine captures an image into digitizer  *
REM * Card RAM by issuing a series of commands to the "Command Port".       *
REM ***************************************************************
5000 REM *** CAPTURE CARD IMAGE
5010 CC=7:GOSUB 9900:CC=6:GOSUB 9900:CC=5:GOSUB 9900:CC=6:GOSUB 9900
5020 RETURN REM ***************************************************************
REM * This code handles sizing of the Fingerprint on the digitizer card.   *
REM * Several values are determined here:                                  *
REM *                                                                      *
REM *  Y0 - Y Top           XS - Temp "Start @ X Pos" Variable             *
REM *  Y9 - Y Bottom        XE - Temp "End @ X Pos" Variable               *
REM *  X1 - X Start         YS - Temp "Start @ Y Pos" Variable             *
REM *  X2 - X End           YE - Temp "End @ Y Pos" Variable               *
REM *  Y1 - Y Start                                                        *
REM *  Y2 - Y End                                                          *
REM *                                                                      *
REM * Variable SP is used to indicate the "step", or direction of the scan,*
REM * whether it be from +1 or -1 (255). Several routines are called to set*
REM * values and call Assembler routines to speed the sizing of the image. *
REM * Once sizing is successfully run, this routine is bypassed on         *
REM * subsequent passes.                                                   *
REM ***************************************************************
5100 REM *** COMPUTE SIZE
5110 X1=0:Y1=0:X2=0:Y2=0
5120 YS=1:YE=255:SP=+1:GOSUB 5200:Y0=YR
```

```
5130 YS=255:YE=1:SP=-1:GOSUB 5200:Y9=YR
5140 XS=000:XE=255:YS=Y0:YE=Y9:ST=001:GOSUB 5300:X1=XR
5150 XS=255:XE=000:YS=Y9:YE=Y0:ST=255:GOSUB 5300:X2=XR
5160 XS=X1 :XE=X2 :YS=Y0:YE=Y9:ST=001:GOSUB 5400:Y1=YR
5170 XS=X2 :XE=X1 :YS=Y9:YE=Y0:ST=255:GOSUB 5400:Y2=YR
5180 IF Y9<Y0.OR.X2<X1.OR.Y2<Y1 THEN 9990
5190 RETURN
```

REM *****************************************************************
REM * This code helps to determine where the black border ends on the X-Axis *
REM * Center Line, from both top and bottom. It determines two variables,   *
REM * Y-TOP and Y-BOTTOM, depending on the scan direction (+1 and -1,       *
REM * respectively.) The routine examines the Y-Axis values at X Center    *
REM * Line. In other words, the Digitizer card is examined at (127,y), where *
REM * Y goes from 0 to 255, and then from 255 to 0, to determine the two   *
REM * values.                                                              *
REM *****************************************************************

```
5200 YR=-1:LC=0
5210 FOR Y=YS TO YE STEP SP
5220 XBY(49155)=127:XBY(49154)=Y:V=XBY(49153)
5230 IF V<14 THEN LC=0:GOTO 5250
5240 LC=LC+1: IF LC>3 THEN YR=Y:Y=YE
5250 NEXT Y:IF YR=-1 THEN 9990
5260 RETURN
```

REM *****************************************************************
REM * This code calls one of the two sizing routines (in this case, the    *
REM * X-Axis sizing routine) by passing several variables in memory        *
REM * locations to the assembler routine. The returned value, XR, gives the *
REM * "Return" Value from the assembler routine. This value is either      *
REM * X-START or X-END, depending on the scan direction (+1 and -1,        *
REM * respectively.)                                                       *
REM *****************************************************************
```
5500 DBY(18H)=XS : DBY(19H)=XE : DBY(1AH)=YS : DBY(1BH)=YE : DBY(1CH)=ST
5310 CALL 9D00H : XR=DBY(18H) :RETURN
```

REM *****************************************************************
REM * This code calls one of the two sizing routines (in this case, the    *
REM * Y-Axis sizing routine) by passing several variables in memory        *
REM * locations to the assembler routine. The returned value, YR, gives the *
REM * "Return" Value from the assembler routine. This value is either      *
REM * Y-START or Y-END, depending on the scan direction (+1 and -1,        *
REM * respectively.)                                                       *
REM *****************************************************************
```
5400 DBY(18H)=XS : DBY(19H)=XE : DBY(1AH)=YS : DBY(1BH)=YE : DBY(1CH)=ST
5410 CALL 9D60H : YR=DBY(1AH) :RETURN
```

REM *****************************************************************
REM * This code calls the Algorithm Data Generation Routine, which returns *
REM * 16 values used in the generation of the Generated Data Matrix. To call *
REM * the assembler routine, the Center Line of the Analysis window must be *
REM * determined. This is arbitrarily set at the bottom 1/3rd of the image  *

REM * (for the X value) and the middle of the image (for the Y value.) From *
REM * there, our Analysis window is +/- 36. X-END and Y-END are passed to *
REM * the assembler routine as + 37 because the routine stops when it *
REM * reaches X/Y-END (before calculating any values for it.) Thus, we have *
REM * to "trick" the assembler routine into counting all 36 rows in the *
REM * B-Range. The returned values are then converted into the 12 element *
REM * Generated Data Matrix. *

REM ****************************************************************
5500 REM *** GENERATE VERIFICATION STRING
5510 XC=X2-(X2-X1)/3:YC=Y2-(Y2-Y1)/2
5520 DBY(18H)=XC-36 : DBY(19H)=XC+37 : DBY(1AH)=YC-36 : DBY(1BH)=YC+37
5530 DBY(1CH)=XC : DBY(1DH)=YC
5540 FOR I=1 TO 16: XBY(4FEFH+I)=0: NEXT I: CALL 9E00H
5550 IMAGE(01)=XBY(4FF0H)
5560 IMAGE(02)=XBY(4FF1H)
5570 IMAGE(03)=XBY(4FF2H)
5580 IMAGE(04)=XBY(4FF3H)
5590 IMAGE(05)=(XBY(4FF4H)*256+XBY(4FF5H))/36
5600 IMAGE(06)=(XBY(4FF6H)*256+XBY(4FF7H))/36
5610 IMAGE(07)=XBY(4FF8H)
5620 IMAGE(08)=XBY(4FF9H)
5630 IMAGE(09)=XBY(4FFAH)
5640 IMAGE(10)=(XBY(4FFBH)*256+XBY(4FFCH))/36
5650 IMAGE(11)=(XBY(4FFDH)*256+XBY(4FFEH))/36
5660 IMAGE(12)=XBY(4FFFH)
5670 RETURN

REM ****************************************************************
REM * Serial Port Reset Routine - This routine reads any "stray" characters *
REM * off the serial port prior to entering the Serial Port Input Routine *
REM * (above). This is done so that if the data stream is corrupted off the *
REM * card reader, the program will not lose its "sync" on the input off the *
REM * Serial Port Data Latch. *
REM ****************************************************************
9700 A=DBY(98H).AND.01H:IF A=0 THEN RETURN
9710 A=DBY(99H):DBY(98H)=DBY(98H).AND.7FH:GOTO 9700

REM ****************************************************************
REM * LCD Output Routine - This routine outputs each character of variable *
REM * $(1) to the LCD, until a "." (period) character is found, which *
REM * terminates the output string. *
REM ****************************************************************
9800 LPOS=1
9810 CH=ASC($(1),LPOS):IF CH=46 THEN RETURN
9820 XBY(0F801H)=CH:LPOS=LPOS+1:GOTO 9810

REM ****************************************************************
REM * LCD Reset Routine - This routine resets the LCD display to its initial *
REM * state (ie: state when it is "powered up". *
REM ****************************************************************
9850 XBY(0F800H)=38H:XBY(0F800H)=0EH:XBY(0F800H)=06H:XBY(0F800H)=01H:RETURN

```
REM ********************************************************************
REM * LCD Advance Routine - This routine advances the LCD display by 40  *
REM * spaces by writing 20H to the LCD output port.                      *
REM ********************************************************************
9860 FOR I=1 TO 40: XBY(0F801H)=32: NEXT I
9870 RETURN REM ********************************************************************
REM * This code is the generic "camera command" routine. A digitizer card *
REM * command is sent via the CC variable. This routine then outputs the  *
REM * variable to the digitizer "Command Port", loops for delay purposes, *
REM * and then returns to caller.                                         *
REM ********************************************************************
9900 XBY(49152) = CC: FOR I=1 TO 100: NEXT I: RETURN REM ********************************************************************
REM * The following code is executed when certain errors (either system or *
REM * processing) are detected. Some errors are fatal and halt the system  *
REM * while others simply generate a message and reset the device to start *
REM * over again.                                                          *
REM ********************************************************************
9910 $(1)="XTAL  Verify Error .": GOTO 9950
9920 $(1)="TMOD  Verify Error .": GOTO 9950
9930 $(1)="TCON  Verify Error .": GOTO 9950
9940 $(1)="T2CON Verify Error .": GOTO 9950
9950 GOSUB 9800:$(1)="** System Halted **.":GOSUB 9800
9960 GOTO 9960
9970 $(1)="MagStripe Read Err ." : GOSUB 9800: GOTO 1000
9980 $(1)="Reader Channel Err ." : GOSUB 9800: GOTO 1000
9990 $(1)="Poor Image Quality ." : GOSUB 9800: GOTO 1000

REM ********************************************************************
REM * Set flag to prevent Control-C break                                *
REM ********************************************************************
0100 DBY(38) = DBY(38).OR.01H REM ********************************************************************
REM * Set printer baud rate to 1200. Determine if system startup was     *
REM * successful, and print error messages if not.                       *
REM ********************************************************************
1100 BAUD 1200
1110 IF XTAL <> 11059200 THEN 9910
1120 IF TMOD <> 16 THEN 9920
1130 IF T2CON <> 52 THEN 9940

REM ********************************************************************
REM * Initialize variable space, dimension image and card data storage area, *
REM * set all array values to zero. Put the Digitizer card into its "Wait    *
REM * state". Flush the Serial Port buffer should any stray data be there.   *
REM ********************************************************************
2000 STRING 500,125
2010 DIM CARD(12), IMAGE(12)
```

```
2020 FOR I = 1 TO 12: CARD(I) = 0: IMAGE(I) = 0: NEXT I
2030 GOSUB 9700:CC=7:GOSUB 9900:CC=6:GOSUB 9900:CC=5:GOSUB 9900

REM ****************************************************************
REM * Call the Serial Port Input Routine. Check to make sure the data that *
REM * was returned is in the correct format and length (@21H). If not, call *
REM * a message print routine at 9970 or 9980. If so, convert the read data *
REM * into the CARD array for later comparison against Generated Data. *
REM ****************************************************************
2500 CALL 9DC0H:IF DBY(21H)<22 THEN 9970
2510 IF XBY(4F80H) <> 80 THEN 9970
2520 IF XBY(4F81H) = 81 THEN 9970
2530 IF XBY(4F81H) <> 51 THEN 9980
2540 IF XBY(4F80H+DBY(21H)) <> 81 THEN 9970
2550 FOR I = 1 TO 10
2560  CARD(I) = (XBY(4F80H+2*I)-48) + (XBY(4F80H+2*I+1)-48)*10
2570 NEXT I
2580 FOR I=1 TO 40: XBY(0F801H)=32: NEXT I REM ****************************************************************
REM * Set initial pass parameters (THIS = Pass (1)/Reject(0) this loop, PREV *
REM * = Pass/Reject on last loop, PASSES = Number of loops). Call the Image *
REM * Capture Routine (5000), Image Sizing Routine (5100), and the Algorithm *
REM * Data Generation Routine and Generate Verification Matrix Routine (5500)*
REM ****************************************************************
3000 THIS = -1: PREV = -1: PASSES = 0
3010 GOSUB 5000
3020 GOSUB 5100
3030 GOSUB 5500

REM ****************************************************************
REM * Data Confirmation Routine - Check CARD data against IMAGE data. If *
REM * the data falls within certain tolerances, increase confidence level *
REM * accordingly. If Confidence Level is okay, set THIS to passed (1), *
REM * otherwise set it to reject (0). *
REM ****************************************************************
3100 PREV=THIS: PERC = 0.01
3110 FOR I=1 TO 12
3120 IF I<8 THEN IF ABS(CARD(I)-IMAGE(I))<4 THEN PERC=PERC+8.33
3130 IF I>7 THEN IF ABS(CARD(I)-IMAGE(I))<3 THEN PERC=PERC+8.33
3140 NEXT I
3150 IF PERC > 79 THEN THIS=1 ELSE THIS = 0

REM ****************************************************************
REM * If we have two consecutive passes (THIS & PREV = 1), Verify Image. *
REM * If we have two consecutive failures (THIS & PREV = 0), Reject Image. *
REM * If we have 10 passes without specific results, then generate the *
REM * "unable to verify" message. *
REM ****************************************************************
3200 IF THIS = 1 .AND. PREV = 1 THEN 3310
3210 IF THIS = 0 .AND. PREV = 0 THEN 3320
3220 PASSES=PASSES + 1
3230 IF PASSES < 10 THEN 3010
```

REM **********************************************************************
REM * Verification messages called by the Data Confirmation Routine.      *
REM **********************************************************************
3300 ?# "  * Unable to Verify *  ", CHR(12): GOTO 3330
3310 ?# "  * Image Verified *  ", CHR(12): GOTO 3330
3320 ?# " * Verification Failed * ", CHR(12):GOTO 3330
3330 GOTO 1000

REM **********************************************************************
REM * Image Capture Routine. This routine captures an image into digitizer *
REM * Card RAM by issuing a series of commands to the "Command Port".     *
REM **********************************************************************
5000 REM *** IMAGE CAPTURE ROUTINE
5010 CC=7:GOSUB 9900:CC=6:GOSUB 9900:CC=5:GOSUB 9900:CC=6:GOSUB 9900
5020 RETURN REM **********************************************************************
REM * This code handles sizing of the Fingerprint on the digitizer card.  *
REM * Several values are determined here:                                 *
REM *                                                                    *
REM * Y0 - Y Top          XS - Temp "Start @ X Pos" Variable             *
REM * Y9 - Y Bottom       XE - Temp "End @ X Pos" Variable               *
REM * X1 - X Start        YS - Temp "Start @ Y Pos" Variable             *
REM * X2 - X End          YE - Temp "End @ Y Pos" Variable               *
REM * Y1 - Y Start                                                       *
REM * Y2 - Y End                                                         *
REM *                                                                    *
REM * Variable SP is used to indicate the "step", or direction of the scan, *
REM * whether it be from +1 or -1 (255). Several routines are called to set *
REM * values and call Assembler routines to speed the sizing of the image. *
REM * Once sizing is successfully run, this routine is bypassed on        *
REM * subsequent passes.                                                  *
REM **********************************************************************
5100 REM *** COMPUTE SIZE
5110 X1=0:Y1=0:X2=0:Y2=0
5120 YS=1:YE=127:SP=+1:GOSUB 5200:Y0=YR
5130 YS=127:YE=1:SP=-1:GOSUB 5200:Y9=YR
5140 XS=21 :XE=235:YS=Y0:YE=Y9:ST=001:GOSUB 5300:X1=XR
5150 XS=235:XE=21 :YS=Y9:YE=Y0:ST=255:GOSUB 5300:X2=XR
5160 XS=X1 :XE=X2 :YS=Y0:YE=Y9:ST=001:GOSUB 5400:Y1=YR
5170 XS=X2 :XE=X1 :YS=Y9:YE=Y0:ST=255:GOSUB 5400:Y2=YR
5180 IF Y9<Y0.OR.X2<X1.OR.Y2<Y1 THEN 9990
5190 RETURN REM **********************************************************************
REM * This code helps to determine where the black border ends on the X-Axis *
REM * Center Line, from both top and bottom. It determines two variables,  *
REM * Y-TOP and Y-BOTTOM, depending on the scan direction (+1 and -1,     *
REM * respectively.) The routine examines the Y-Axis values at X Center   *
REM * Line. In other words, the Digitizer card is examined at (127,y), where *
REM * Y goes from 0 to 255, and then from 255 to 0, to determine the two  *
REM * values.                                                            *

```
REM ********************************************************************
5200 YR=-1:LC=0
5210 FOR Y=YS TO YE STEP SP
5220 XBY(49155)=127:XBY(49154)=Y:V=XBY(49153)
5230 IF V<14 THEN LC=0:GOTO 5250
5240 LC=LC+1: IF LC>3 THEN YR=Y:Y=YE
5250 NEXT Y:IF YR=-1 THEN 9990
5260 RETURN

REM ********************************************************************
REM * This code calls one of the two sizing routines (in this case, the  *
REM * X-Axis sizing routine) by passing several variables in memory      *
REM * locations to the assembler routine. The returned value, XR, gives the *
REM * "Return" Value from the assembler routine. This value is either    *
REM * X-START or X-END, depending on the scan direction (+1 and -1,      *
REM * respectively.)                                                     *
REM ********************************************************************
5300  DBY(18H)=XS : DBY(19H)=XE : DBY(1AH)=YS : DBY(1BH)=YE : DBY(1CH)=ST
5310  CALL 9D00H : XR=DBY(18H) :RETURN REM ********************************************************************
REM * This code calls one of the two sizing routines (in this case, the  *
REM * Y-Axis sizing routine) by passing several variables in memory      *
REM * locations to the assembler routine. The returned value, YR, gives the *
REM * "Return" Value from the assembler routine. This value is either    *
REM * Y-START or Y-END, depending on the scan direction (+1 and -1,      *
REM * respectively.)                                                     *
REM ********************************************************************
5400  DBY(18H)=XS : DBY(19H)=XE : DBY(1AH)=YS : DBY(1BH)=YE : DBY(1CH)=ST
5410  CALL 9D60H : YR=DBY(1AH) :RETURN REM ********************************************************************
REM * This code calls the Algorithm Data Generation Routine, which returns *
REM * 16 values used in the generation of the Generated Data Matrix. To call *
REM * the assembler routine, the Center Line of the Analysis window must be *
REM * determined. This is arbitrarily set at the bottom 1/3rd of the image *
REM * (for the X value) and the middle of the image (for the Y value.) From *
REM * there, our Analysis window is +/- 36. X-END and Y-END are passed to *
REM * the assembler routine as + 37 because the routine stops when it    *
REM * reaches X/Y-END (before calculating any values for it.) Thus, we have *
REM * to "trick" the assembler routine into counting all 36 rows in the  *
REM * B-Range. The returned values are then converted into the 12 element *
REM * Generated Data Matrix.                                             *
REM ********************************************************************
5500 REM *** GENERATE VERIFICATION STRING
5510 XC=X2-(X2-X1)/3:YC=Y2-(Y2-Y1)/2
5520  DBY(18H)=XC-36 : DBY(19H)=XC+37 : DBY(1AH)=YC-36 : DBY(1BH)=YC+37
5530  DBY(1CH)=XC : DBY(1DH)=YC
5540 FOR I=1 TO 16: XBY(4FEFH+I)=0: NEXT I: CALL 9E00H
5550 IMAGE(01)=XBY(4FF0H)
5560 IMAGE(02)=XBY(4FF1H)
5570 IMAGE(03)=XBY(4FF2H)
```

```
5580 IMAGE(04)=XBY(4FF3H)
5590 IMAGE(05)=(XBY(4FF4H)*256+XBY(4FF5H))/36
5600 IMAGE(06)=(XBY(4FF6H)*256+XBY(4FF7H))/36
5610 IMAGE(07)=XBY(4FF8H)
5620 IMAGE(08)=XBY(4FF9H)
5630 IMAGE(09)=XBY(4FFAH)
5640 IMAGE(10)=(XBY(4FFBH)*256+XBY(4FFCH))/36
5650 IMAGE(11)=(XBY(4FFDH)*256+XBY(4FFEH))/36
5660 IMAGE(12)=XBY(4FFFH)
5670 RETURN

REM ****************************************************************
REM * Serial Port Reset Routine - This routine reads any "stray" characters *
REM * off the serial port prior to entering the Serial Port Input Routine  *
REM * (above). This is done so that if the data stream is corrupted off the *
REM * card reader, the program will not lose its "sync" on the input off the *
REM * Serial Port Data Latch.                                         *
REM ****************************************************************
9700 A=DBY(98H).AND.01H:IF A=0 THEN RETURN
9710 A=DBY(99H):DBY(98H)=DBY(98H).AND.7FH:GOTO 9700

REM ****************************************************************
REM * This code is the generic "camera command" routine. A digitizer card *
REM * command is sent via the CC variable. This routine then outputs the  *
REM * variable to the digitizer "Command Port", loops for delay purposes, *
REM * and then returns to caller.                                    *
REM ****************************************************************
9900 XBY(49152) = CC: FOR I=1 TO 100: NEXT I: RETURN REM ****************************************************************
REM * The following code is executed when certain errors (either system or *
REM * processing) are detected. Some errors are fatal and halt the system  *
REM * while others simply generate a message and reset the device to start *
REM * over again.                                                    *
REM ****************************************************************
9910 ?# " XTAL  Verify Error " : GOTO 9950
9920 ?# " TMOD  Verify Error " : GOTO 9950
9930 ?# " TCON  Verify Error " : GOTO 9950
9940 ?# " T2CON Verify Error " : GOTO 9950
9950 ?# "*** System Halted ***", CHR(12)
9960 GOTO 9960
9970 ?# "*** MagStripe Read Err ***", CHR(12): GOTO 1000
9980 ?# "*** Reader Channel Err ***",CHR(12): GOTO 1000
9990 ?# " *** Poor Image Quality *** ",CHR(12): GOTO 1000
010 REM *** BLASTROM.BAS - ASSUMES ROM1 & ROM2 ARE LOADED INTO RAM
020 STRING 500,100:GOSUB 1100
030 PRINT CHR(12),"Please enter Identification Stamp:"
040 PRINT "  Please end your Stamp with a '$' as the last character."
050 PRINT " [------------------------------------------------]"
060 INPUT ">",$(1):HP=0
070 $(0)="Programs in this EPROM (c) 1989 TMS, Inc. All Rights Reserved. $"
080 PRINT CHR(12),"Building ID Stamp...",
090 $(3)=$(0):GOSUB 1000:$(3)=$(1):GOSUB 1000
```

```
100 PRINT "Blasting...",
110 BLAST 4000H,42FFH,9D00H

200 PRINT "...Verifying...",
210 VERIFY 4000H,42FFH,9D00H

300 PRINT "...Completed.": END

1000 L=0
1010 IF ASC($(3),L)=36 THEN RETURN
1020 XBY(4280H+HP)=ASC($(3),L):HP=HP+1:L=L+1:GOTO 1010

1100 PRINT CHR(12),CHR(7),CHR(7)
1110 PRINT "**** WARNING ****": PRINT
1120 PRINT "This program will build an Identification Stamp with data you"
1130 PRINT "provide, and then proceed to BLAST and VERIFY a blank EPROM"
1140 PRINT "located on the BCC-52 MotherBoard. Make sure that the +21Volts"
1150 PRINT "and GROUND leads are securely in place!":PRINT
1160 INPUT "Are you sure you want to do this (Y/N) ? ",$(0)
1170 IF ASC($(0),1)<>ASC(Y) THEN END
1180 FILL 4280H,42FFH,00H:RETURN RECV:    ORG 40C0H LOC 40C0H
         MOV DPTR,#4F00H
         MOV 21H,#00H
         MOV 20H,#01H RECVCHK: INC 20H
         MOV A,20H
         JZ RETRECV
         MOV A,98H
         ANL A,#01H
         JZ RECVCHK
         ANL 98H,#0FEH
         MOV A,99H
         ANL A,#7FH
         MOVX @DPTR,A
         INC DPTR
         INC 21H
         MOV 20H,#01H
         CJNE A,#03H,RECVCHK
RETRECV: RET

SEND:    MOV DPTR,#4F00H

SENDCHK: MOV A,98H
         ANL A,#02H
         JZ SENDCHK
         ANL 98H,#0FDH
         MOVX A,@DPTR
         MOV 99H,A
         INC DPTR
         CJNE A,#03H,SENDCHK
RETRECV: RET
```

```
1000 String 110,50
1005 Gosub 9900:Lpos=1
1010 Gosub 9850:Gosub 9700:Gosub 9860:$(1)="Ready - Insert Card.":Gosub 9800

1999 Rem **** Reset (Power On) Command
2000 $(0)="60046E0100000B":Gosub 9000
2010 If St=247 Then 2000
2020 If St<>0 Then 9100
2030 $(1)="Card Inserted And Powered On.":Gosub 9800:Gosub 9900

2099 Rem **** Read Data From Card
2100 $(1)="Reading Data.":Gosub 9800
2101 $(0)="6006DBBCB002A00C1F":Gosub 9000
2102 If St<>0 Then 9100
2103 $(1)="Data Retrieved.":Gosub 9800:Gosub 9900

2199 Rem **** Display Retrieved Data
2200 $(1)="                        "
2201 For I=1 To 24:Asc($(1),I)=Xby(4F05H+I):Next I
2203 Gosub 9800:Gosub 9900

2299 Rem **** Remove Card (Power Off) W/ Verify Command
2300 $(1)="Please Remove Card.":Gosub 9800
2301 $(0)="60046D01000008":Gosub 9000
2302 If St=247 .Or. St=252 Then 2301
2303 If St<>0 Then 9100
2304 $(1)="Card Removed Ok.":Gosub 9800
2305 Gosub 9900:Goto 1000

8999 Rem **** Smartcard Interface Routine
9000 If Err>5 Then $(1)="Erred Out.":Gosub 9800:Goto 1000
9001 For I=0 To 255:Xby(4F00H+I)=0:Xby(4E00H+I)=0:Next I
9002 Print $(0),:Print Chr(03H),:Call 9D00H
9003 If Dby(21H)<02 Then Err=Err+1:Goto 9001
9004 P=0:For I=1 To Dby(21H)-1:A=Xby(4Effh+I):M=16:If I/2=Int(I/2) Then M=1
9005 If A>47.And.A<58 Then Xby(4E00h+P)=Xby(4E00h+P)+(A-48)*M
9006 If A>64.And.A<71 Then Xby(4E00h+P)=Xby(4E00h+P)+(A-55)*M
9007 If M=1 Then P=P+1
9008 Next I:Chk=Xby(4E00H):For I=1 To P-2
9009 Chk=Chk.Xor.Xby(4E00H+I):Next I
9010 If Chk<>Xby(4E00H+P-1) Then Err=Err+1:Goto 9000
9011 If Xby(4E00H)<>96 Then Err=Err+1:Goto 9000
9012 St=Xby(4E02H):Return 9100 Rem **** Smart Card Error Messages
9101 If St=004 Then $(1)="Unknown Command .":Gosub 9800:Goto 1000
9102 If St=160 Then $(1)="Unsupported Card.":Gosub 9800:Goto 1000
9103 If St=162 Then $(1)="Card Is Mute   .":Gosub 9800:Goto 1000
9104 If St=163 Then $(1)="Parity Error   .":Gosub 9800:Goto 1000
9105 If St=226 Then $(1)="Card Is Mute 2 .":Gosub 9800:Goto 1000
9106 If St=227 Then $(1)="Parity Error 2 .":Gosub 9800:Goto 1000
9107 If St=228 Then $(1)="Unknown Op-Code .":Gosub 9800:Goto 1000
```

```
9108 If St=229 Then $(1)="Comm Seq Prob .":Gosub 9800:Goto 1000
9109 If St=240 Then $(1)="Card Pulled Out .":Gosub 9800:Goto 1000
9110 If St=247 Then $(1)="Card Absent    .":Gosub 9800:Goto 1000
9111 If St=252 Then $(1)="Card Not Removed.":Gosub 9800:Goto 1000
9112 If St=251 Then $(1)="Card Removed.":Gosub 9800:Goto 1000
9113 $(1)="Unknown Error.":Gosub 9800:Stop 9700 Rem *** Reset Serial Port
9710 A=Dby(98H).And.01H:If A=0 Then Return
9720 A=Dby(99H):Dby(98H)=Dby(98H).And.7Fh:Goto 9700

9800 GOSUB 9850:Rem *** Output Data To Lcd
9810 Ch=Asc($(1),Lpos):If Ch=46 Then Lpos=1:Err=0:Return
9820 Xby(0F801H)=Ch:Lpos=Lpos+1:Goto 9810
9850 Xby(0F800H)=38H:Xby(0F800H)=0Eh:Xby(0F800H)=06H:Xby(0F800H)=01H:Return
9860 For I=1 To 40:Xby(0F801H)=32:Next I:Return 9900 For I=1 To 5000: Next I: Return
```

We claim:

1. A method for the automatic non-minutiae identification of a fingerprint of a person to be identified, comprising the steps of:

video scanning an image of a fingerprint and producing fingerprint image data and whitespace data;

electronically storing in digital form, in an addressable memory, said fingerprint image data and whitespace data;

determining the location of the said fingerprint image data stored in digital form in said addressable memory with the said whitespace data;

image framing the said fingerprint image data and whitespace data to a predetermined dimension, and establishing Y-TOP and Y-BOTTOM values along the Y-axis of said predetermined dimension;

computing the X-Axis Range of the fingerprint image data contained in the framed image data by determining two X-axis values, said X-axis values being X-START and X-END, wherein X-START indicates the memory data location where the fingerprint image data starts on the X-axis, and X-END indicates the memory data location where the fingerprint image data ends on the X-axis;

computing the Y-Axis Range of the fingerprint image data contained in the framed image data by determining two Y-axis values, said Y-axis values being Y-START and Y-END, wherein in Y-START indicates the memory data location where the fingerprint image data starts on the Y-axis, and Y-END indicates the memory data location where the fingerprint image data ends on the Y-axis;

determining the dimensional area of said fingerprint image data by utilizing said X-START, X-END, Y-START and Y-END values;

defining a fingerprint identity window within said fingerprint image data;

defining said whitespace data as having a predetermined greylevel value;

defining said fingerprint image data as having a second predetermined greylevel value distinct from that defined for the said whitespace data;

as to said image framing, examining memory data locations (128, Y) where $0 \leq Y \leq 255$, and upon finding three consecutive rows of whitespace data, defining Y-TOP as the latter examined data row Y-axis value, and examining memory data locations (128, Y) where $255 \geq Y \geq 0$ and upon finding three consecutive rows of whitespace data, defining Y-BOTTOM as the last examined data row Y-axis value;

computing the X-Axis Range of the framed image data to indicate the start and end memory locations of the fingerprint image data on the X-axis by determining X-START and X-END X-axis values, wherein X-START is determined by examining memory data locations (X,Y) where $0 \leq X \leq 255$ and Y-TOP$\leq Y \leq$Y-BOTTOM, by detecting three consecutive columns of whitespace data and a next column having a greylevel value equal to said second predetermined value and considering the memory data location of said next column to be a first part of said fingerprint image data along the X-axis, and wherein X-END is determined in similar manner as for said X-START value but in an opposite direction from $255 \geq X \geq$ along the X-axis so that said X-END value indicates the memory data location along the X-axis where the fingerprint image data ends;

computing the Y-Axis Range of the framed image data to indicate the start and end memory locations of the fingerprint image data on the Y-axis by determining Y-START and Y-END Y-axis values, wherein Y-START is determined by memory data locations (X,Y) where X-START$\leq X \leq$X-END and Y-TOP$\leq Y \leq$Y-BOTTOM by detecting three consecutive rows of whitespace data and a next row having a greylevel value equal to said second predetermined value and considering the memory data location of said next row to be a first part of said fingerprint image along the Y-axis, and wherein Y-END is determined in similar manner as for said Y-START value but in an opposite direction from Y-BOTTOM$\geq Y \geq$Y-TOP along the Y-axis so that said Y-END value indicates the memory data location along the Y-axis where the fingerprint image data ends;

defining said fingerprint identity window by determining the dimension of said window around an origin point defined as (XC,YC) wherein:

XC=X-END minus (X-END minus X-START)÷3 and

YC=Y-END minus (Y-END minus Y-START)÷2; and further defining the dimensional area of the said fingerprint identity window by predetermining a window-size for said fingerprint identity window and defining said dimensional area as from (XC−DIFF, YC−DIFF) to (XC+DIFF, YC+DIFF) where DIFF=½(window-size minus 1), wherein (XC−DIFF)=Xs (YC−DIFF)=Ys, (XC+DIFF)=Xe, and (YC+DIFF)=Ye.

2. A method for automatic non-minutiae identification of a fingerprint of a person to be identified, comprising the steps of:

video scanning an image of a fingerprint and producing fingerprint image data and whitespace data;

electronically storing in digital form in addressable memory, said fingerprint image data and whitespace data;

determining the location of the said fingerprint image data stored in digital form in said addressable memory with the said whitespace data;

defining a fingerprint identity window within said fingerprint image data stored in the said addressable memory;

defining said fingerprint identity window by determining the dimensions of said window around an origin point defined as (XC, YC), wherein XC=X-END minus (X-END minus X-START) divided by 3, and YC=Y-END minus (Y-END minus Y-START). divided by 2;

defining the dimensional area of the said fingerprint identity window by predetermining a window-size for said fingerprint identity window and defining said dimensional areas as from (XC−DIFF, YC−DIFF) to (XC+DIFF, YC+DIFF DIFF=½(window-size minus 1) and (XC−DIFF)=Xs, (XC+DIFF)=Xe, (YC−DIFF)=Ys, and (YC+DIFF)=Ye;

computing a count S1 of ridges contained within a diagonal line from (Xs,Ys) to (Xe,Ye);

computing a count S2 of ridges contained within a diagonal line from (Xs,Ye) to (Xe,Ys);

computing a count Yma equal to the highest number of ridges found within any horizontal line in the Y-Axis "A-Range" which is defined as: Ys≧horizontal line<YC;

computing a count Ymb equal to the highest number of ridges found within any horizontal line in the Y-Axis "B-Range" which is defined as: YC<horizontal line≦Ye;

computing a count Ya equal to the sum total number of ridges found within all horizontal lines in the Y-Axis "A-Range" which is defined as: Ys≧horizontal line<YC, wherein Ya is stored as two counts, Yaα and Yaβ, wherein Yaα=total number of ridges on the base 256 horizontal lines in said sum total, and Yaβ=the remaining number or ridges counted which is always a number<256, wherein Ya=(Yaα(256) Yaβ)÷(windowsize ÷2);

computing a count Yb equal to the sum total number Of ridges found within all horizontal lines in the Y-Axis "Range" which is defined as: YC<horizontal line≧Ye, wherein Yb is stored as two counts, Ybα and Ybβ, where Ybα=total number of ridges on the base 256 horizontal lines in said sum total, and Ybβ=the remaining number of ridgess counted (window-size÷2);

computing a count Yc equal to the number of ridges found within horizontal line YC on the Y-axis, wherein Yc is a whole number and YC is the Y-axis center line of said fingerprint identity window;

computing a count Xma equal to the highest number of ridges found within any vertical line in the X-Axis "A-Range" which is defined as: Xs≧vertical line<XC;

computing a count Xmb equal to the highest number of ridges found within any vertical line in the X-Axis "B-Range" which is defined as: XC<vertical line≦Xe;

computing a count Xa equal to the sum total number of ridges found within all vertical lines in the X-Axis "A-Range" which is defined as: Xs≦vertical line<XC, wherein Xa is stored as two counts, Xaα and Xaβ, wherein Xaα=total number of ridges on the base 256 vertical lines in sum total, and Xaβ=the remaining number of ridges counted which is always a number<256, wherein Xa=(Xaα(256)+Xaβ)÷(window-size÷2);

computing a count Xb equal to the sum total number of ridges found within all vertical lines in the X-Axis "B-Range" which is defined as: XC<vertical line≦Xe, wherein Xb is stored as two counts, Xbα and Xbβ, wherein Xb=total number of ridges on the base 256 vertical lines in said sum total, and Xbβ=the remaining number of ridges counted which is always a number<256, wherein Xb=Xbα(256)+Xbβ)÷(window-size÷2);

computing a count Xc equal to the number of ridges found within vertical line XC on the X-axis center line of said fingerprint identity window; and compiling a data matrix from said counts S1, S2, Yma, Ymb, Ya, Yb, Yc, Xma, Xmb, Xa, Xb and Xc to provide a non-minutiae digitized numeric identifier having 24 bytes of fingerprint identification data.

3. A method as defined in claim 1, further comprising the steps of:

computing a count S1 of ridges contained within a diagonal line from (Xs,Ys) to (Xe,Ye);

computing a count S2 of ridges contained within a diagonal line from (Xs,Ye) to (Xe,Ys);

computing a count Yma equal to the highest number of ridges found within any horizontal line in the Y-Axis "A-Range" which is defined as: Ys≦horizontal line<YC;

computing a count Ymb equal to the highest number of ridges found within any horizontal line in the Y-Axis "B-Range" which is defined as: YC<horizontal line≦Ye;

computing a count Ya equal to the sum total number of ridges found within all horizontal lines in the Y-Axis "A-Range" which is defined as; Ys≦horizontal line<YC, wherein Ya is stored as two counts, Yaα and Yaβ, where Yaα=total number of ridges on the base 256 horizontal lines in said sum total, and Yaβ=the remaining number or ridges counted which is always a number<256, wherein Ya=(Yaα (256)+Yaβ)÷(windowsize÷2);

computing a count Yb equal to the sum total number of ridges found within all horizontal lines in the Y-Axis "B-Range" which is defined as: $YC < \text{horizontal line} \leq Ye$, wherein Yb is stored as two counts, $Yb\alpha$ and $Yb\beta$, where $Yb\alpha$ = total number of ridges on the base 256 horizontal lines in said sum total, and $Yb\beta$ = the remaining number of ridges counted which is always a number $< 256$, wherein $Yb = (Yb\alpha(256) + Yb\beta) \div (\text{windowsize} \div 2)$;

computing a count Yc equal to the number of ridges found within horizontal line YC on the Y-axis, wherein Yc is a whole number and YC is the Y-axis center line of said fingerprint identity window;

computing a count Xma equal to the highest number or ridges found within any vertical line in the X-Axis "A-Range" which is defined as: $Xs \leq \text{vertical line} < XC$;

computing a count Xmb equal to the highest number of ridges found within any vertical line in the X-Axis "B-Range" which is defined as: $XC < \text{vertical line} \leq Xe$;

computing a count Xa equal to the sum total number of ridges found within all vertical lines in the X-Axis "A-Range" which is defined as: $Xs \leq \text{vertical line} < XC$, wherein Xa is stored as two counts, $Xa\alpha$ and $Xa\beta$, wherein $Xa\alpha$ = total number of ridges on the base 256 vertical lines in said sum total, and $Xa\beta$ = the remaining umber of ridges counted which is always a number $< 256$, wherein $Xa = (Xa\alpha(256) + Xa\beta) \div (\text{window-size} \div 2)$;

computing a count Xb equal to the sum total number of ridges found within all vertical lines in the X-Axis "B-Range" which is defined as: $XC < \text{vertical line} \leq Xe$, wherein Xb is stored as two counts, $Xb\alpha$ and $Xb\beta$, where $Xb\alpha$ = total number of ridges on the base 256 vertical lines in sum total, and $Xb\beta$ = the remaining number of ridges counted which is always a number $< 256$, wherein $Xb = (Xb\alpha(256) + Xb\beta) \div (\text{window-size} \div 2)$;

computing a count Xc equal to the number of ridges found within vertical line XC on the X-axis, wherein Xc is a whole number and XC is the X-axis center line of said fingerprint identity window; and compiling a data matrix from said counts S1, S2, Yma, Ymb, Ya, Yb, Yc, Xma, Xmb, Xa, Xb and Xc to provide a nonminutiae digitized numeric identifier having 24 bytes of fingerprint identification data.

* * * * *